(12) United States Patent
Chen et al.

(10) Patent No.: US 11,880,533 B1
(45) Date of Patent: Jan. 23, 2024

(54) SYSTEM AND METHOD OF POWER MANAGEMENT FOR TOUCH AND DISPLAY SUPPLIES IN MULTIPLE POWER DOMAINS

(71) Applicant: Apple Inc., Cupertino, CA (US)

(72) Inventors: Du Chen, Saratoga, CA (US); Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/934,176

(22) Filed: Sep. 21, 2022

Related U.S. Application Data

(60) Provisional application No. 63/261,632, filed on Sep. 24, 2021.

(51) Int. Cl.
  *H02M 3/158* (2006.01)
  *G06F 3/041* (2006.01)
  *G06F 1/08* (2006.01)
  *G06F 3/044* (2006.01)

(52) U.S. Cl.
  CPC .............. *G06F 3/0418* (2013.01); *G06F 1/08* (2013.01); *G06F 3/0412* (2013.01); *G06F 3/0416* (2013.01); *H02M 3/158* (2013.01); *G06F 3/044* (2013.01); *G06F 2203/04107* (2013.01)

(58) Field of Classification Search
  CPC ...... G06F 3/0416; G06F 3/0412; G06F 3/044; G06F 2203/04107; H02M 3/1582
  See application file for complete search history.

(56) References Cited

U.S. PATENT DOCUMENTS

| | | | |
|---|---|---|---|
| 11,675,459 B1* | 6/2023 | Kang | G06F 3/0418 345/174 |
| 2017/0046004 A1* | 2/2017 | Choi | G06F 3/0446 |
| 2018/0032176 A1* | 2/2018 | Krah | G06F 3/0418 |
| 2019/0102037 A1* | 4/2019 | Krah | G06F 3/0418 |
| 2020/0103992 A1* | 4/2020 | Sauer | G06F 3/04184 |
| 2022/0129128 A1* | 4/2022 | Jo | G06F 3/0412 |

* cited by examiner

*Primary Examiner* — Yuzhen Shen
(74) *Attorney, Agent, or Firm* — Kubota & Basol LLP

(57) ABSTRACT

A power management circuit can comprise a direct-current-to-direct-current (DC-DC) converter and a guard buffer. The guard buffer can be referenced to a system ground and configured to generate a guard ground. The power management circuit can comprise a supply capacitor coupled to the DC-DC converter that can be referenced to system ground in a first mode and referenced to the guard ground in a second mode. A regulator can be coupled to the DC-DC converter and referred to system ground in the first mode, and decoupled and referred to guard ground in the second mode. The DC-DC converter can generate a first voltage in the first mode and a second voltage in the second mode, the second voltage greater than the first.

20 Claims, 24 Drawing Sheets

SYSTEM AND METHOD OF POWER MANAGEMENT FOR TOUCH AND DISPLAY SUPPLIES IN MULTIPLE POWER DOMAINS

CROSS-REFERENCE TO RELATED APPLICATIONS

This application claims the benefit of U.S. Provisional Application No. 63/261,632, filed Sep. 24, 2021, the content of which is incorporated herein by reference in its entirety for all purposes.

FIELD OF THE DISCLOSURE

This relates generally to a touch screen devices, and more particularly to touch-sensitive devices operating in multiple power domains.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, parasitic or stray capacitances can exist between the touch node electrodes used for sensing touch on the touch sensor panels, and other components of the devices in which the touch sensor panels are included, which can be referenced to a chassis ground (also referred to herein as device ground). These parasitic or stray capacitances can introduce errors and/or offsets into the touch outputs of the touch sensor panels. Therefore, it can be beneficial to reduce or eliminate such parasitic or stray capacitances.

SUMMARY OF THE DISCLOSURE

This relates generally to touch-sensitive devices operating in multiple power domains. In particular, an electronic device can include power management circuitry (e.g., a power management circuit) configured to generate supply voltages for touch and display operations in two or more power domains. In some examples, the two or more power domains can include a guarded domain and a non-guarded domain. In the guarded domain, the supply voltages for touch and display operation can be referenced to a guard potential (guard ground) output by a guard buffer. In some examples, in the guarded domain, the power management circuit can be configured generate supply voltages using bootstrapped power supplies. In some examples, power management circuitry can comprise one or more DC-DC converters and one or more voltage regulators to generate one or more voltage references and one or more supply rails. In some examples, power management circuitry can be time-multiplexed between power domains to supply regulated supply voltages to the touch and display circuitry. In some examples, the power management circuitry can include switches configured to control generation of the supply voltages for guarded or non-guarded operation. In some examples, the relative voltages between two or more nodes can be maintained while switching between non-guarded and guarded modes of operation (e.g., to avoid switching between guarded and non-guarded operation from degrading performing of touch and/or display operation). In some examples, power management circuitry can be configured to reduce power consumption by holding a supply rail voltage at a first, lower level before transitioning to the guarded power domain. In some examples, power management circuitry can comprise a plurality of isolation-wells (n-wells), including a first isolation well for positive supply voltages and a second isolation well for negative supply voltages.

In some examples, the guard buffer can be configurable to operate in an arbitrary waveform input mode or in a push-pull mode. In some examples, DC-DC circuits can be configured to operate in a pulse-width modulation (PWM) mode or in a pulse-frequency modulation (PFM) mode. In some examples, the power management circuitry can use different clock sources to drive the one ore DC-DC converters depending on the operating mode. In some examples, operating the DC-DC converter in the PWM mode can reduce noise when a touch signal path is optimized (e.g., when the frequency response includes a deep notch at frequencies corresponding to a touch stimulation frequency or harmonics to attenuate noise from the power supplies.

In some examples, to stimulate a touch sensor panel coupled to and/or included in an electronic device, the electronic device includes stimulation and switching circuitry. In some examples, the stimulation and switching circuitry includes different stimulation sources used during different phases of operation of the electronic device. In some examples, the electronic device includes stimulation circuitry configured to generate stimulation signals during an initial phase, a periodic phase, and a terminal phase of operation. In some examples, the electronic device includes switching circuitry to couple respective stimulation sources to other stimulation circuitry, such as amplifiers, for touch sensing operation of a touch sensor panel. In some examples, the electronic device includes an initial ramp generator, a periodic stimulation generator, and/or a terminal ramp generator. In some examples, the electronic device is configured to transition from the periodic phase to the terminal phase before a completing a full cycle (e.g., period) of the periodic mode. In some examples, such stimulation sources include one or more numerically controlled oscillators. In some examples, a frequency of touch stimulation associated with a period of stimulation signals during the periodic mode is based on a clock associated with touch sensing operations. In some examples, the electronic device uses one or more lookup tables and/or other arithmetic functions to generate waveforms for touch stimulation. In some examples, the electronic device transitions from a low power state to a periodic phase by adjusting one or more stimulation signals that at times track, and at other times are complementary to, one another during an initial phase of operation. In some examples, the electronic device is configured to generate one or more periodic stimulation signals during a periodic phase of operation. In some examples, the electronic device optionally is configured to generate one or more aperiodic signals during a phase of operation after the initial phase and before the terminal phase of operation. In some examples, the electronic device is configured to transition from the periodic phase of operation to a terminal phase of operation, where the electronic device transitions to one or more intermediate signal levels before transitioning to a low power state. In some examples, during the terminal phase of operation, the one or more stimulation signals are complementary and/or track each other. In some examples, the switching circuitry couples respective stimulation sources to respective stimulation circuitry such as amplifiers to generate voltage signals for touch stimulation operation. In some examples, such stimulation is configured for mutual capacitance touch stimulation. In some examples, such stimulation is configured for self-capacitance touch stimulation.

DETAILED DESCRIPTION

Figure 1A:
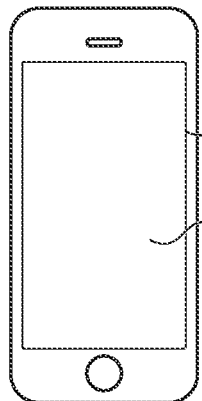
FIGS. 1A-1E illustrate exemplary systems including a touch screen and touch and display circuitry operable in multiple power domains according to examples of the disclosure

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch-sensitive devices operating in multiple power domains. In particular, an electronic device can include power management circuitry (e.g., a power management circuit) configured to generate supply voltages for touch and display operations in two or more power domains. In some examples, the two or more power domains can include a guarded domain and a non-guarded domain. In the guarded domain, the supply voltages for touch and display operation can be referenced to a guard potential (guard ground) output by a guard buffer. In some examples, in the guarded domain, the power management circuit can be configured generate supply voltages using bootstrapped power supplies. In some examples, power management circuitry can comprise one or more DC-DC converters and one or more voltage regulators to generate one or more voltage references and one or more supply rails. In some examples, power management circuitry can be time-multiplexed between power domains to supply regulated supply voltages to the touch and display circuitry. In some examples, the power management circuitry can include switches configured to control generation of the supply voltages for guarded or non-guarded operation. In some examples, the relative voltages between two or more nodes can be maintained while switching between non-guarded and guarded modes of operation (e.g., to avoid switching between guarded and non-guarded operation from degrading performing of touch and/or display operation). In some examples, power management circuitry can be configured to reduce power consumption by holding a supply rail voltage at a first, lower level before transitioning to the guarded power domain. In some examples, power management circuitry can comprise a plurality of isolation-wells (n-wells), including a first isolation well for positive supply voltages and a second isolation well for negative supply voltages.

In some examples, the guard buffer can be configurable to operate in an arbitrary waveform input mode or in a push-pull mode. In some examples, DC-DC circuits can be configured to operate in a pulse-width modulation (PWM) mode or in a pulse-frequency modulation (PFM) mode. In some examples, the power management circuitry can use different clock sources to drive the one ore DC-DC converters depending on the operating mode. In some examples, operating the DC-DC converter in the PWM mode can reduce noise when a touch signal path is optimized (e.g., when the frequency response includes a deep notch at frequencies corresponding to a touch stimulation frequency or harmonics to attenuate noise from the power supplies. In some examples, to stimulate a touch sensor panel coupled to and/or included in an electronic device, the electronic device includes stimulation and switching circuitry. In some examples, the stimulation and switching circuitry includes different stimulation sources used during different phases of operation of the electronic device. In some examples, the electronic device includes stimulation circuitry configured to generate stimulation signals during an initial phase, a periodic phase, and a terminal phase of operation. In some examples, the electronic device includes switching circuitry to couple respective stimulation sources to other stimulation circuitry, such as amplifiers, for touch sensing operation of a touch sensor panel. In some examples, the electronic device includes an initial ramp generator, a periodic stimulation generator, and/or a terminal ramp generator. In some examples, the electronic device is configured to transition from the periodic phase to the terminal phase before a completing a full cycle (e.g., period) of the periodic mode. In some examples, such stimulation sources include one or more numerically controlled oscillators. In some examples, a frequency of touch stimulation associated with a period of stimulation signals during the periodic mode is based on a clock associated with touch sensing operations. In some examples, the electronic device uses one or more lookup tables and/or other arithmetic functions to generate waveforms for touch stimulation. In some examples, the electronic device transitions from a low power state to a periodic phase by adjusting one or more stimulation signals that at times track, and at other times are complementary to, one another during an initial phase of operation. In some examples, the electronic device is configured to generate one or more periodic stimulation signals during a periodic phase of operation. In some examples, the electronic device optionally is configured to generate one or more aperiodic signals during a phase of operation after the initial phase and before the terminal phase of operation. In some examples, the electronic device is configured to transition from the periodic phase of operation to a terminal phase of operation, where the electronic device transitions to one or more intermediate signal levels before transitioning to a low power state. In some examples, during the terminal phase of operation, the one or more stimulation signals are complementary and/or track each other. In some examples, the switching circuitry couples respective stimulation sources to respective stimulation circuitry such as amplifiers to generate voltage signals for touch stimulation operation. In some examples, such stimulation is configured for mutual capacitance touch stimulation. In some examples, such stimulation is configured for self-capacitance touch stimulation.

Figure 1B:
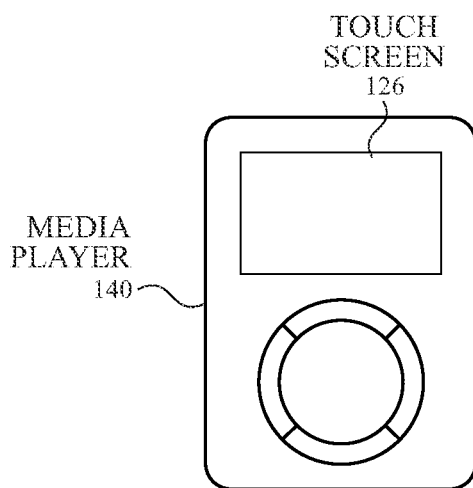
Figure 1C:
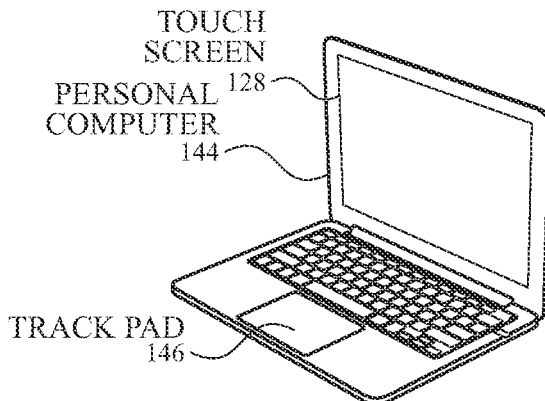
Figure 1D:
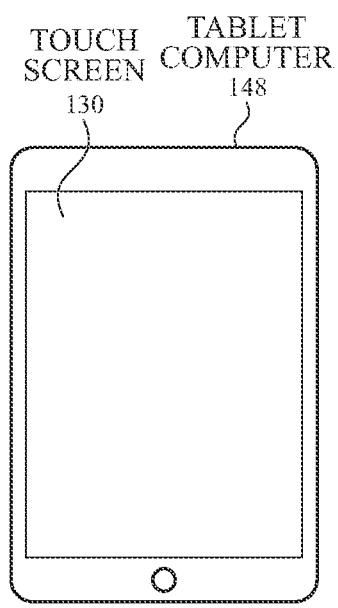
Figure 1E:
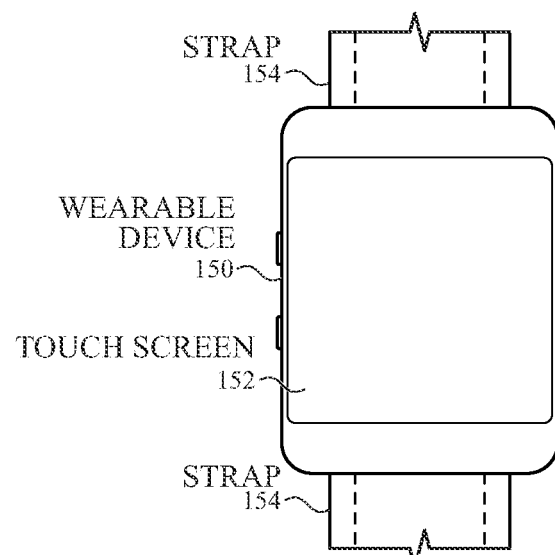

FIGS. 1A-1E illustrate exemplary systems, including a touch screen, operable in multiple power domains according to examples of the disclosure. FIG. 1A illustrates an exemplary mobile telephone 136, that includes a touch screen 124, operable in multiple power domains. FIG. 1B illustrates an exemplary digital media player 140, that includes a touch screen 126, operable in multiple power domains. FIG. 1C illustrates an exemplary personal computer 144, that includes a trackpad 146 and a touch screen 128, and operable in multiple power domains. FIG. 1D illustrates an exemplary tablet computer 148, that includes a touch screen 130, operable in multiple power domains. FIG. 1E illustrates an example wearable device 150 (e.g., a watch), that includes a touch screen 152, operable in multiple power domains. It is understood that the above touch screens can be implemented in other devices operable in multiple power domains as well. Additionally it should be understood that although the disclosure herein primarily focuses on touch screens, the disclosure can be implemented for devices including touch sensor panels and displays that may not be implemented as a touch screen.

In some examples, touch screens 124, 126, 128, 130 and 152 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 2E). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers, or may be adjacent to each other on the same layer (e.g., as described below with reference to FIG. 2D). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128 and 130 can be based on mutual capacitance and/or self-capacitance. The electrodes can be arranged as a matrix of small, individual plates of conductive material (e.g., as in touch node electrodes 272 in touch screen 270 in FIG. 2E) or as drive lines and sense lines (e.g., as in row touch electrodes 264 and column touch electrodes 262 in touch screen 260 in FIG. 2D), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2A:
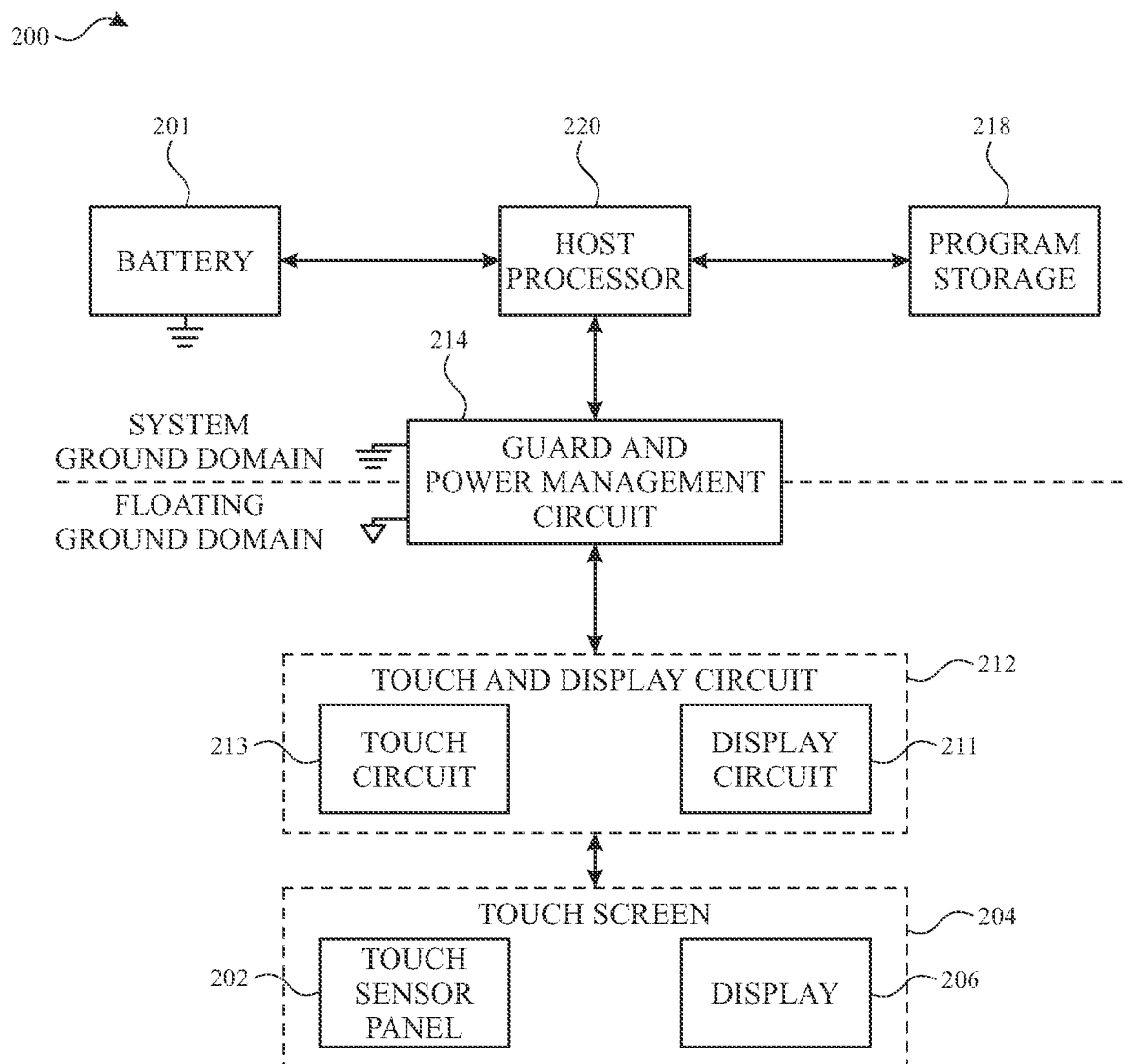
FIG. 2A is a block diagram of an exemplary computing system that illustrates one implementation of an exemplary touch screen and exemplary touch and display integrated circuit operable in multiple power domains according to examples of the disclosure.

FIG. 2A is a block diagram of an exemplary computing system 200 that illustrates one implementation of an exemplary touch screen 204 and exemplary touch and display integrated circuit 212 operable in multiple power domains according to examples of the disclosure. Computing system 200 can be included in, for example, mobile telephone 136, digital media player 140, personal computer 144, tablet computer 148, wearable device 150 or any mobile or non-mobile computing device that includes a touch screen. Computing system 200 can include a power supply (e.g., battery 201), host processor 220, and program storage 218. Battery 201 can provide power for computing system 200 and the negative terminal of battery 201 can define the system ground. Although not shown in FIG. 2A, the negative terminal of battery 201 can be coupled to a chassis of the device such that the system ground can also be referred to as the chassis ground. Host processor 220 and program storage 218 can operate in the system power domain referenced to system ground (also referred to herein as "system domain", "system power domain" or "system ground domain"). Computing system 200 can also include a touch and display sub-system which can operate in a system power domain referenced to system ground or in a guarded power domain referenced to a guard ground (also referenced to herein as "guarded domain", "guarded (or floating) power domain" or "guarded (or floating) ground domain"). The touch and display sub-system can include touch screen 204, which can be an integrated touch screen or can include a touch sensor panel 202 and a display 206, and one or more integrated circuits for operation of touch screen 204. In some examples, touch screen 204 can include a touch electrodes (e.g., as illustrated in FIGS. 2D-2E) and a display device such as a liquid crystal display (LCD), light emitting diode (LED) display or organic light emitting diode (OLED) display. In some examples, touch screen 204 can be formed on a single substrate with micro-LEDs, display chiplets (e.g., including circuitry to drive the micro-LEDs) and touch chiplets (e.g., including circuitry to drive and/or sense touch electrodes).

The touch and display sub-system can include an integrated touch and display integrated circuit 212 to operate touch screen 204. Touch and display integrated circuit 212 can operate in a system domain or in a guarded domain as described herein. Computing system 200 can also include a guard and power management integrated circuit 214 (also referred to herein as power management integrated circuit or PMIC for short). As described in more detail herein, self-capacitance touch sensing performance can be improved (and parasitic capacitance effects reduced) by performing touch sensing operations in a guarded domain rather than in the system power domain. In some examples, guard and power management integrated circuit 214 can be used to operate touch screen 204 in a guarded power domain during guarded touch operations and operate touch screen 204 in the system power domain otherwise (e.g., during non-guarded touch operations or during display operations). Guard and power management integrated circuit 214 can generate a guard voltage and can provide the voltages necessary for touch and display integrated circuit 212, including guard-referenced or system-referenced power supplies when operating in a guarded power domain or system power domain, respectively. Touch and display integrated circuit 212 can include circuitry to perform touch sensing operations (e.g., guarded self-capacitance scan, non-guarded self or mutual capacitance scans) and display operations (e.g., refreshing display pixels). Although illustrated in FIG. 2A as a touch and display integrated circuit 212 and a guard and power management integrated circuit 214, the various components and/or functionality of the touch and display integrated circuit 212 or guard and power management integrated circuit 214 can be implemented with multiple circuits, elements, chips, and/or discrete components (e.g., a separate guard integrated circuit, separate power management circuit, a separate touch integrated circuit and a separate display integrated circuit).

Touch and display integrated circuit 212 can include display circuitry 211 to perform display operations. Display circuitry 211 can include hardware to process one or more still images and/or one or more video sequences for display on touch screen 204. The display circuitry 211 can be configured to generate read memory operations to read the data representing the frame/video sequence from a memory (not shown) through a memory controller (not shown), for example, or can receive the data representing the frame/video sequence from host processor 220. The display circuitry 211 can be configured to perform various processing on the image data (e.g., still images, video sequences, etc.). In some examples, the display circuitry 211 can be configured to scale still images and to dither, scale and/or perform color space conversion on the frames of a video sequence. Display circuitry 211 can be configured to blend the still image frames and the video sequence frames to produce output frames for display. The display circuitry 211 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 211 can be configured to retrieve source frames from one or more source buffers stored in memory, composite frames from the source buffers, and display the resulting frames on integrated touch screen 204. Accordingly, the display circuitry 211 can be configured to read one or more source buffers and composite the image data to generate the output frame. Display circuitry 211 can provide various control and data signals to the display, including timing signals (e.g., one or more clock signals) and pixel selection signals. The timing signals can include a pixel clock that can indicate transmission of a pixel. The data signals can include color signals (e.g., red, green, blue) for LEDs. The display circuitry can control touch screen 204 in real-time, providing the data indicating the pixels to be displayed as the touch screen is displaying the image indicated by the frame. The interface to such a touch screen 204 can be, for example, a video graphics array (VGA) interface, a high definition multimedia interface (HDMI), a mobile industry processor interface (MIPI), a digital video interface (DVI), a LCD/LED/OLED interface, a plasma interface, or any other suitable interface.

Touch and display integrated circuit 212 can include touch circuitry 213 to perform touch operations. Touch circuitry 213 can include one or more touch processors, peripherals (e.g., random access memory (RAM) or other types of memory or storage, watchdog timers and the like), and a touch controller. The touch controller can include, but is not limited to, driver logic, one or more sense channels (e.g., including sense circuitry such as a sense amplifier 250, demodulation mixer, analog-to-digital converter (ADC), anti-aliasing filter (AAF), etc.) and channel scan logic (e.g., implemented in programmable logic circuits or as discrete logic circuits) which can provide configuration and control for the driver logic and sense channels. For example, driver logic and sense channels can be configured to drive, sense and/or ground touch node electrodes depending on the mode of touch sensing operations. The mode of touch sensing operations can, in some examples, be determined by a scan plan stored in memory (e.g., RAM) in touch circuitry 213. The scan plan can provide a sequence of scan events to perform during a frame. The scan plan can also include information necessary for providing control signals to and programming driver logic and/or sense channels for the specific scan event to be performed, and for analyzing data from the sense channels according to the specific scan event to be performed. The scan events can include, but are not limited to, a mutual capacitance scan, a self-capacitance scan, a stylus scan, touch spectral analysis scan, and stylus spectral analysis scan. The channel scan logic or other circuitry in touch circuitry 213 can provide the stimulation signals at various frequencies and phases that can be selectively applied to the touch node electrodes of touch screen 204 or used for demodulation of signals sensed by the sense channels (touch data). The touch circuitry 213 can also store touch data in memory (e.g., RAM) and/or process touch data (e.g., by one or more touch processors or touch controller) to determine locations of touch and/or clean operating frequencies for touch sensing operations (e.g., spectral analysis).

Touch screen 204 can be used to derive touch data at multiple discrete locations of the touch screen, referred to herein as touch nodes. For example, touch screen 204 can include touch sensing circuitry that can include a capacitive sensing medium having a plurality of electrically isolated touch node electrodes. Touch node electrodes can be coupled to touch and display integrated circuit 212 for touch sensing. As used herein, an electrical component "coupled to" or "connected to" another electrical component encompasses a direct or indirect connection providing electrical path for communication or operation between the coupled components. Thus, for example, touch node electrodes of integrated touch screen 204 may be directly connected to sense amplifiers in touch and display integrated circuit 212 or indirectly connected to sense amplifiers in touch and display integrated circuit 212 via switching circuitry (not shown), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when touch screen 204 is viewed as capturing an "image" of touch (or "touch image"). The touch image can be a two-dimensional representation of values indicating an amount of touch detected at each touch node electrode corresponding to a touch node in integrated touch screen 204. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 220 can be connected to program storage 218 to execute instructions stored in program storage 218 (e.g., a non-transitory computer-readable storage medium). Host processor 220 can, for example, provide control and data signals so that touch and display integrated circuit 212 can generate a display image on integrated touch screen 204, such as a display image of a user interface (UI). Host processor 220 can also receive outputs from touch and display integrated circuit 212 (e.g., touch inputs from the one or more touch processors) and perform actions based on the outputs. The touch input can be used by computer programs stored in program storage 218 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 220 can also provide control signals so that guard and power management integrated circuit 214 can operate touch and display integrated circuit 212 in the proper power domain and provide for communications between touch and display integrated circuit 212 and host processor 220. Host processor 220 can also perform additional functions that may not be related to touch processing and display.

Note that one or more of the functions described herein can be performed by firmware stored in memory (e.g., one of the peripherals in touch and display integrated circuit 212) and executed by one or more processors (in touch and display integrated circuit 212), or stored in program storage 218 and executed by host processor 220. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 200 is not limited to the components and configuration of FIG. 2A, but can include other or additional components in multiple configurations according to various examples. Additionally, the components of computing system 200 can be included within a single device, or can be distributed between multiple devices.

As described herein, in some examples, touch and display integrated circuit 212 can perform touch sensing operations (e.g., self-capacitance scans) in a guarded power domain rather than in the system power domain. In some examples, touch and display integrated circuit 212 can perform non-guarded touch sensing operations (e.g., mutual capacitance scans) or display operations in the system power domain. In some examples, touch and display integrated circuit 212 can perform display operations (e.g., refresh and/or maintaining state) in the guarded power domain and/or in the system power domain.

Figure 2B:
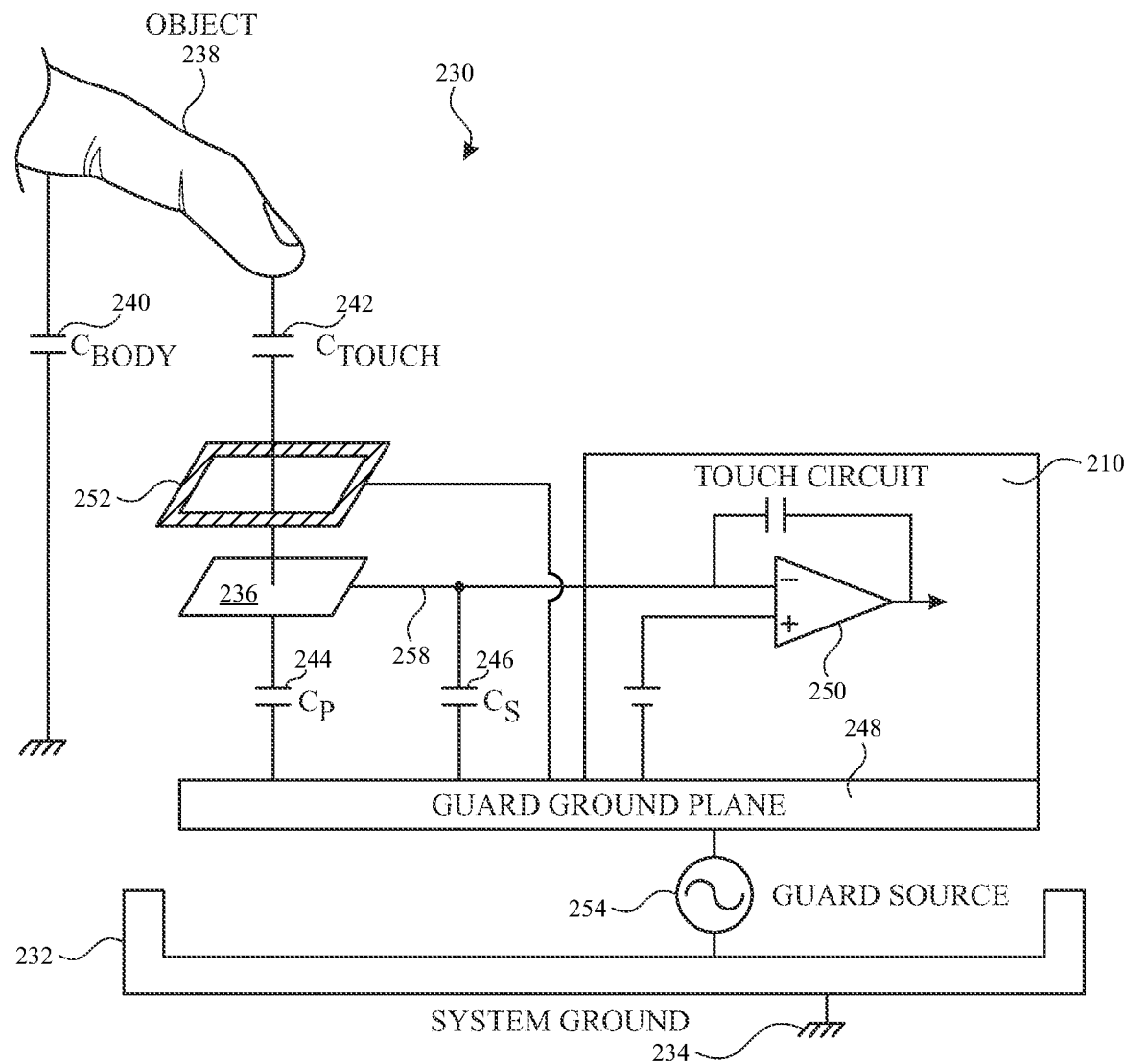
FIG. 2B illustrates an exemplary touch sensing configuration including various associated capacitances according to examples of the disclosure.

FIG. 2B illustrates an exemplary touch sensing configuration 230 including various associated capacitances according to examples of the disclosure. In configuration 230 of FIG. 2B, the touch sensing circuitry of touch screen 204 can be referenced to a guard ground rather than a system ground. Specifically, in configuration 230 of FIG. 2B, touch sensing circuitry (e.g., sense amplifier 250) in touch circuit 213 can be coupled to a touch node electrode 236 by a routing trace 258. Touch circuit 213 can be implemented in touch and display integrated circuit 212 disposed or fabricated on a substrate including a ground plane 248. During guarded operation, ground plane 248 (also referred to as "guard plane" or "guard ground plane") can be driven with a guard voltage such that it represents a guard ground. In guarded operation, guard ground plane 248 can represent a virtual ground plane of touch circuit 213 (and of touch and display integrated circuit 212) that is different from system ground 234 (also referred to herein as chassis ground, or device ground). In particular, stimulation source 254 ("guard source"), e.g., generated in guard and power management integrated circuit 214, can be referenced to system ground 234, and can output a guard voltage (e.g., a guard stimulation signal, such as a square or trapezoid wave) that can establish the voltage at guard plane 248. In this manner, the guard plane 248 acting as a guard ground for touch circuit 213 during guarded touch operations can be referenced to the guard voltage. Because touch circuit 213 can be mounted on a substrate including guard plane 248, the sense amplifier in touch circuit 213 can be referenced to the guard signal (and receive other guard-referenced voltages produced by guard and power management integrated circuit 214, for example), and can be isolated from system ground 234 by guard plane 248. In this way, touch circuit 213 can operate in the guard power domain, whereas the guard source 254 (e.g., in guard and power management integrated circuit 214) can operate in the system power domain. Guard plane 248 can be any conductive material of a substrate on which touch and display integrated circuit 212 can be disposed or fabricated (e.g., silver, copper, gold, etc.). For example, touch and display integrated circuit 212 may be assembled on a printed circuit board (PCB), and may be referenced to the PCB ground layer 248 driven, during guarded self-capacitance scans, by guard source 254. Guard source 254 can be implemented, for example, using a waveform generator (e.g., generating arbitrary waveforms, such as a square wave, referenced to system ground 234) whose output can be inputted in to a digital-to-analog converter (DAC). Analog output from the DAC can be provided to a linear buffer (e.g., with unity or some other gain) whose output can correspond to the output of guard source 254.

Additionally, guard plane 248 can be disposed between touch node electrode 236 and chassis 232 (or, more generally, chassis/system ground 234), and guard plane 248 can be disposed between a routing trace that couples touch node electrode 236 to touch circuit 213 and chassis 232 (or, more generally, chassis/system ground 234). Thus, guard plane 248 can similarly isolate touch node electrode 236 and routing trace 258 that couples touch node electrode 236 to touch circuit 210 from system ground 234. Guard plane 248 can reduce or eliminate parasitic or stray capacitances that may exist between touch node electrode 236 and system ground 234, as will be described below. Optionally, a guard plane can be included in a layer above the touch node electrodes and/or between touch node electrodes (e.g., as illustrated by guard plane 252) and can be referenced to the same guard voltage. Guard plane 252 can include openings corresponding to touch node electrodes to enable detection of touch activity on the touch sensor panel (or proximity activity) while guarding the touch node electrodes and routing from stray capacitances that can form due to a touch or other stray capacitances. In some examples, the material(s) out of which guard planes 248 and 252 are made can be different. For example, guard plane 252 above the touch node electrodes can be made of ITO, or another fully or partially transparent conductor), and guard planes 248 in the substrate (e.g., PCB) can be made of a different conductor, such as copper, aluminum, or other conductor that may or may not be transparent.

Various capacitances associated with touch and/or proximity detection using configuration 230 are also shown in FIG. 2B. Specifically, an object 238 (e.g., a finger) can be in touching or in proximity to touch node electrode 236. Object 238 can be grounded to earth ground (and the system ground 234 via the user holding the device chassis) through capacitance 240 (e.g., $C_{body}$), which can represent a capacitance from object 238 through a user's body to earth/system ground 234. Capacitance 242 (e.g., $C_{touch}$) can represent a capacitance between object 238 and touch node electrode 236, and can be the capacitance of interest in determining how close object 238 is to touch node electrode 236. Typically, $C_{body}$ 240 can be significantly larger than $C_{touch}$ 242 such that the equivalent series capacitance seen at touch node electrode 236 through object 238 can be approximately $C_{touch}$ 242. Capacitance 242 can be measured by touch sensing circuitry (e.g., sense amplifier 250) included in touch circuit 213 to determine an amount of touch at touch node electrode 236 based on the sensed touch signal. As shown in FIG. 2B, touch sensing circuitry in touch circuit 213 can be referenced to guard ground (e.g., with some DC biasing and supply voltages provided by the touch circuit 213 and/or guard and power management integrated circuit 214). In some examples, capacitance 244 (e.g., $C_p$) can be a parasitic capacitance between touch node electrode 236 and guard plane 248. Capacitance 246 (e.g., $C_s$) can be a stray capacitance between routing trace 258 coupled to touch node electrode 236 and guard plane 248, for example. In some examples, the impact of capacitances 244 and 246 on a sensed touch signal can be mitigated because guard plane 248 and touch sensing circuitry in touch circuit 213 are all referenced to the virtual ground signal produced by guard source 254 during a guarded self-capacitance scan.

When guarded, the voltage at touch node electrode 236 and trace 258 can mirror or follow the voltage at guard plane 248, and thereby capacitances 244 and 246 can be reduced or eliminated from the touch measurements performed by touch circuit 213. Without stray capacitances 244 and 246 affecting the touch measurements, the offset in the output signal of sense amplifier 250 (e.g., when no touch is detected at touch node electrode 236) can be greatly reduced or eliminated, which can increase the signal to noise ratio and/or the dynamic range of sense circuitry in touch circuit 213. This, in turn, can improve the ability of touch sensing circuitry in touch circuit 213 to detect a greater range of touch at touch node electrode 236, and to accurately detect smaller capacitances $C_{touch}$ 242 (and, thus, to accurately detect proximity activity at touch node electrode 236 at larger distances). Additionally, with a near-zero offset output signal from touch sensing circuitry in touch circuit 213, the effects of drift due to environmental changes (e.g., temperature changes) can be greatly reduced. For example, if the signal out of sense amplifier 250 consumes 50% of its dynamic range due to undesirable/un-guarded stray capacitances in the system, and the analog front end (AFE) gain changes by 10% due to temperature, the sense amplifier 250 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

Figure 2C:
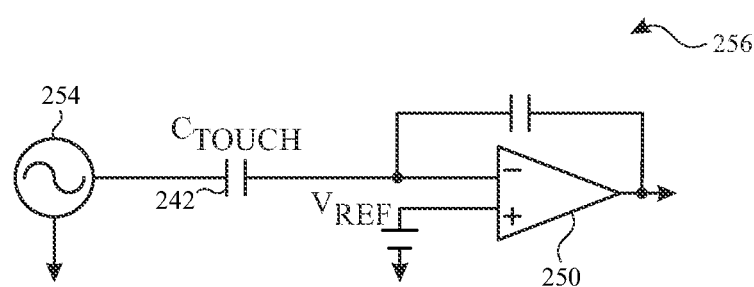
FIG. 2C illustrates an exemplary equivalent circuit diagram of an exemplary touch sensing configuration according to examples of the disclosure.
Figure 2E:
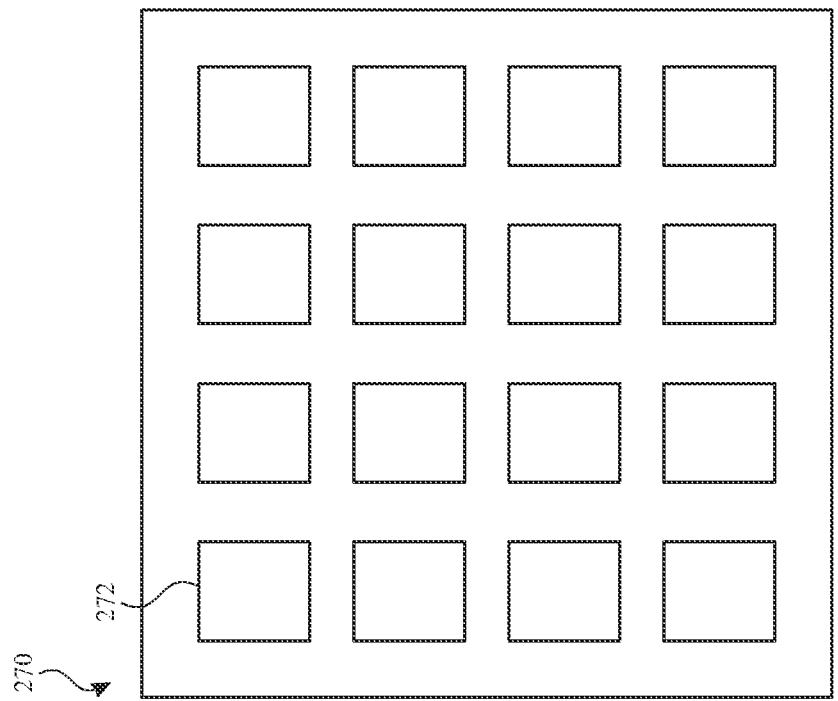
FIG. 2E illustrates touch screen with touch node electrodes arranged in a pixelated touch node electrode configuration according to examples of the disclosure.
Figure 2D:
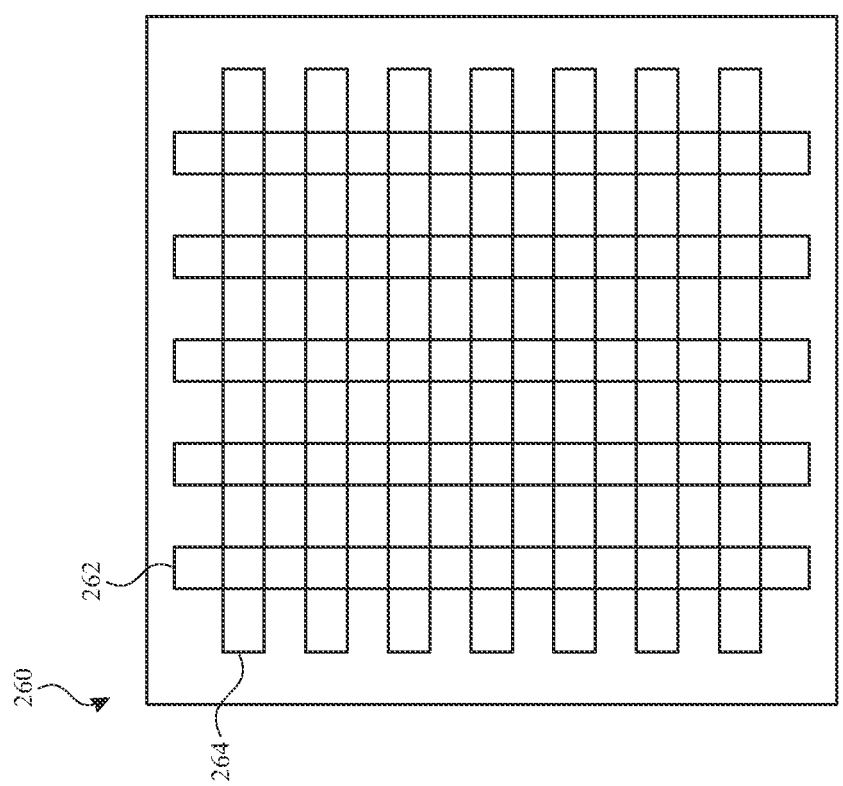
FIG. 2D illustrates touch screen with touch electrodes and arranged in rows and columns according to examples of the disclosure.

FIG. 2C illustrates an exemplary equivalent circuit diagram of an exemplary touch sensing configuration 256 according to examples of the disclosure. As described herein, guarding can reduce or eliminate capacitances 244 and 246 from the touch measurements performed by touch sensing circuitry in touch circuit 213. As a result, the sense amplifier 250 can simply detect $C_{touch}$ 242, which can appear as a virtual mutual capacitance between object 238 and touch node electrode 236. Specifically, object 238 can appear to be stimulated (e.g., via $C_{body}$ 240) by guard source 254, and object 238 can have $C_{touch}$ 242 between it and the inverting input of sense amplifier 250. Changes in $C_{touch}$ 242 can, therefore, be sensed by sense amplifier 250 as changes in the virtual mutual capacitance $C_{touch}$ 242 between object 238 and sense amplifier 250. As such, the offset in the output signal of sense amplifier 250 (e.g., when no touch is detected at touch node electrode 236) can be greatly reduced or eliminated, as described above. As a result, sense amplifier 250 (e.g., the input stage of touch circuit 213) need not support as great a dynamic input range that self-capacitance sense circuitry might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, touch circuit 213 can be designed with a simpler architecture to support both self-capacitance measurements and mutual capacitance measurements.

Referring back to FIG. 2A, integrated touch screen 204 can be integrated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

FIG. 2D illustrates touch screen 260 with touch electrodes 262 and 264 arranged in rows and columns according to examples of the disclosure. Specifically, touch screen 260 can include a plurality of touch electrodes 264 disposed as rows, and a plurality of touch electrodes 262 disposed as columns. Touch electrodes 264 and touch electrodes 262 can be on the same or different material layers of touch screen 260, and can intersect with each other while remaining electrically isolated from each other, as illustrated in FIG. 2D. In some examples, touch screen 260 can sense the self-capacitance of touch electrodes 262 and 264 to detect touch and/or proximity activity on touch screen 260, and/or in some examples, touch screen 260 can sense the mutual capacitance between touch electrodes 262 and 264 to detect touch and/or proximity activity on touch screen 260.

FIG. 2E illustrates touch screen 270 with touch node electrodes 272 arranged in a pixelated touch node electrode configuration according to examples of the disclosure. Specifically, touch screen 270 can include a plurality of individual touch node electrodes 272, each touch node electrode identifying or representing a unique location on the touch screen at which touch or proximity activity is to be sensed, and each touch node electrode being electrically isolated from the other touch node electrodes in the touch screen/panel, as previously described. Touch node electrodes 272 can be on the same or different material layers of touch screen 270. In some examples, touch screen 270 can sense the self-capacitance of touch node electrodes 272 to detect touch and/or proximity activity on touch screen 270, and in some examples, touch screen 270 can sense the mutual capacitance between touch node electrodes 272 to detect touch and/or proximity activity on touch screen 270.

In some examples, the touch and display integrated circuit (e.g., the touch and display integrated circuit 212) can be operated in multiple power domains. In some examples, touch and display operation can be time-multiplexed (e.g., as described below with reference to FIG. 3). An integrated touch and display integrated circuit (e.g., fabricated as a chip), for example, can operate in a guarded power domain during the touch operation and can operate in a system power domain during display operations. During the touch operation, the display pixels states can be maintained with reference to the guarded power domain and during the display operation, the display pixels can be refreshed with reference to the system power domain. In some examples, touch and display operation can be partially or fully concurrent (e.g., as described below with reference to FIG. 5A). The display pixels can be refreshed and/or display pixels states can be maintained with reference to the guarded power domain during the concurrent touch and display operation and can the display pixels can be refreshed and/or display pixels states maintained with reference to the system power domain during display operations that are not concurrent with touch operations. Operating the touch and display integrated circuit in the guarded domain during the touch operations can improve touch performance by reducing parasitic capacitances in the touch sensing system.

Figure 3:
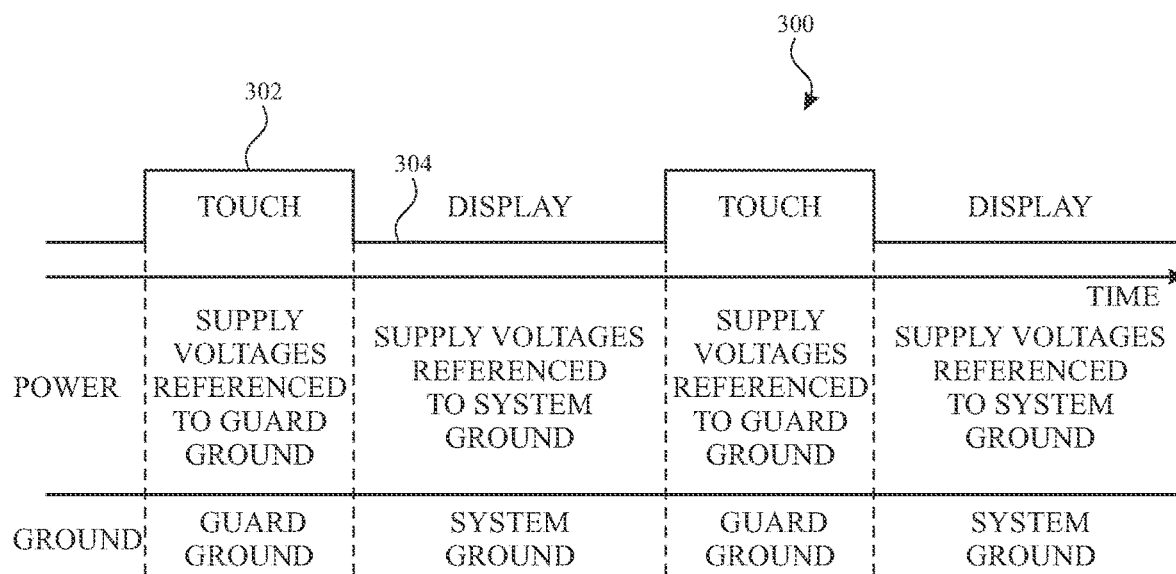
FIG. 3 illustrates an exemplary timeline for time-multiplexing touch and display operations and corresponding power domains for a device according to examples of the disclosure.

FIG. 3 illustrates an exemplary timeline 300 for time-multiplexing touch and display operations and corresponding power domains for a device according to examples of the disclosure. As illustrated, a touch mode 302 can be alternated with a display mode 304 such that the two modes can be mutually exclusive in time (non-concurrent). During touch mode 302, touch electrodes can be driven and/or sensed to detect objects touching and/or proximate to a touch screen of the device and the display can maintain an image (e.g., maintain the state of the display pixels). As illustrated below timeline 300, the touch and display integrated circuit can be operated in the guarded domain for guarded touch sensing scans (e.g., guarded self-capacitance scans) in which the ground for the touch and display integrated circuit can be guard ground and the touch and display integrated circuit can be powered by supply voltages referenced to guard ground. During display mode 304, the display can be refreshed to update the image on the display. As illustrated below timeline 300, the touch and display integrated circuit can be operated in the system domain for display operation in which the ground for the touch and display integrated circuit can be system ground and the touch and display integrated circuit can be powered by supply voltages referenced to system ground. The duration of each mode can be the same (or different), and can depend on other functions of the device. For example, touch mode 302 can occur while the display is not being refreshed (e.g., during inter-frame or intra-frame pauses in the display refresh, which may be of the same or different duration). In some examples, a touch image for the touch screen can be generated during touch mode 302 and one display image can be displayed on the touch screen during a display mode 304. In some examples, the multiple touch images for the touch screen can be generated during touch mode 302 and/or one or more display images can be displayed on the touch screen during the display mode 304. In some examples, the touch sensing can be divided among multiple touch mode periods during which a portion of a touch image can be generated and/or display refresh operations can be divided among multiple display mode periods during which a portion of the display can be updated.

Figure 4:
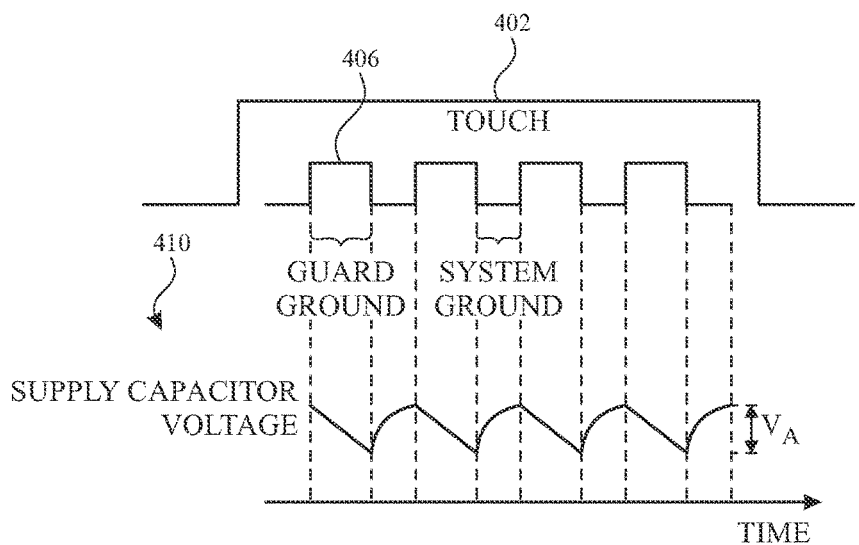
FIG. 4 illustrates an exemplary stimulation waveform during touch mode and a corresponding exemplary voltage waveform for a supply capacitor according to examples of the disclosure.

Although FIG. 3 illustrates operation of the touch and display integrated circuit in the guarded domain for the duration of touch mode 302, in some examples, rather than operating in the guarded domain for the duration of touch mode 302, touch and display integrated circuit can be operated in the guarded domain for a portion of touch mode 302 and in the system domain for a portion of touch mode 302. FIG. 4 illustrates an exemplary stimulation waveform during touch mode 402 (and a corresponding exemplary voltage waveform for a supply capacitor as described in more detail below) according to examples of the disclosure. As illustrated in FIG. 4, the stimulation waveform 406 applied during a touch mode 402 can be a square wave (although other waveforms are possible, such as a trapezoidal wave, etc.) with a low voltage level equal to system ground and a high voltage level equal to the guard signal voltage. Thus, when the stimulus is high, the touch and display integrated circuit can operated in the guarded domain, referenced to the guard voltage/ground, and when the stimulus is low, the touch and display integrated circuit can operated in the system domain referenced to the system ground. It is understood that although FIGS. 3-4 illustrate time-multiplexing touch and display operations that, in some examples, touch and display operation can be partially or fully concurrent. In such examples, touch and display integrated circuit may perform concurrent touch and display operations in the guarded domain (e.g., the ground for the touch and display integrated circuit can be guard ground and the touch and display circuitry can be powered by supply voltages referenced to guard ground). In such examples, the supply capacitor(s) may need to be designed to account for the larger power draw of operating both the touch and display operations in the guarded domain.

As described herein, operating in two power domains can require generating supply voltages for touch and display operation for two different power domains. In some examples, a power management circuit (e.g., an integrated circuit corresponding to guard and power management circuit 214) referenced to the system ground and referenced to guard ground can be used. The power management circuit can include system ground referenced direct-current to direct-current (DC-DC) converters and can include other voltage regulators and voltage generator circuits that can be system ground referenced or guard ground referenced to generate supply voltages for touch and display circuitry. The guard ground referenced supply voltages can be boot-strapped supplies using floating supply capacitors that can be decoupled from the system ground referenced DC-DC converters. Additional details regarding the power management circuit are provided below.

Figure 5:
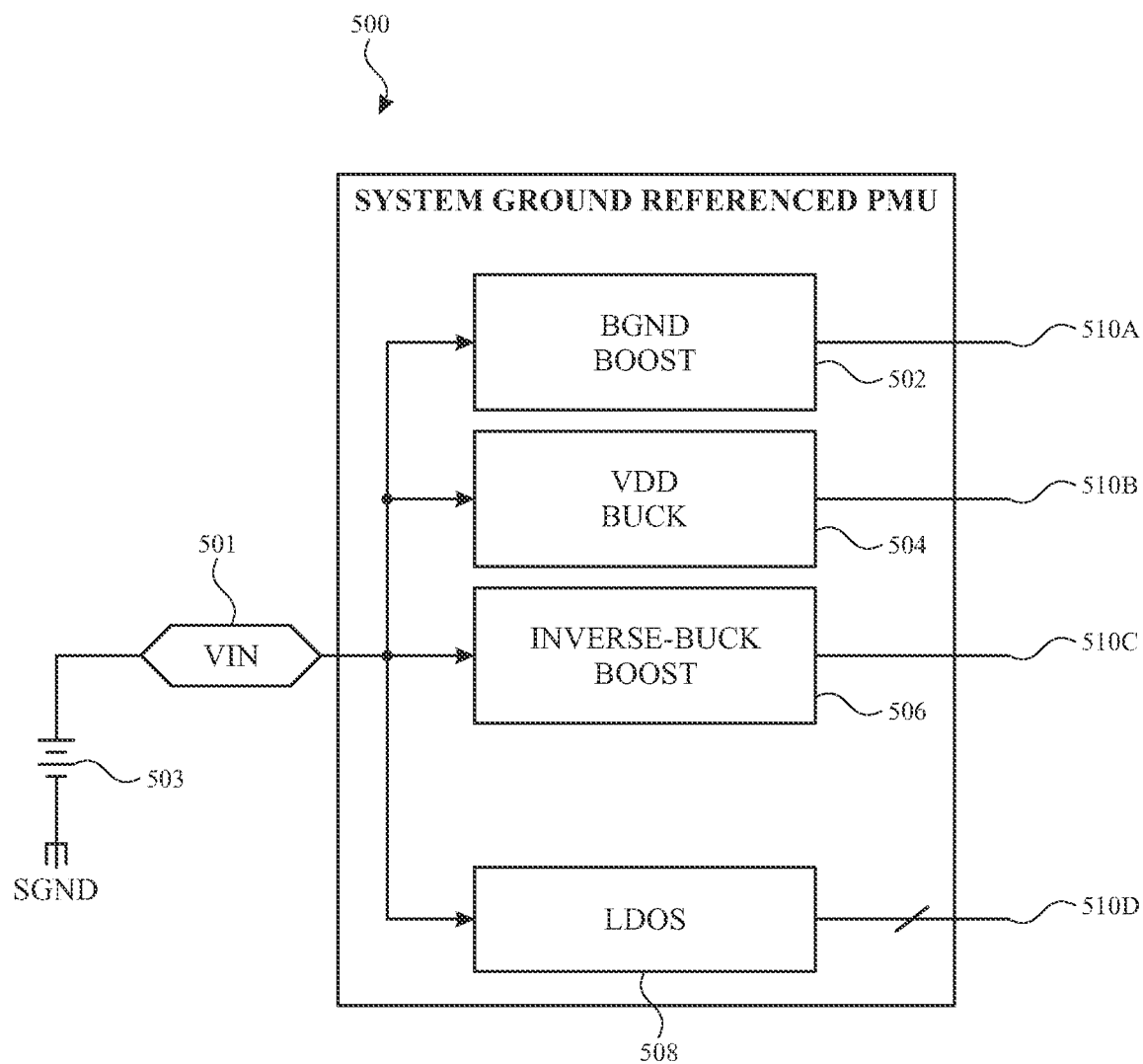
FIG. 5 illustrates a block diagram of a power management unit according to examples of the disclosure.

FIG. 5 illustrates a block diagram of a power management unit (PMU) 500 including DC-DC converters referenced to system ground according to examples of the disclosure. The PMU can represent a system ground referenced portion of a power management integrated circuit (PMIC). The PMIC can be configured to generate power supply voltages for touch and display operations in multiple power domains using outputs 510A-510D of the DC-DC converters of PMU 500. The DC-DC converters of PMU 500 can be configured to convert the voltage levels of one or more power sources (e.g., a battery) referenced to system ground and power to appropriate levels for powering components of an electronic device. For example, the PMU 500 can include a plurality of switched mode DC-DC converters including, but not limited to, a boost converter 502, buck converter 504, buck-boost and inverse boost converter 506. Boost converter 502, for example, can step the input voltage 501 (e.g., from battery 503) up to a higher voltage, providing a reference voltage that can drive a virtual ground node. Buck converter 504 can be used to lower the input voltage in order to charge one or more capacitors (e.g., supply capacitors). In some examples, PMIC can require one or more voltages lower than ground of the system for touch and display operations, described herein as a negative voltage. An inverse boost converter 506 can be used to generate a negative voltage from a positive input voltage with a magnitude greater than the input voltage. In some examples, the negative voltage can be further used as a negative supply rail for an amplifier circuit. In some examples, the PMU 500 can further include one or more low-dropout regulators (LDOs) 508 to step down an input voltage level to a lower output voltage for use by the PMIC or other circuitry in the system that operate in the system ground referenced domain. For example, voltages sourced from the output of the one or more LDOs can be used to power digital circuitry within the PMIC, such as digital memory, communication circuitry (e.g., SPI bus, watch dog timers, input/output circuitry, frequency locked loops, stimulation circuitry), digital voltage lines, etc. DC-DC converter outputs 510A-D of the system ground referenced PMU 500 can be routed to internal or external pins of the PMIC to provide electrical connections to supply power to additional components of the PMIC or other circuits in an electronic device including the PMIC.

Figure 6:
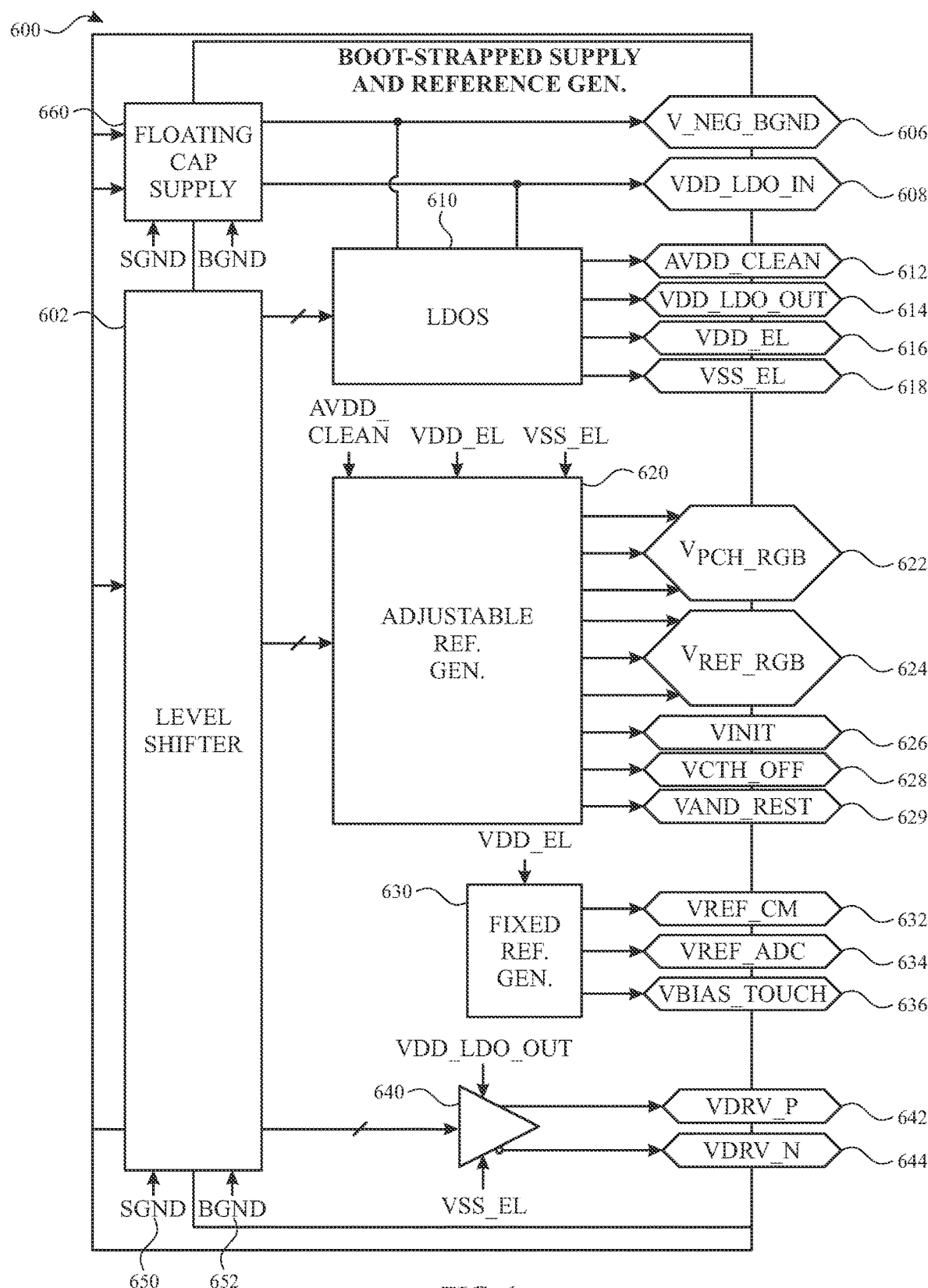
FIG. 6 illustrates a block diagram of an exemplary touch and display circuitry according to examples of the disclosure.

FIG. 6 illustrates a block diagram of an exemplary touch and display supply and reference voltage generator circuitry 600 according to examples of the disclosure. Touch and display supply and reference voltage generator circuitry 600 (also referred to herein SRVC for short) can be included in the PMIC (e.g., corresponding to guard and power management integrated circuit 214). SRVC 600 can operate in multiple power domains, such as in a guarded power domain referenced to guard ground or in a non-guarded power domain referenced to system ground. For example, SRVC 600 can use a plurality of bootstrapped supplies (e.g., floating capacitor supply 660) in the guarded power domain in place of a plurality of output voltages provided by system ground referenced PMU 500 that are used in the non-guarded power domains. SRVC 600 can also include level shifting circuitry 602, which can shift digital voltages levels between the system power domain and the guarded power domain as required to generate adjustable display voltages when SRVC 600 (and specifically the adjustable reference generator 620) is operating in the guarded domain. The level shifting circuitry 602 and floating capacitor supply 660 can be referenced to system ground 650 (e.g., indicated as the ground ("SGND") of the PMIC), or can be referenced to a guard ground 652 (e.g., indicated as "BGND" of the PMIC), also referred to herein as BGND 652. As described previously, the guarded ground, or BGND, can be a voltage different than system ground, which can be used to offset the potential of a plurality of voltages that are referenced to BNGD. The floating capacitor supply 660 and level shifter circuitry 602 can therefore toggle its ground reference between a guarded and a non-guarded power domain.

In some examples, floating capacitor supply 660 comprises one or more capacitors and one or more switches to enable powering touch and display circuitry with the one or more capacitors in a guarded mode (when the capacitor is floating and decoupled from the external source) and/or an external source in an unguarded mode. For example, the one or more capacitors of the floating capacitor supply can be used power touch and display operation in the guarded domain rather than, for example, a battery (e.g., battery 503). To reduce power draw on supply capacitors, operation in the guard domain can be limited to guarded touch operations (e.g., during touch mode 302 illustrated in FIG. 3). During non-guarded operation (e.g., during display mode 304 illustrated in FIG. 3), the device operation can be powered by an external source, such as a battery. Additionally, to further reduce the power draw the one or more supply capacitors, operation in the guarded domain can be limited to guard-high portions of touch operations (e.g., while the touch stimulation is high as illustrated in FIG. 4). In addition to reducing the size/costs of the supply capacitor because the total duration of power draw on the supply capacitor is reduced, the size/cost of the supply capacitor can be further reduced because by alternating charging and discharging of the supply capacitor (shorter power draw durations). For example, referring back to FIG. 4, plot 410 illustrates exemplary voltage of a respective one of the supply capacitors. In the guarded domain (when touch stimulation is high), the touch and display integrated circuit can draw power from the one or more supply capacitors. In the system domain (when touch stimulation is low), the touch and display integrated circuit can draw power from input voltage 501 and the one or more supply capacitors can re-charge. The change in voltage on the supply capacitor from charge and discharge can be relatively small due to the frequency of charging. In contrast, were the touch and display integrated circuit to draw power from supply capacitors during touch mode 302, without intermittent recharging, the change in voltage on the supply capacitor would require a larger capacitor to maintain the voltage. Floating capacitor supply 660 can be connected to the output of one or more DC-DC converters of system ground referenced PMU 500, such as a buck converter 504 and/or an inverse boost converter 506 as illustrated in FIG. 5.

In some examples, SRVC 600 can be configured to provide a plurality of reference voltages and/or supply rails. For example, the floating capacitor supply 660 can output voltage references connected to the output of the SRVC 600. For example, V_NEG_BGND 606 and VDD_LDO_IN 608 can correspond to the outputs of floating capacitor supply 660 from inputs corresponding to two or more DC-DC converters (e.g., corresponding to DC-DC converter outputs 510 from buck converter 504 and/or an inverse boost converter 506), which can be referenced to BGND. Additionally, one or more outputs of floating capacitor supply 660 can further be used as inputs to one or more low-dropout regulators 610. The low-dropout regulators 610 can be configured to supply a plurality of voltage outputs such as AVDD_CLEAN 612, VDD_LDO_OUT 614, VDD_EL 616, and VSS_EL 618. The low-dropout regulators 610 can be implemented to improve power parameters including, but not limited to, linearity, line and load regulation, temperature insensitivity, voltage and current stability, and to reduce noise. VDD_EL 616 and VSS_EL 618 can be used as positive and negative supply rails for components within the power management integrated circuit, but can also be connected to external components (e.g., touch and display circuitry). AVDD_CLEAN 612 and VDD_LDO_OUT 614 can represent positive supplies used by circuitry of the PMIC or by other components of an electronic including the PMIC described herein.

VDD_EL 616, for example, can be input to a fixed reference generator circuit 630. The fixed reference generator can create voltage references VREF_CM 632, VREF_ADC 634, and VBIAS_T 636, which can be used as reference voltages for touch circuitry. For example, VREF_ADC 634 can be a reference voltage for an analog-to-digital circuit configured to convert measurements from an amplifier (e.g., amplifier 250). VREF_CM 632 and VBIAS_T 636 can be used as bias and common mode references for the touch circuitry (e.g., amplifier 250). VSS_EL 618 can be configured to act as a negative supply rail of buffer amplifier 640 and additional circuitry of SRVC 600. In some examples, an adjustable reference generator circuit 620 can be configured to provide a plurality of outputs voltages to power and drive external circuitry (e.g., the display).

Referring now to adjustable reference generator circuit 620, a plurality of output voltages such as VPCH_RBG 622, VREF_RGB 624, VINIT 626, VCTH_OFF 628, VAND_REST 629 can be provided to external circuitry. In some examples, the outputs of adjustable reference generator circuit 620 can be adjusted based on values from level shifter circuitry 602 (e.g., provided by host processor 220). Adjustable reference generator circuit 620 can use supply rail voltages including AVDD_CLEAN 612, VDD_EL 616, and VSS_EL 618. The plurality of output voltages of can be configured to provide reference voltages to a display panel, for example.

Buffer amplifier 640 can generate two stimulation voltages VDRV_P and VDRV_N, which can represent positive and negative phase stimulation signals having the same frequency and amplitude. The stimulation voltages VDRV_P and VDRV_N can be used for multi-stimulus mutual capacitance stimulation scan (e.g., using a mutual capacitance scan as described with reference to FIG. 2D, but applying stimulation to multiple rows using the positive and negative phases of the stimulation voltage to code the contributions of sensed capacitance from each of the rows). The stimulation signal waveform can be generated digitally in the system ground domain and converted to an analog waveform in the system ground domain. The analog waveform can be provided as an input to buffer amplifier 640 by way of level shifter circuitry 602. In some examples, buffer amplifier 640 can use VSS_EL as a negative supply rail.

Figure 7:
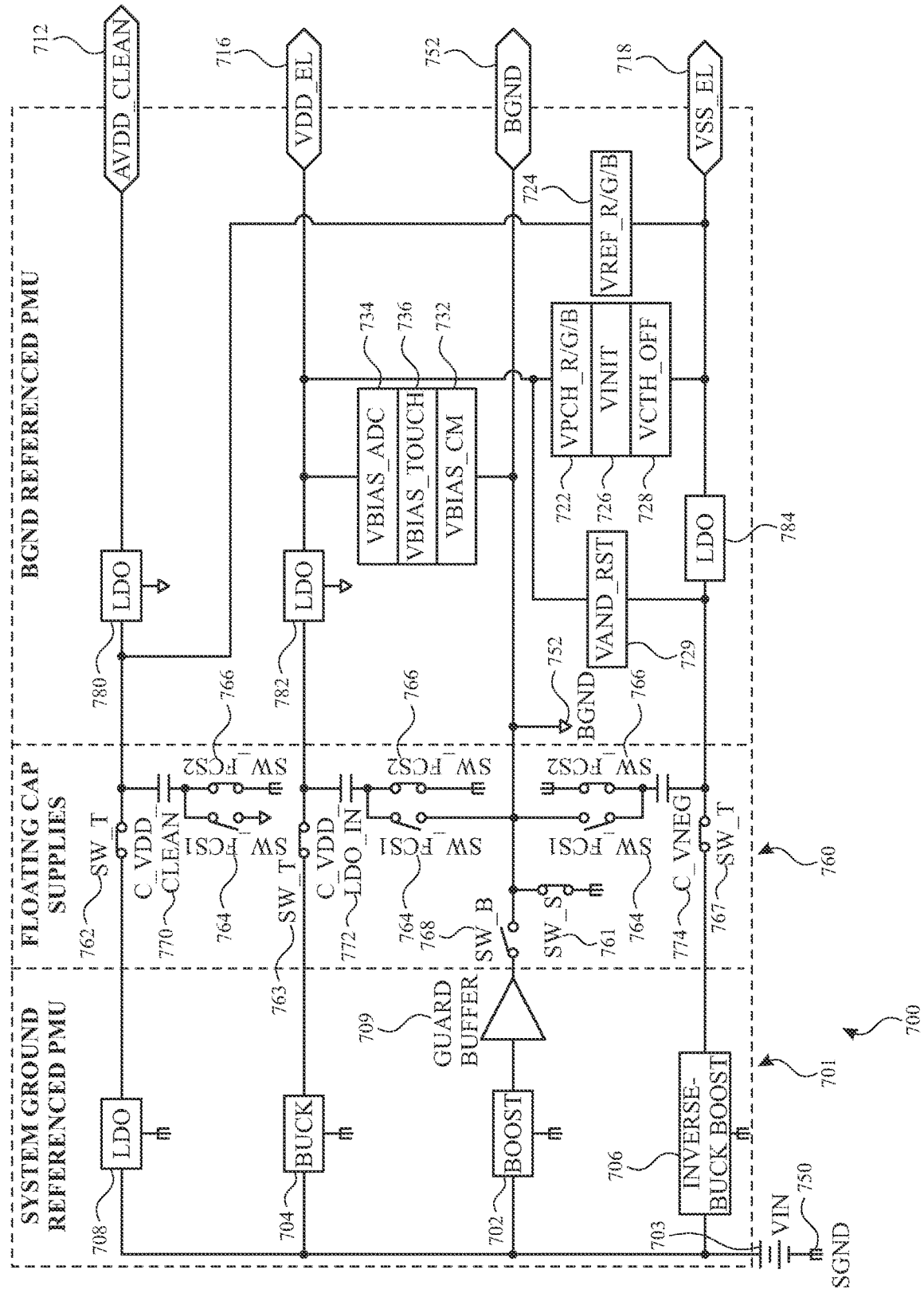
FIG. 7 illustrates an exemplary power supply topology according to examples of the disclosure.
Figure 8:
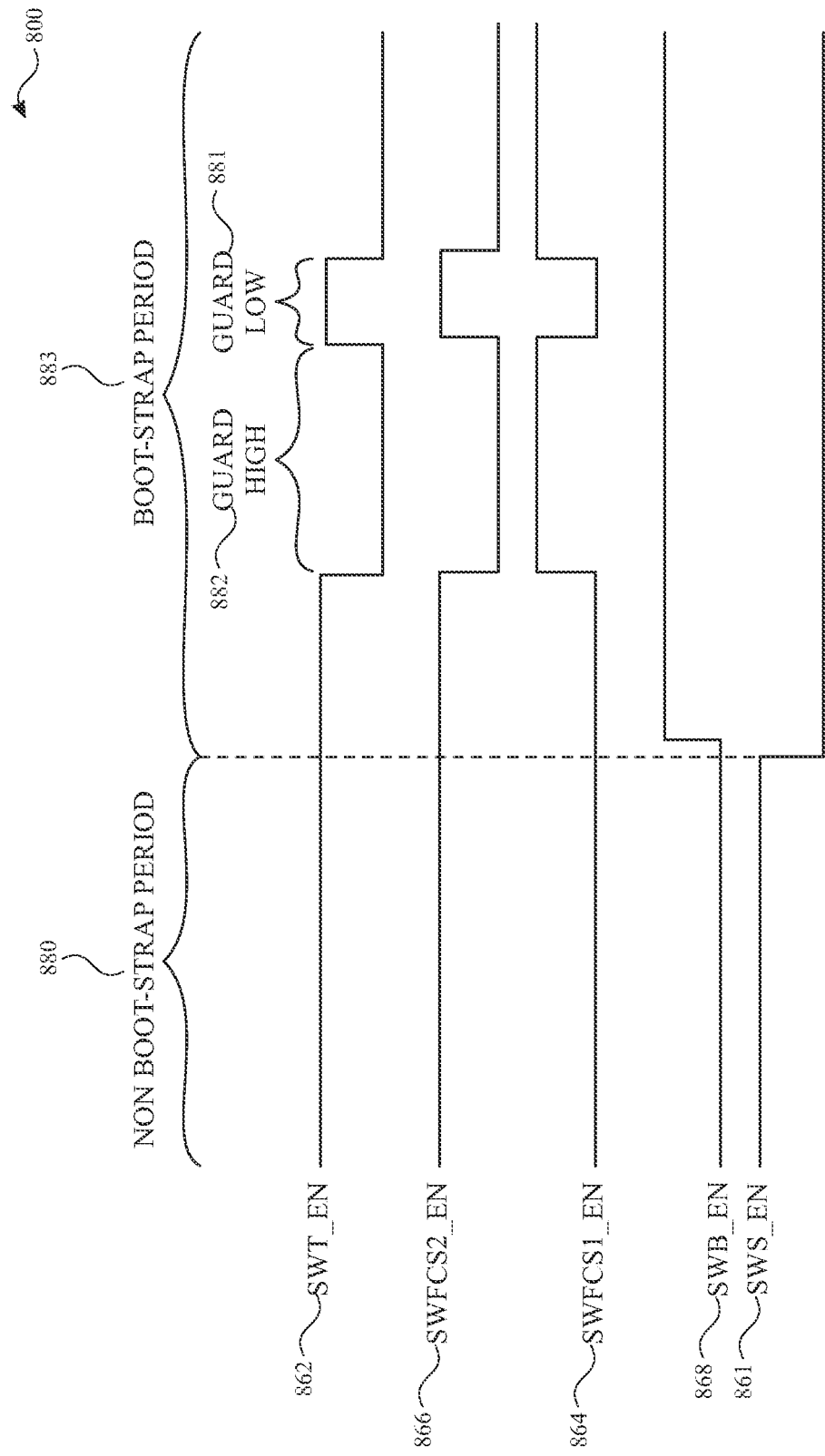
FIG. 8 illustrates an exemplary timing diagram according to examples of the disclosure.
Figure 9:
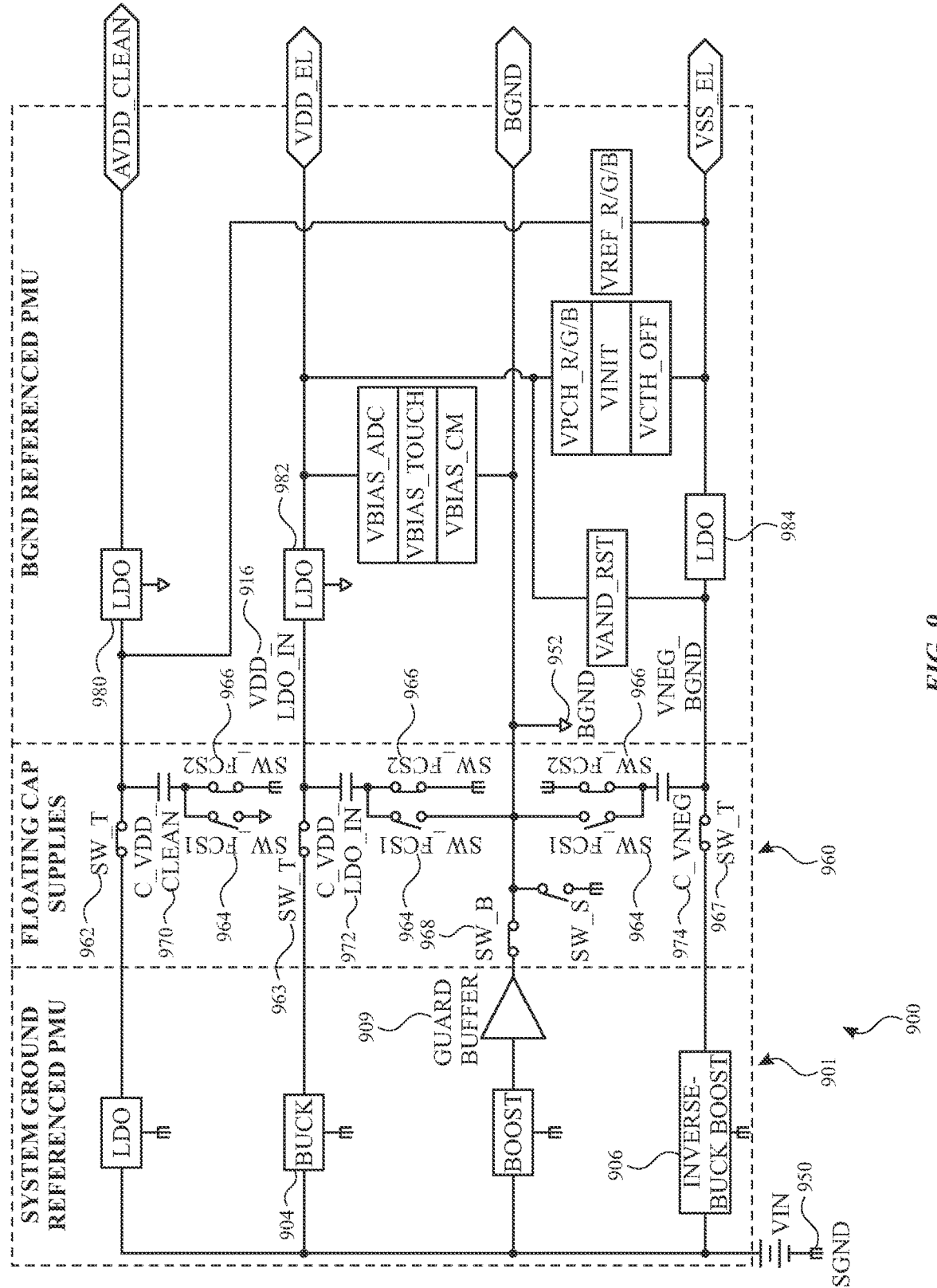
FIG. 9 illustrates an exemplary power supply topology according to examples of the disclosure.
Figure 10:
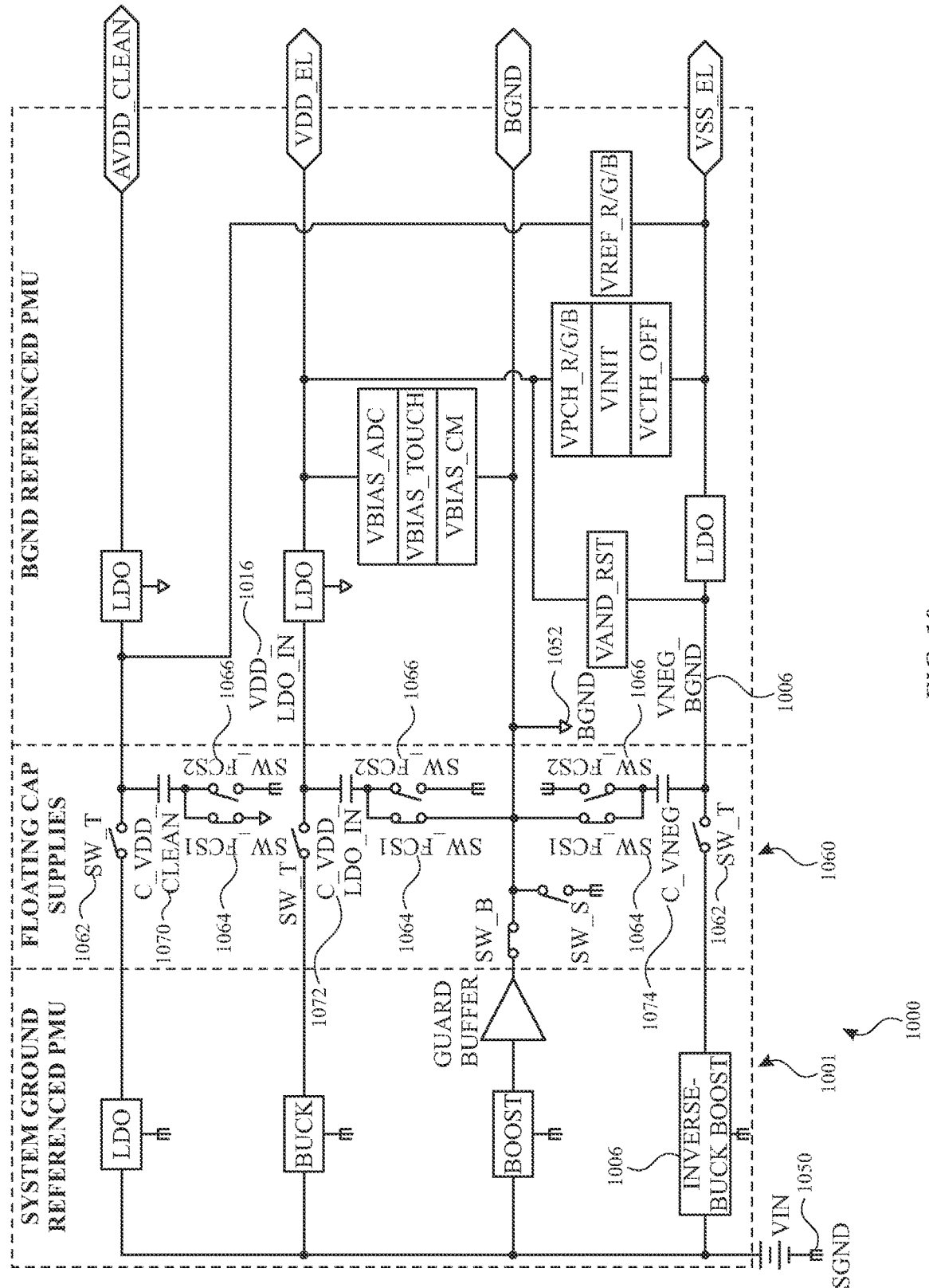
FIG. 10 illustrates an exemplary power supply topology according to examples of the disclosure.
Figure 11:
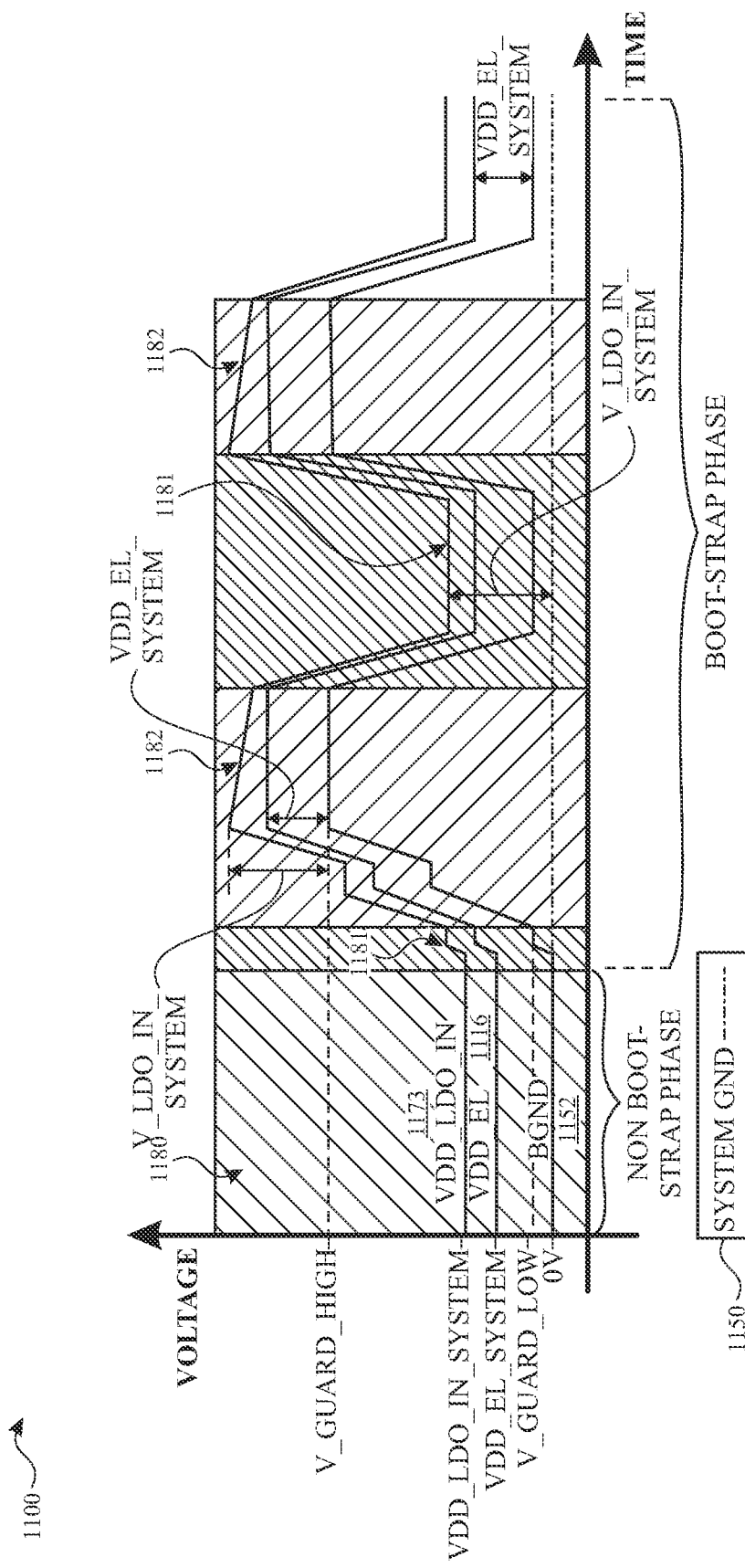
FIG. 11 illustrates exemplary voltage waveforms of a power supply topology according to examples of the disclosure.
Figure 12:
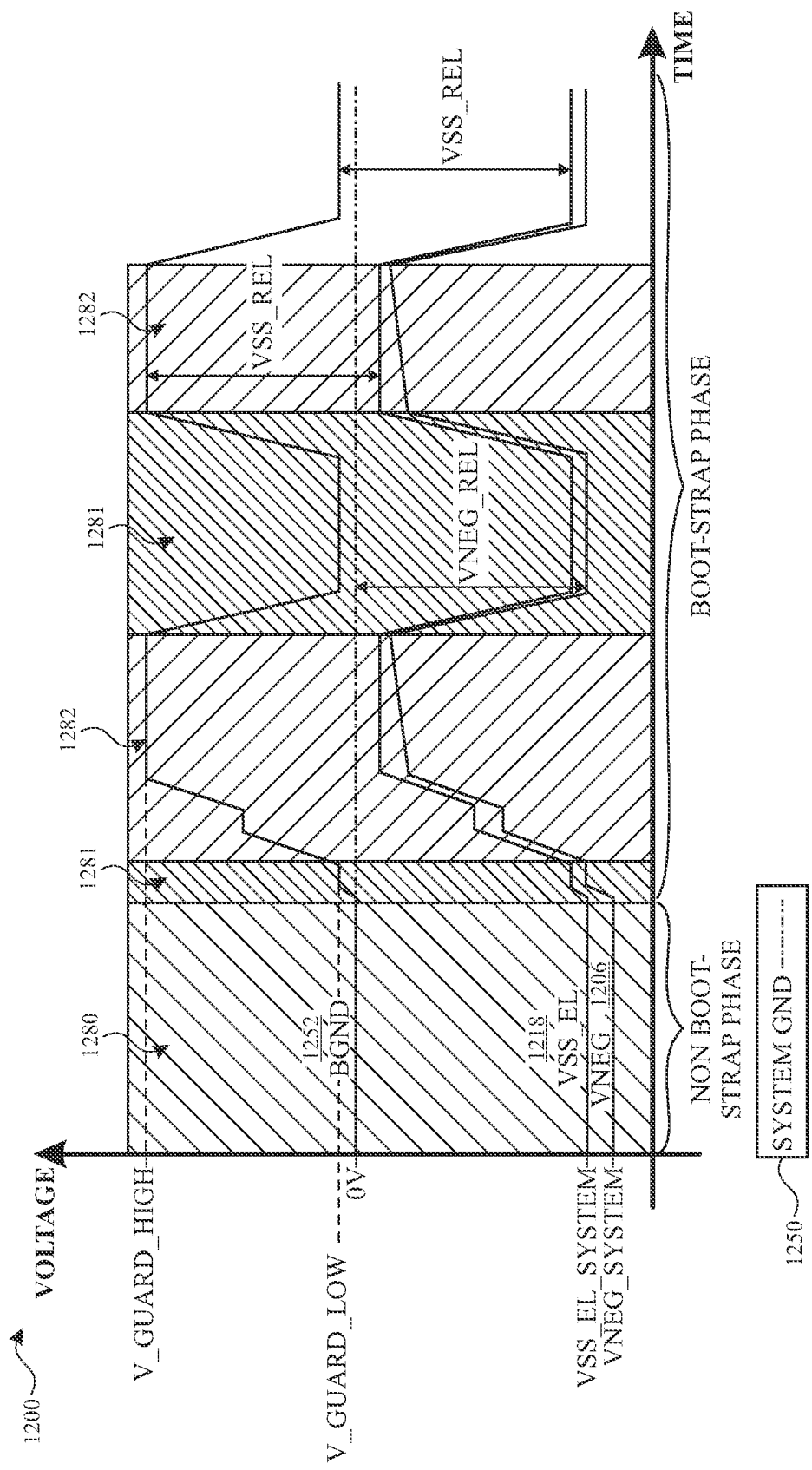
FIG. 12 illustrates exemplary voltage waveforms of a power supply topology according to examples of the disclosure.

As described herein, the guard and power management integrated circuit can be used to operate the touch and display integrated circuit in multiple power domains with appropriate supply voltages. In some examples, a plurality of supply rails can be configured to power both display and touch circuitry, despite differing power requirements, by time-multiplexing between the power domains. FIGS. 7, 9, and 10 illustrate an exemplary power supply topology configured to operate in multiple power domains and operating modes based on the arrangement of one or more switches and DC-DC converters according to examples of the disclosure. In particular, FIG. 7 illustrates the configuration of the power supply topology in the non-guarded power domain, FIG. 9 illustrates the configuration of the power supply topology in guarded power domain during guard low (e.g., a low guard source stimulus), and FIG. 10 illustrates the configuration of the power supply topology in guarded power domain during guard high (e.g., a high guard source stimulus). FIG. 8 illustrates an exemplary timing diagram of operation of the switches for the power supply topology according to examples of the disclosure. FIGS. 11 and 12 illustrate exemplary voltages distributed throughout the power supply topology during the various modes of operation according to examples of the disclosure.

FIG. 7 illustrates an exemplary power supply topology configured to operate in a non-guarded power domain, according to examples of the disclosure. The power supply topology can include a system ground referenced PMU 701 (e.g., corresponding to system ground referenced PMU 500), floating capacitor supply 760 (e.g., corresponding to floating capacitor supply 660), and a guard ground referenced PMU 705 (e.g., corresponding to LDOs 610, adjustable reference generator circuitry 620, fixed reference generator circuit 630, and buffer amplifier 640). PMU 701 can also include a guard buffer (e.g., corresponding to guard source 254) configured to generate the guard ground potential of BGND.

During non-guarded operation (e.g., during display mode 304 or non-guarded touch operation), supply capacitors 770, 772 and 774 can be charged from the system ground referenced PMU 701. In particular, power can be supplied from battery 703 referenced to system ground 750 to the DC-DC converters including a boost converter 702, a buck converter 704, an inverse buck boost converter 706 and one or more LDOs 708. The output of buck converter 704 can be coupled to charge supply capacitor 772 using switch 763 to the voltage level at the output of buck converter 704, the output of inverse buck boost converter 706 can be coupled to charge supply capacitor 774 using switch 767 to the voltage level at the output of inverse buck boost converter 706, and the output of one of the one or more LDOs 708 can be coupled to charge supply capacitor 770 using switch 762 to the voltage level at the output of LDO 708. During the non-guarded operation, supply capacitors 770, 772, and 774 can also be referenced to system ground 750 using switches 764.

In addition to charging supply capacitors 770, 772, and 774 of floating capacitor supply 760, during the non-guarded operation, the guard ground referenced PMU 705 can also use the system ground referenced DC-DC converter outputs to generate supply and reference voltages. For example, the output of LDO 708 can be coupled to LDO 780 via switch 762 (in the closed state), the output of buck converter 704 can be coupled to LDO 782 via switch 763 (in the closed state), and inverse buck boost converter 706 can be coupled to LDO 784 via switch 767 (in the closed state).

Similar to as described with reference to FIG. 6, the cascaded combination of buck converter 704 and LDO 782 can generate an output voltage node VDD_EL 716 (e.g., corresponding to VDD_EL 616), which can be used as a supply rail for touch and display circuitry. While power management integrated circuit 700 is configured as shown, the supply capacitor 772 can draw charge from the battery 703 while maintaining a stable output voltage at node VDD_EL, such that operation of touch and/or display circuitry can remain stable independent of whether power is provided from the battery or supply capacitors. In a similar manner, the supply capacitor 770 can draw charge from battery 703 while maintaining a stable output voltage at voltage node AVDD_CLEAN 712, such that operation of circuitry in a device including PMIC 700 can be achieved with a stable supply rail with a relatively clean (e.g., low noise) frequency response, compared to voltage nodes driven by a DC-DC converter. Using LDO 708 can result in less noise because LDOs do not operate with rapid switching of elements within a switched-mode DC-DC converter, for example. In a similar manner, the supply capacitor 774 can draw charge from battery 703 while maintaining a stable output voltage at node VSS_EL 718 using LDO regulator 784 to generate a stable negative supply rail for touch and display circuitry.

During the aforementioned non-guarded operation, the plurality of supply capacitors can be coupled to system ground 750 via switches 766. Switches 764 and switch 768 can be left to open or configured in a high-impedance state. Additionally, while operating in the non-guarded domain, BGND node 752 can be connected to system ground 750 via switch 761 in order to couple the BGND node to the same potential as system ground. Thus, in non-guarded operation the touch and/or display operations can be referenced entirely to system ground. In some examples, during non-guarded operation, guard buffer 709 (e.g., corresponding to guard source 254) can be turned off (e.g., to save power) or the output can be in a high impedance state or coupled to the system ground voltage. Similarly, boost converter 702 that powers guard buffer 709 can be turned off (e.g., to save power) or put into a low power and/or high impedance state.

In some examples, as described with respect to FIG. 6, the power management integrated circuit can be configured to provide voltages across several nodes, giving a system designer access to a variety of power sources for circuitry having different requirements. The voltage across nodes for VDD_EL 716 and GND 752, for example, can provide supply rails used to generate three voltage references for operating touch circuitry including VREF_CM 732, VREF_ADC 734, and VBIAS_T 736 (e.g., corresponding to VREF_CM 632, VREF_ADC 634, and VBIAS_T 636 generated by fixed reference generator circuit 630). Again referring back to FIG. 6, adjustable reference generator circuit 620 can generate a plurality of output voltages such as VPCH_RBG 622, VREF_RGB 624, VINIT 626, VCTH_OFF 628, VAND_REST 629. The corresponding output voltages are represented in FIG. 7 using two positive supply rails and two negative supply rails. For example, VPCH_RBG 722, VINIT 726, and VCTH_OFF 728 (e.g., corresponding to VPCH_RBG 622, VINIT 626, and VCTH_OFF 628) can be generated using VDD_EL 716 as a positive supply rail and VSS_EL 718 as a negative supply rail. VREF_RGB 724 (e.g., corresponding to VREF_RGB 624) can be generated using the input of LDO 780 (or using AVDD_CLEAN 712) as a positive supply rail and VSS_EL 718 as a negative supply rail. VAND_REST 729 (e.g., corresponding to VAND_REST 629) can be generated using VDD_EL 716 as a positive supply rail and the input to LDO 784 (or using VSS_EL 718) as a negative supply rail. It should be understood that the output voltages represented in FIG. 7 in block form can include multiple lines. For example, VPCH_RBG 722 can represent separate lines generate voltage references to drive the red, green, and blue components of display pixels.

FIG. 8 illustrates an exemplary timing diagram 800 representing states of a plurality of switches as illustrated in FIGS. 7, 9 and 10 according to examples of the disclosure. In FIG. 8, switch state for signals corresponding to SWT_EN 862, SWFCS2_EN 866, SWFCS1_EN 864, SWB_EN 868, and SWS_EN 861 are illustrated as active high switches (e.g., switches are in a closed position when the timing diagram is at a higher of two (or more) logic levels), but it is understood that the configuration of switches is not limited to an active high configuration (e.g., some switches could alternatively be implemented to be in a closed state when the timing signal is brought to a low logic level). FIG. 8 divides the timing diagram into different operating modes including a non-guarded operation (also referred to herein as non-bootstrapped operation) in period 880 and guarded operation (or bootstrapped) in period 883. As described herein, period 883 can include a guard-low operating phase 881 and a guard-high operating phase 882.

The switch configurations for the non-guarded operation of power management integrated circuit 700 is represented in period 880. For example, during non-bootstrapped period 880 switch control signals SWT_EN 862, SWFCS2_EN 866, and SWS_EN 861 are enabled, which can correspond to configuring the switches in a closed position, and switch control signals SWFCS1_EN 864 and SWB_EN 868 are disabled, which can correspond to configuring the corresponding switches in an open position. SWT_EN 862 can correspond to a control for switch 762, 763 and 767, SWFCS2_EN 866 can correspond to a control for switches 766, and SWS_EN 861 can correspond to a control for switch 761, such that when these switches are enabled, floating capacitor supplies 760 and BGND can be system ground referenced. SWFCS1_EN 864 can correspond to a control for switches 764 and SWB_EN 868 can correspond to a control for switch 768, such that when these switches are disabled, the guard buffer 709 and floating capacitor supply 760 can be decoupled from BGND. As described previously, the non-bootstrapped operation can comprise operating in a non-guarded power domain (e.g., referenced to system ground), allowing a plurality of supply capacitors to be charged via a system ground referenced PMU and a plurality of switches.

FIGS. 9 and 10 illustrate an exemplary power supply topology configured to operate in a guarded power domain according to examples of the disclosure. The circuit components of FIGS. 9 and 10 can be the same as FIG. 7 (and reference designators for these figures are the same except for the most significant digit), but use different configurations (e.g., of switches). Power management integrated circuit 900 can correspond to power management integrated circuit 700, but have a different configuration of switches. The switching configuration as illustrated in FIG. 9 can correspond to the portion of timing diagram 800 during the guard-low operating phase 881 in FIG. 8. During a guard-low operating phase 881, switches 962, 963 and 967 (e.g., corresponding to switches 762, 763 and 767) can be in the closed position as indicated by SWT_EN 862 in timing diagram 800. Thus, during a guard-low operation, the power switches can continue allowing system ground referenced PMU 901 (e.g., corresponding to system ground referenced PMU 701) to charge a plurality of supply capacitors in floating capacitor supply 960 (e.g., corresponding to floating capacitor supply 760). A plurality of switches SW_FCS2 966 (e.g., corresponding to switches 766) also remain in the closed position and a plurality of switches SW_FCS1 964 (e.g., corresponding to switches 764) remain in the open position (or in a high impedance state) so that the plurality of supply capacitors remains referenced to system ground and not BGND, as indicated by SWFCS2_EN 866 and SWFCS1_EN 864 in timing diagram 800.

However, unlike the non-guarded operation, a guard source can drive BGND 952. Accordingly, switch 968 (e.g., corresponding to switch 768) connects a guard buffer 909 (e.g., a power amplifier) to BGND and decouples BGND from the system ground using switch 961 (e.g., corresponding to switch 761), as indicated by SWB_EN 868 and SWS_EN 861 in timing diagram 800 for guard-low operation. For example, as described previously, operation in a guarded power domain can include driving a guard plane to a voltage (other than system ground). Guard and power management integrated circuit 900 can include a guard buffer 909 (e.g., corresponding to guard buffer 709, guard source 254, etc.) referenced to system ground and configured to generate a guard signal at its output. In some examples, the guard signal can be a square or trapezoid wave with a low voltage at system ground and a high voltage at a positive voltage (e.g., corresponding to the output of boost converter 502).

For example, while operating in the guarded domain during a guard-low operating phase e.g., 881, guard buffer 909 can output a signal that is different than system ground 950 (e.g., 100 mV, 200 mV, etc. above system ground). In some examples, the power management integrated circuit 900 can increase the output of the DC-DC converters in order to track changes to BGND 952 and maintain constant voltages for the circuitry (e.g., touch and/or display) external to the power management integrated circuit 900. For example, at the same (within a threshold of the same time), system ground referenced PMU 901 can raise the output of one or more constituent switched mode DC-DC converters (e.g., buck converter 904, inverse buck-boost converter 906) such that voltages across the one or more supply capacitors (e.g., supply capacitors 970, 972, and 974) can remain constant between the non-guarded and guard-low modes of operation. Thus, from the perspective of touch and display circuitry, the relative differences between voltage nodes (e.g., reference voltages and/or supply rails) more or less remain constant between non-guarded and guard-low modes of operation, while the absolute input voltages may change.

Power management integrated circuit 1000 can correspond to power management integrated circuit 700 and 900, but have a different configuration of switches. The switching configuration as illustrated in FIG. 10 can correspond to the portion of timing diagram 800 during the guard-high operating phase 882 in FIG. 8. Unlike during the guard-low configuration, switches 1062, 1063 and 1067 (e.g., corresponding to switches 762, 763 and 767) can be in the open state or in a high impedance state as indicated by SWT_EN 862 in timing diagram. Additionally, a plurality of switches 1066 (e.g., corresponding to switches 966) can be configured in an open or high impedance state and a plurality of switches 1064 (e.g., corresponding to switches 964) are configured in the closed state so that the plurality of supply capacitors 1070, 1072 and 1074 (e.g., corresponding to supply capacitors 770, 772 and 774) can be referenced BGND and not system ground, as indicated by SWFCS2_EN 866 and SWFCS1_EN 864 in timing diagram 800. Guard buffer 1009 (e.g., corresponding to guard buffer 709) can be connected to BGND by switch 1068 and BGND can be decoupled from the system ground using switch 1061, as indicated by SWB_EN 868 and SWS_EN 861 in timing diagram 800 for guard-high operation. Guard buffer 1009 (e.g., an amplifier) can drive BGND 1052 via switch 1068 with a voltage with a magnitude above system ground. For example, the guard buffer output can be raised to 5V (or within a threshold of 5V) above the guard-low buffer output as described in more detail with respect to the waveforms of FIGS. 11 and 12.

As described herein, in some examples, during the guard-high operation, capacitors 1070, 1072, and 1074 can be referenced to BGND 1052 and decoupled from system ground to create a bootstrapped power supply. Bootstrapping, as described herein, can refer to using one or more storage elements (e.g., capacitors) to create one or more voltage rails that are referenced outside the system power domain. For example, during the guarded mode of operation, whether BGND is driven to a guard-low voltage or a guard-high voltage, supply capacitors 1070, 1072, and 1074 that are referenced to BGND and not system ground, can provide power to generate guard domain reference voltages that are decoupled from system ground. As explained above with reference to FIG. 4, the supply capacitors can have some ripple due to discharge from supplying power when operating in the guard power domain. The plurality of supply capacitors can provide stable voltage references and supply rails to touch and display circuitry independent of the power domain because whether system power domain referenced (to system ground and battery) or guard power domain referenced (to guard ground and floating supply capacitors), the e.g., the relative voltages between output of LDOs (e.g., 780/980/1080, 782/982/1082, 784, 984, 1084) can remain the same, assuming that the inputs to these LDOs provides enough headroom for operation.

Referring back to FIG. 8, the transition from the non-bootstrapped period 880 to the bootstrapped period 883 can include changing whether BGND is grounded to system ground or driven by a guard buffer. For example, SWS_EN 861 can open the connection between a guard ground node and the system ground and SWB_EN 868 can close the connection between a guard buffer and the guard ground node in preparation for application of signal drive from the guard buffer. In some examples, the transition from the system ground domain to the guard ground domain can sequence these switches to avoid grounding the output of the guard buffer system ground (e.g., to avoid damaging components and/or wasting power during an overcurrent or overvoltage condition). For example, a time delay can be introduced between closing/opening switches controlled by SWS_EN 861 and SWB_EN 868, such that switch 761 opens before switch 768 closes. In some examples, the sequence can be reversed such the guard buffer is decoupled from BNGD before shorting BGND to system ground when returning to the non-bootstrapped period.

In some examples, the operation of switches can also be sequenced during the bootstrapped period 880, when switching between the guard-low operating phase 881 and guard-high operating phase 882. In some examples, floating capacitor supplies can similarly be decoupled from system ground before being coupled to guard ground for guard-high operation and then decoupled from the guard ground before being coupled to system ground for guard-low operation. This sequencing is indicated in FIG. 8 by SWFCS2_EN 864 toggling low before SWFCS1_EN 866 toggling high when entering the guard-high operating phase 882 and reversing when entering the guard-low operating phase 881. It should be understood that timing diagram 800 is illustrative, but that different timing is possible (e.g., different sequencing, no sequencing, etc.). In some examples, the switches can close earlier or later to optimize power efficiency and/or avoid possible improper operation resulting in noise, damage, unpredictable system behavior, etc.

FIGS. 11-12 illustrate representative voltage waveforms during multiple operating modes and the corresponding power domains of a power management integrated circuits configured to drive touch and display circuitry. In some examples, the voltage waveforms depicted in diagrams 1100 and 1200 can represent supply rails and voltage references used to operate a floating capacitor supply (e.g., corresponding to floating capacitor supply 660, 760, 960, 1060) referenced to system ground or guard ground. In particular, diagram 1100 illustrates a positive rail at an input to an LDO (e.g., LDO 782) and a positive supply rail VDD_EL (e.g., corresponding to VDD_EL 616, 716, etc.) generated by an LDO (e.g., LDO 782). Diagram 1200 illustrates a negative supply rail at an input to an LDO (e.g., LDO 784) and a negative supply rail VSS_EL 1218 (e.g., corresponding to VSS_EL 618, 718, etc.) For example, VDD_LDO_IN 1173 can correspond to a voltage measured at the output of a buck converter (e.g., buck converter 704), the voltage measured by supply capacitor (e.g., supply capacitor 772), and/or the voltage input to a low-dropout regulator (e.g., LDO 782). VDD_EL 1116 can correspond to a voltage measured at the output of a low-dropout regulator (e.g., LDO 782) that can be driven by the buck converter referenced to system ground 1150 or the supply capacitor referenced to system ground 1150 and/or BGND 1152, and can be configured to be a positive voltage supply rail for touch and display circuitry. As described herein, BGND 1152 can correspond to the voltage at a virtual ground node (e.g., BGND 752), with an offset with respect to system ground 1150. VNEG 1206 can correspond to voltage measured at the output of an inverse buck-boost converter (e.g., inverse buck-boost converter 706), the voltage measured at a supply capacitor (e.g., supply capacitor 774) and/or the voltage input to a low-dropout regulator (e.g., LDO 784). VSS_EL 1218 can correspond to a voltage measured at the output of the low-dropout regulator (e.g., LDO 784), and can be configured to be a negative voltage supply rail for touch and display circuitry, with reference to system ground 1250 or BGND 1252.

The waveforms in diagrams 1100 and 1200 are illustrated in non-guard and guarded operation. Time periods 1180 and 1280 can correspond to a non-guarded operation where the PMIC can be configured to operate touch and display circuitry with reference to system ground 1150/1250. For example, time periods 1180 and 1280 can illustrate voltage levels within the PMIC during mutual capacitance touch sensing and/or display operation. As previously described with respect to FIG. 7, non-guarded operation can comprise coupling BGND to system ground such that the waveform for BGND can be held at system ground (e.g., 0V) for the duration of time periods 1180 and 1280. During non-guarded operation, the system can operate in the system power domain with voltages referenced to system ground, and can draw power from a relatively large system power supply (e.g., battery 703 can have relatively large capacity compared with supply capacitors of floating capacitor supplies 760). Although the illustrated voltages in time periods 1180 and 1280 appear to be steady state voltages, it is understood that, in some examples, the voltages can be different.

Time periods 1181 and 1281 can correspond to operation of the PMIC in the guarded domain during a guard-low operating mode. During guard-low operation BGND 1152/1252 can be driven to a guard-low voltage output by guard buffer (e.g., guard buffer 909) as indicated by the ramping up of the BGND waveforms from system ground to guard low. In some examples, voltages VDD_LDO_IN 1173 and VNEG 1206, which are referenced to BGND can similarly increase to maintain relative voltages when transitioning between operating modes (e.g., transitioning from a non-guarded, to guarded low operating mode). As seen in FIG. 9, a PMU (e.g., system ground referenced PMU 901) can be referenced to system ground, while a plurality of LDOs can be referenced to guard ground when the power management integrated circuit is configured to operate in a guard-low operating mode. A typical LDO requires a headroom voltage, or the difference between its output and input voltages, to exceed a specified value at all times in order to ensure that the LDO will meet its operating specifications. Thus, to preserve headroom for the plurality of LDOs, outputs of the system ground referenced PMU can be adjusted during the guard-low operating mode. For example, VDD_LDO_IN and VNEG can raised during time periods 1181 and 1281 when compared to the voltage level during time periods 1180 and 1280. As illustrated in FIGS. 11 and 12, VDD_EL 1116 and VSS_EL 1218 can follow the changes in VDD_LDO_IN 1173 and VNEG 1206 and remain stable from the perspective of the touch and display circuitry while BGND changes from system ground to the guard-low voltage.

Time periods 1182 and 1282 can correspond to operation of the PMIC in the guarded domain during a guard-high operating mode. For example, BGND voltages 1152 and 1252 during time periods 1182 and 1282 can be raised to a guard-high voltage (e.g., using one or more ramp up steps of the trapezoidal wave). During guard-high operation, voltage nodes depicted in FIGS. 11 and 12 can be referenced to BGND (e.g., BGND 1152 and 1252). Thus, as BGND varies during time periods 1182 and 1282, the voltage waveforms can track the changes in BGND voltage. As described herein, during guard-high operation, the power rails for the touch and display circuitry can be powered using supply capacitors of the floating capacitor supply (e.g., floating capacitor supply 1060). The plurality of supply capacitors can be charged to a voltage that is high enough to sustain operating margins for the LDOs as the supply capacitors are charged. For example, as shown in FIG. 10, the supply capacitors can drive a plurality of LDOs, each LDO requiring some amount of operating headroom (e.g., 100-300 millivolts). The plurality of floating capacitors can be charged during a period prior to guard-high operation (e.g., during guard-low operation and/or during non-guarded operation) to account for discharge of the plurality of capacitors, and the accompanying output voltage drop.

As described herein, to provide a plurality of stable output voltage sources, the plurality of LDOs in the PMIC can receive input voltages that provide enough headroom. Although it can be advantageous to provide headroom voltage at the input of the one or more LDOs, an excess input voltage can reduce overall efficiency of the power management integrated circuit. In some examples, while operating in the non-guarded power domain, a supply rail voltage can be held at a first, lower level and then the supply rail voltage can be increased before transitioning to the guarded power domain to optimize power efficiency.

Figure 13:
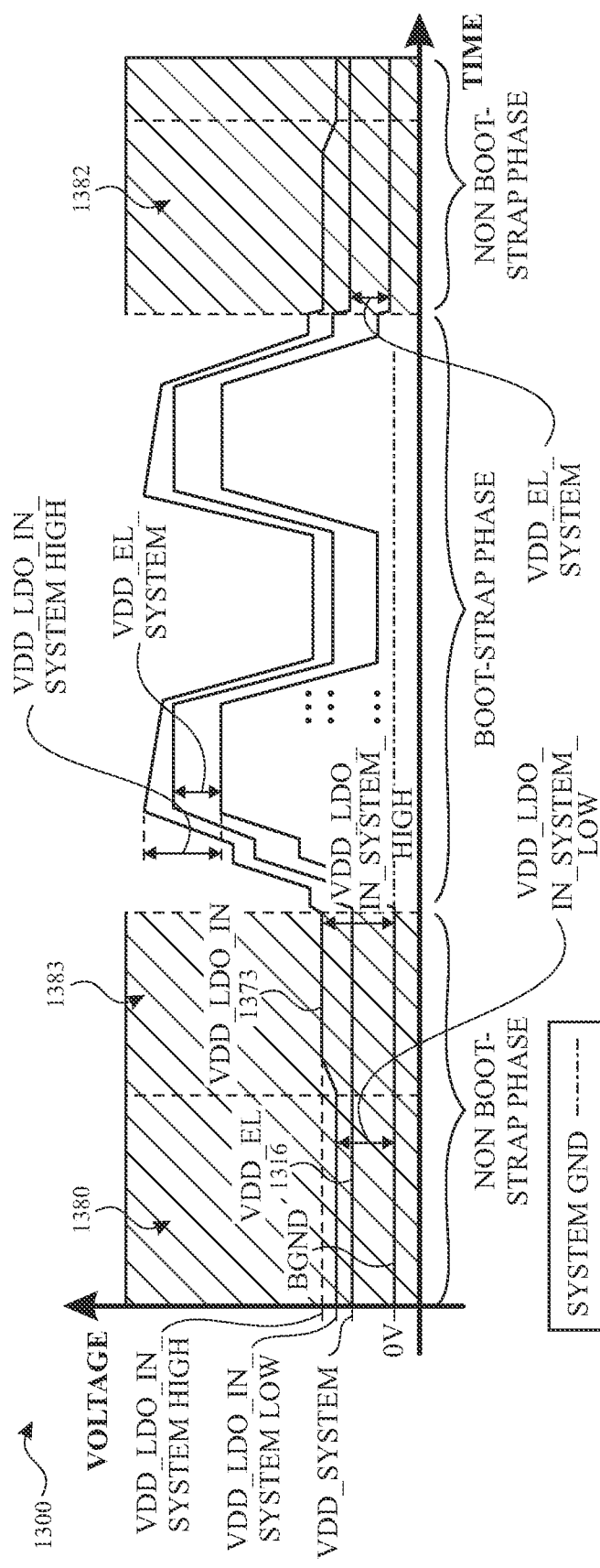
FIG. 13 illustrates exemplary voltage waveforms of a power supply topology according to examples of the disclosure.

FIG. 13 illustrates a timing diagram of voltage waveforms, including an adjusted supply rail voltage, according to examples of the disclosure. Timing diagram 1300 illustrates the voltage waveforms in non-guard and guarded operation. Timing diagram 1300 shows a voltage VDD_LDO_IN 1373 (e.g., corresponding to VDD_LDO_IN 1173). The voltage at VDD_LDO_IN 1373 as illustrated during time period 1380 (e.g., corresponding to non-guarded operation) can be representative of an operating mode wherein the LDO input voltage is lowered to improve system efficiency. However, unlike in the timing diagram of FIG. 11, in FIG. 13, during time period 1383 the LDO input voltage can be raised to a second, higher level. For example, time period 1383 can be representative of a portion of non-guarded operation of time period 1380 in which the LDO input voltage can be raised in anticipation of switching to operating in a guarded power domain. In some examples, the LDO input voltage can remain at the second, higher level during guarded operation (e.g., guard-high and/or guard low). As shown in FIG. 13, VDD_LDO_IN 1373 can increase relative to ground from a first LDO voltage level to a second voltage level. VDD_EL 1316 can represent the output voltage of the LDO (e.g., voltage at the output of LDO 782). As shown in FIG. 13, VDD_EL 1316 can remain constant between time period 1380 and time period 1383 during the non-guarded operation, despite the increase in the input voltage provided to the LDO. Power efficiency can be improved generally by reducing the time that the LDO input voltage is at the second, higher level (with a possible tradeoff for power costs of increasing the power by increasing the speed of the increasing the voltage). In some examples, the time period can be 100 microseconds or less.

Thus, power waste is minimized by lowering the supply rail voltage during time period 1380, until a short time before necessary—during time period 1383— while maintaining an identical, or nearly identical voltage at the output of an LDO. In some examples, the waveforms of timing diagram 1300 can be the same for the guarded operation as described above for FIG. 11 during time periods 1181 and 1182. Additionally, it is understood that although FIG. 13 illustrates one LDO and corresponding supply rail voltage VDD_EL, that a similar technique can be used to reduce power consumption for other supply rails (e.g., for VSS_EL as described with reference to FIG. 12).

In some examples, at the LDO input voltage can return to the first, lower voltage level when transitioning back from the guarded operation to non-guarded operation (e.g., in time period 1382). In some examples, the transition can occur instantly or gradually over a period of time that is the same or less than the period of time in which the power supply ramped up during time period 1383.

Figure 14:
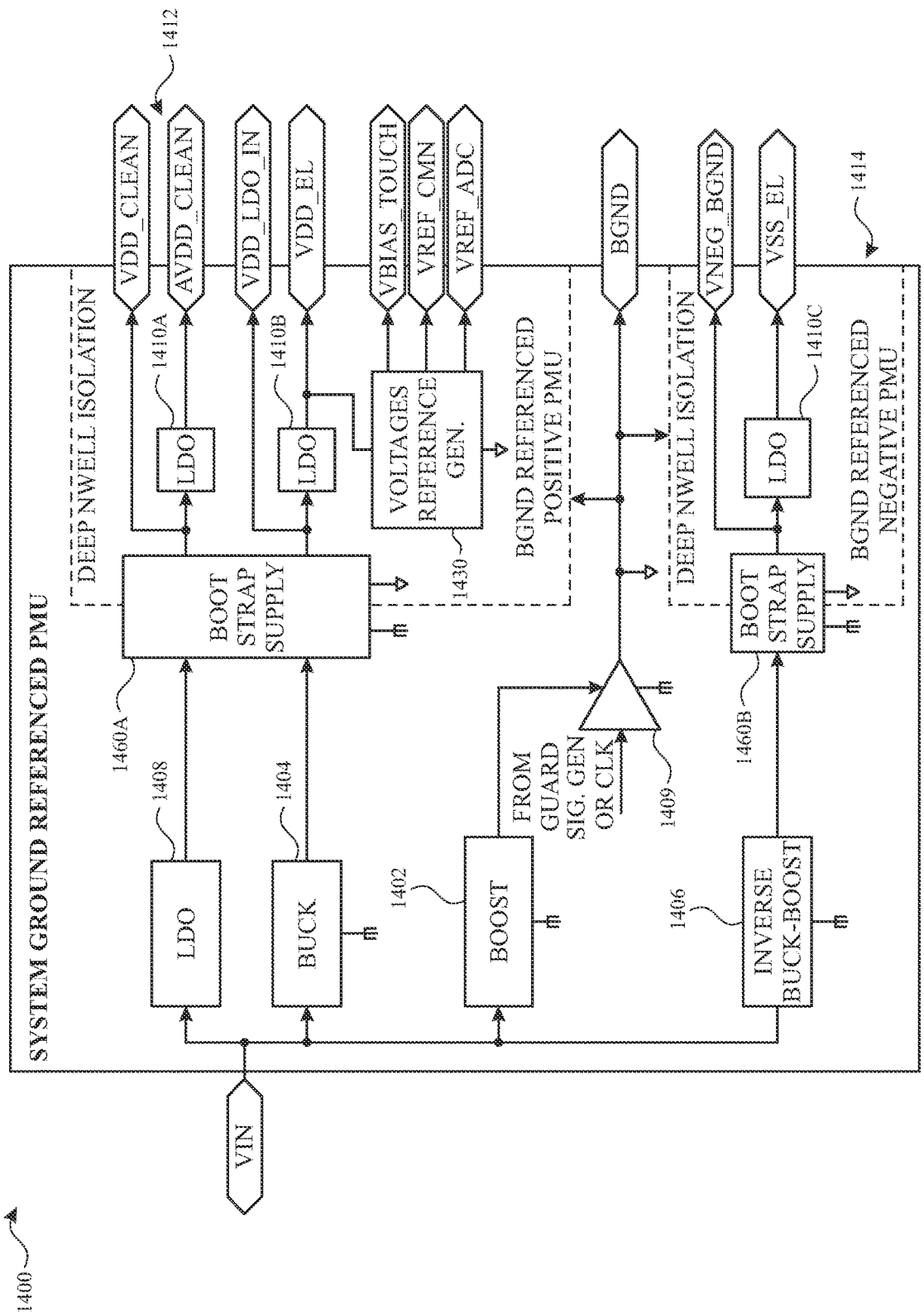
FIG. 14 illustrates a block diagram of a power management according to examples of the disclosure.

Referring back to FIG. 6, the LDOs 610, the adjustable reference generator 620, fixed reference generator circuit 630, and buffer amplifier 640 are shown to be referenced to BGND. In some examples, these components can be implemented in a portion of an integrated circuit that is isolated from other portions of the integrated circuit that are referenced to system ground (e.g., DC-DC converters of PMU 500. In some examples, the isolation can be achieved using deep n-well isolation that is referenced to BGND. In some examples, the positive and negative supply rails can be isolated from one another (e.g., using multiple n-wells). FIG. 14 illustrates a block diagram of a power management unit configured to provide supply rails of different polarities using deep n-well isolation according to examples of the disclosure. Power management integrated circuit 1400 can include DC-DC converts including a boost converter 1402 (e.g., corresponding to boost converter 502), a buck converter 1404 (e.g., corresponding to buck converter 504), buck-boost and inverse boost converter 1406 (e.g., corresponding to buck-boost and inverse boost converter 506), LDOs 1408 (e.g., corresponding to LDOs 508), and guard buffer 1409 (e.g., corresponding to guard buffer 709) in the system power domain. In some examples, power management integrated circuit 1400 can include plurality of deep n-wells 1412 and 1414. In some examples, deep n-well 1412 can provide isolation for a positive supply rail VDD_EL and deep n-well 1414 can provide isolation for a negative supply rail VSS_EL. The deep n-wells can minimize inadvertent coupling and/or interference between supply rails and/or between other circuitry, thereby preventing undesired noise that can propagate within the integrated circuit.

As illustrated in FIG. 14, the floating capacitor supplies can also be separated for positive and negative voltages (e.g., compared with floating capacitor supply 660). For example, a first floating capacitor supply 1460A can provide positive voltages from LDO 1408 and buck converter 1402 to LDOs 1410A and 1410B in n-well 1412, which can be used to generate a positive voltage rail (VDD_EL) and voltage references (e.g., using fixed reference generator circuit 1430 corresponding to fixed reference generator circuit 630). A second floating capacitor supply 1460B can provide negative voltages from buck-boost and inverse boost converter 1406 to LDO 1410C in n-well 1414, which can be used to generate a negative voltage rail (VSS_EL). Both n-wells 1412 and 1414 can be referenced to BGND which can be grounded or driven by the output of guard buffer 1409 as described herein and not repeated here for brevity.

Figure 15:
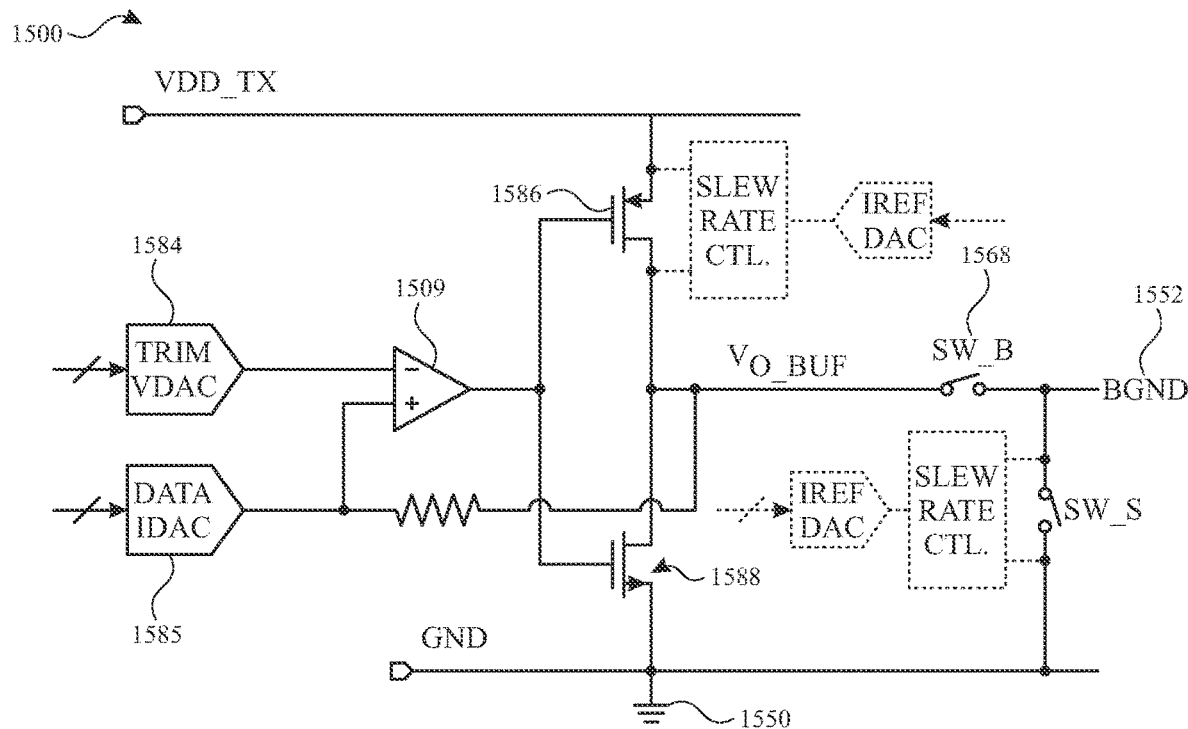
FIG. 15 illustrates power management circuitry according to examples of the disclosure.
Figure 16:
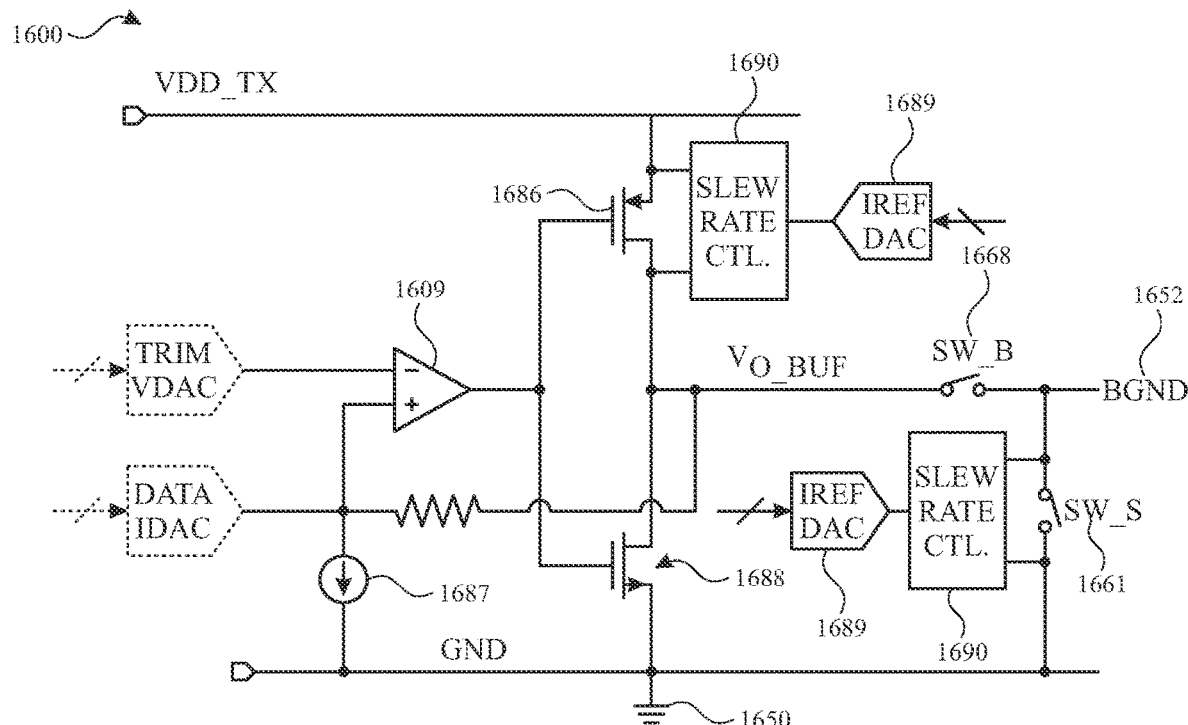
FIG. 16 illustrates power management circuitry according to examples of the disclosure.

Referring back to FIGS. 2A-2B, 7 and 14, for example, the guard buffer (e.g., implemented in a PMIC) can generate a guard signal to drive BGND. In some examples, the guard buffer can be configured to generate to drive BGND using the waveform as illustrated in FIGS. 11-13, or any other suitable guard signal. In some examples, the guard buffer can generate an output using an arbitrary waveform generator. In some examples, the guard buffer can drive the BGND using a push-pull operation. In some examples, the guard buffer can be configurable to operate in multiple modes. FIGS. 15 and 16 illustrate guard buffer circuitry configured to operate in an arbitrary waveform input mode or in a push-pull mode according to examples of the disclosure.

FIG. 15 illustrates guard buffer circuitry for operation in an arbitrary waveform input mode. In the arbitrary waveform input mode, the guard buffer can be configured to generate a buffered output signal in response to an arbitrary input (e.g., a waveform of any form). For example, the guard buffer circuit topology 1500 can include an amplifier 1509 (e.g., a differential amplifier), which can be configured to receive an adjustable voltage at a first input terminal (e.g., inverting terminal) from a first digital-to-analog converter 1584 (Trim VDAC), and can be configured to receive an arbitrary waveform at a second input terminal (e.g., a non-inverting terminal) supplied from a second digital-to-analog converter 1585. The guard buffer topology 1500 can also include an output stage comprising transistors 1586 and 1588. Transistor 1586 can be a PMOS transistor and transistor 1588 can be an NMOS transistor, with their respective drains coupled together at an output of the guard buffer circuit topology, their respective sources coupled to the power rail (e.g., the output of boost DC-DC converter) and ground (system ground), respectively, and their respective gates coupled together and to the output of amplifier 1509. The output stage can form a push-pull stage to allow the guard buffer to drive and sink current for guarded operation. The guard buffer topology 1500 can also include a resister between the non-inverting input of amplifier 1509 and the output of the output stage to drive a signal (e.g., a current signal) through the resistor, in order to vary a voltage presented to the non-inverting input terminal and to the output of the guard buffer topology.

As the arbitrary waveform varies, the output of the guard buffer topology 1500 and the voltage at BGND node 1552 can vary when switch SW_B 1568 (e.g., corresponding to SW_B 768 in FIG. 7) is in the closed position. The arbitrary waveform input mode can provide design flexibility for operation of the power management integrated circuit, according to examples of the disclosure. For example, the arbitrary waveform output by IDAC 1585 can be configured to minimize harmonic emissions. The arbitrary waveform can assume various forms including, but not limited to a pure sine, trapezoidal, square, ramp, or triangle wave. Arbitrary waveform mode can allow for operating periods with reduced noise generated by amplifier topology 1500. For example, the arbitrary waveform can be a sine wave at a frequency selected to reduce the profile of noise generated by the PMIC in response to the arbitrary waveform.

FIG. 16 illustrates guard buffer circuitry for operation in push-pull mode. In the push-pull mode, the guard buffer can be configured to generate a buffered output signal based on a reference input. For example, guard buffer topology 1600 can include amplifier 1609 (e.g., a differential amplifier corresponding to amplifier 1509), an output stage including transistors 1686 and 1688 (e.g., corresponding to the output stage of FIG. 15), and a resistor between the non-inverting terminal of amplifier 1609 and the output of the guard buffer topology. Unlike in FIG. 15, in guard buffer topology 1600, amplifier 1609 can be configured as a reference buffer with a current source input 1687 instead of using arbitrary waveform generation. Instead, the guard signal waveform can be generated by toggling between the power supply rail and ground, optionally using slew rate control circuits 1690. In some examples, slew rate control circuit 1690 can be driven with a reference current DAC 1689 to pull the output circuitry up towards a supply voltage with the desired slew rate, and slew rate control circuit 1690 can be driven with a reference current DAC 1689 to pull the output circuitry down towards system ground 1650. In some examples, slew rate control circuitry can allow the system to be referenced to system ground during bootstrapped operation. For example, transistor 1688 can be configured to pull down the BGND node 1652 towards ground, but can require a voltage (e.g., several hundred millivolts) in order to maintain linear operation of the transistor. Additionally or alternatively, slew rate control circuit 1690 can pull the BGND node to system ground by opening switch SW_B and closing switch SW_S, allowing the system to operate on a system ground reference while in a bootstrapped mode of operation. One of the added benefits of the slew rate control circuit 1690 is the ability to minimize any interference signals generated when transitioning between a guarded reference (e.g., several hundred millivolts) and a system reference. For example, a rapid transition between voltages (e.g., from several hundred millivolts above ground to system ground) can cause unwanted harmonics to be generated within the system, causing electromagnetic interference and potentially degrading the system signal-to-noise ratio. Slew rate control circuit 1690 can be configured to gradually ramp the system from a guard reference to a system reference, such that the induced harmonics and noise are minimized.

In some examples, the guard buffer topology can be designed to implement either of the guard buffer modes. In some examples, the guard buffer topology can be designed with circuitry to implement only one of the two guard buffer modes described above. In some examples, both an arbitrary wave input mode and a push-pull mode can be used in combination while the power management integrated circuit operates touch and display circuitry. For example, the PMIC can toggle to an arbitrary waveform mode to reduce noise within the system to desired frequencies and/or noise power levels to reduce interference with touch and display operations. At other time, the PMIC can transition to a push-pull mode to, for example, limit power consumption, prevent computational overhead otherwise necessary for arbitrary waveform generation, and/or transition quickly between ground references.

Figure 17:
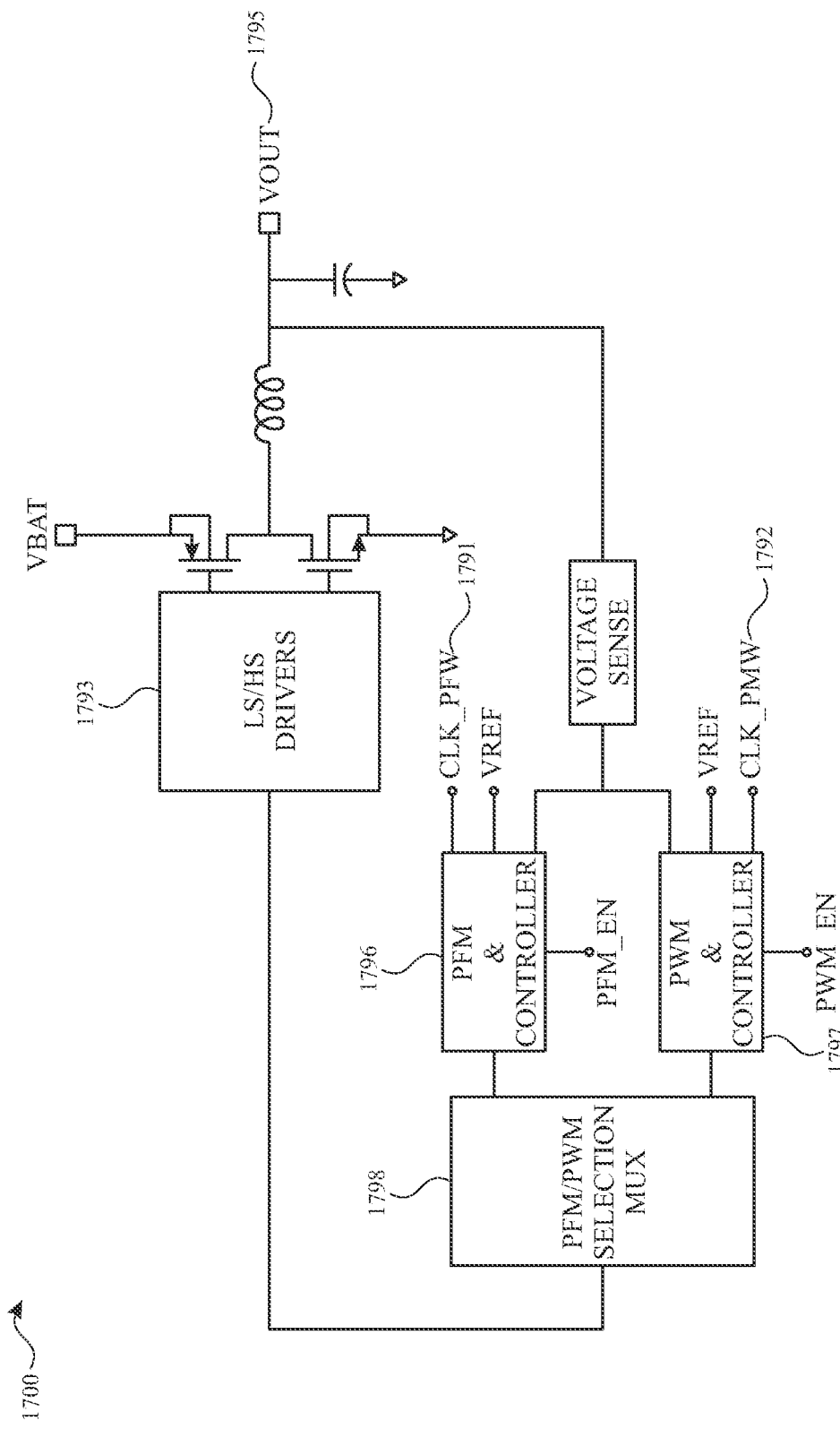
FIG. 17 illustrates power management circuitry according to examples of the disclosure.
Figure 18:
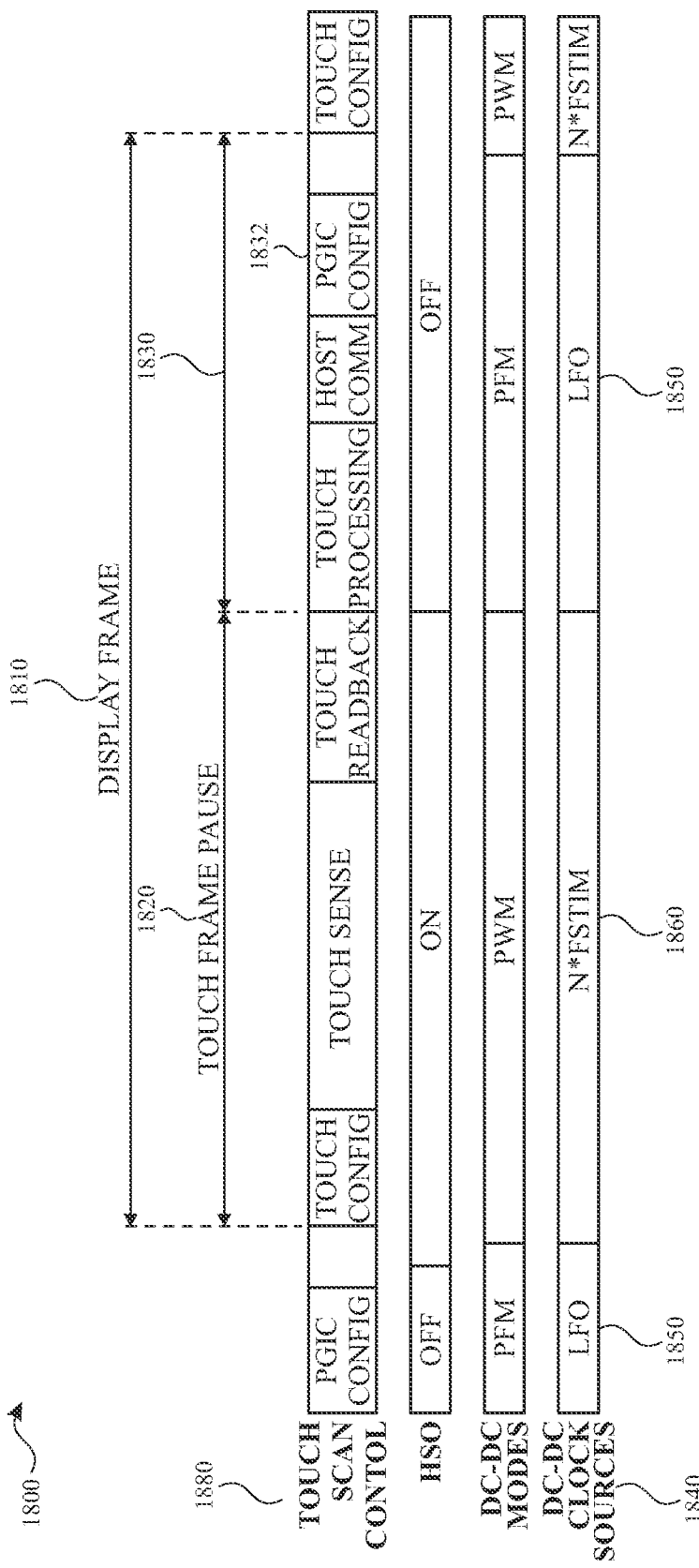
FIG. 18 illustrates a timing diagram for a power management unit according to examples of the disclosure.

Referring back to FIGS. 5, 7 and 14, for example, the power-management integrated circuit can include multiple DC-DC converters. In some examples, the DC-DC circuits can be configured to operate in a pulse-width modulation (PWM) mode or in a pulse-frequency modulation (PFM) mode. In some examples, the power management integrated circuit can use different clock sources to drive the one or more DC-DC converters depending on the operating mode. FIG. 17 illustrates a schematic of DC-DC converter configurable to operate in different modes using different clock sources according to examples of the disclosure. FIG. 18 illustrates a timing diagram for operating the DC-DC converters using different clocks during touch and display operations according to examples of the disclosure. DC-DC converter 1700 can include PFM circuit 1796 (including a PFM controller), PWM circuitry 1979 (including a PWM controller), a mode selection multiplexer 1798, and low-side and high-side driver circuitry 1793 among other components. In some examples, the PFM circuitry 1976 can include a clock input that can be coupled to a first clock 1791. In some examples, the PWM circuitry 1797 can include a clock input that can be coupled to a second clock 1792 different from the first clock. The modulated output signals can be passed to a mode selection multiplexer 1798. Digital logic and control circuitry can then select between the two modulated output signals to control the high/low side drivers 1793.

In some examples, as illustrated with respect to timing diagram 1800, the DC-DC converter (e.g., DC-DC converter 1700) can toggle between multiple switching modulated modes. For example, the DC-DC converter can toggle between a PWM and a PFM, with the PWM mode used for touch sensing operations and the PFM mode used otherwise. Timing diagram 1800 illustrates operation of the touch sensing system for a display frame 1810. The operation of the touch sensing system can include a touch sensing scan during touch time period 1820, and during period 1830 the touch sensing system can perform touch processing, communicate results of touch processing to the host, configure the PMIC (e.g., during time period 1832), and/or idle. During the touch sensing scan, the touch sensing system can include configuration of the touch sensing circuitry, sensing capacitance and/or readback of the touch sensing results to a touch processor. In some examples, the display can perform display operation for the duration of display frame 1810. In some examples, the display can perform updates during the portion of the display frame corresponding to time period 1830 and maintain the display without updating during the portion of the display frame corresponding to time period 1820.

In some examples, during time period 1830 (with the possible exclusion of part of the idle period after configuration of the PMIC), the PFM circuitry of DC-DC converter 1700 can use the first clock source. In some examples, the first clock source can be a low-frequency oscillator (LFO) 1850, and is used while the configuring the PMIC during time period 1832. Operating in PFM mode can be more power efficient (e.g., less wasted power) because PFM mode can reduce the amount of idle current that is drawn from the DC-DC converter during low load conditions. Thus, the PFM mode can be selected to maintain high power efficiency under a low current load conditions that may exist, for example, when the display operation occurs without the touch sensing operation, and particularly when the load currents of the PMIC can be low, such as periods where a significant portion of the display does not require high load current (e.g., black screen).

As the DC-DC converter load increases, PFM mode efficiency can approach the power efficiency of a pulse-width modulated (PWM) mode of operation. For example, touch sensing operation can include regularly scheduled scans of a plurality of touch electrodes. Accordingly, in some examples, during time period 1820 where the loading on the DC-DC converter can be increased, the DC-DC converter efficiency may be improved significantly by switching to PWM mode. For example, as load current increases, the on-time of the DC-DC converter can increase, and resistive losses can degrade the power efficiency of PFM operation.

While PWM mode can improve the power efficiency at high load conditions, regular switching within the DC-DC converter 1700 can induce ripple on supply rails within the PMIC and/or output from the PMIC. In some examples, to mitigate switching noise, the PWM circuitry 1797 can use clock 1792. In some examples, clock 1792 can have a frequency that is based on the stimulation frequency for touch sensing operation. In some examples, the frequency of clock 1792 can be an integer multiple (e.g., an even multiple) of the touch stimulation signal used for the touch operation during time period 1820 to reduce noise. In some examples, as illustrated in FIG. 18, a high-speed oscillator (HSO) 1880 can be turned on in preparation for a touch sensing operations in time period 1820 (as indicated by HSO 1880 turning to an on state during the idle period between the configuration of the PGIC and time period 1820. In some examples, the stimulation frequency and/or clock 1792 related to the stimulation frequency can be generated from output of HSO 1880. It is understood that DC-DC converter 1700 and timing diagram 1800 are an example of operation, but the DC-DC converter can include different circuitry and operate differently than shown. For example, the PWM circuitry can optionally use the low frequency oscillator 1850 as a clock source even while operating in PWM mode. Operating with a low frequency clock in PWM mode can be advantageous when the load demanded from the PMIC is high, for example when a rapidly changing or complex image is displayed.

Figure 19:
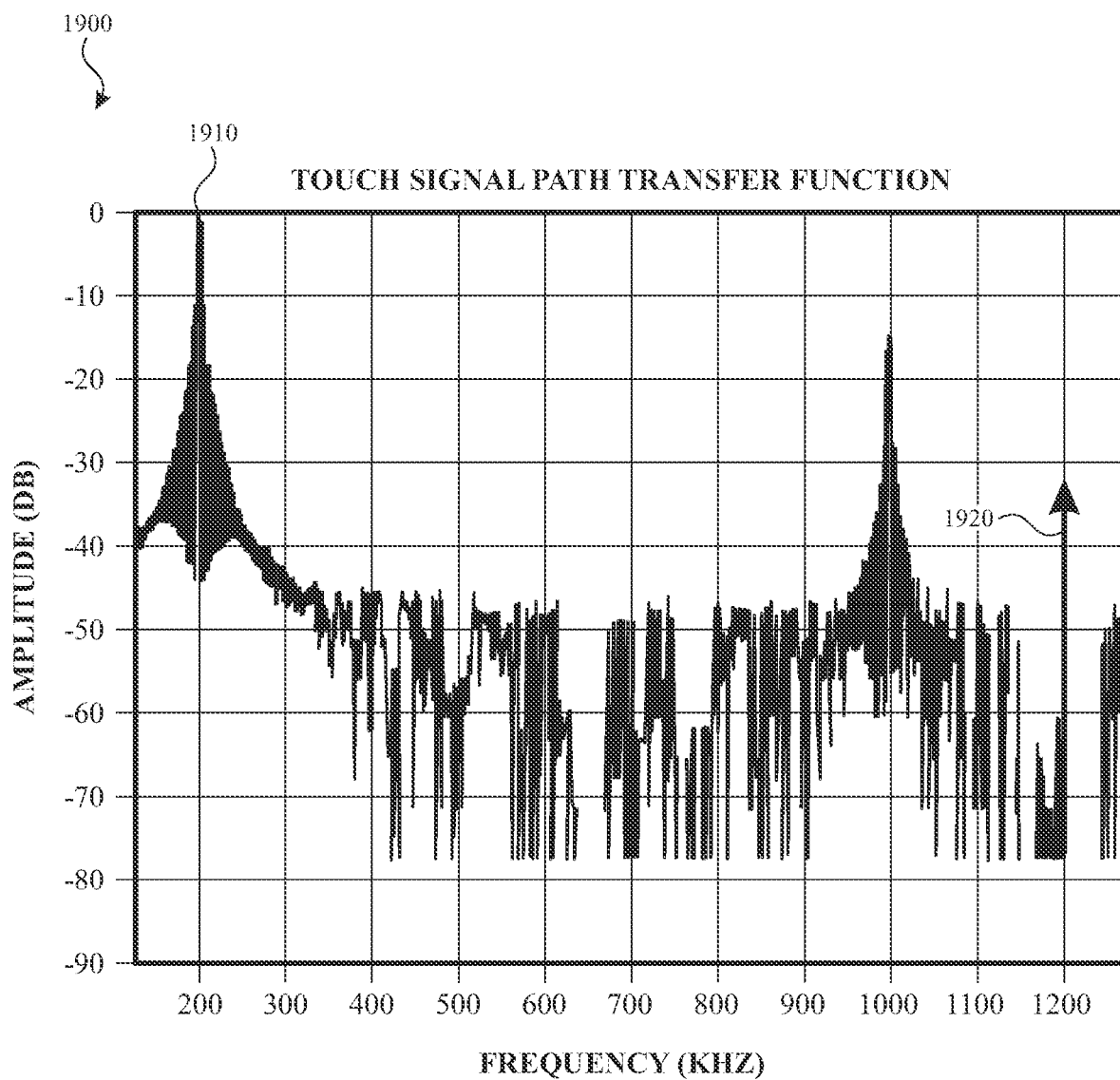
FIG. 19 illustrates an example frequency example touch signal path according to examples of the disclosure.

As mentioned herein, the clock source for the DC-DC converter 1700 in the PWM mode can be selected to reduce noise. FIG. 19 illustrates a plot 1900 of an example frequency response of a transfer function for an example touch signal path according to examples of the disclosure. In the example illustrated in FIG. 19, peak 1910 at 200 kHz can be indicative of a stimulation frequency used to drive touch circuitry. The touch signal path corresponding to the frequency response shown can include touch electrodes and signal routing components including, but not limited to, traces, interconnects, vias, etc., all of which can be varied in placement, routing, and dimension as necessary to achieve desired system performance. In some examples, additional passive components can be introduced to tune the signal path frequency response. For example, the path can include components to specifically block out a range of frequencies, such as a packaged filter. Passive components can also be arranged to filter out frequencies, such as an arrangement of inductors, capacitors, and/or resistors. In some cases, filter components can be fabricated from the arrangement of traces, for example routing a portion of PCB traces such that it can act as an inductor for a LC filter. An end result of designing the signal path around a defined touch stimulation frequency can be that the signal path can notch out frequencies related to (e.g., integer multiples of) the touch stimulation frequency. For example, impulse 1920 can represent an aggressor signal that corresponds to noise induced by a power supply (e.g., power supply noise generated during operation of the second clock 1792 used for PWM operation) at approximately 1200 kHz (an integer multiple of the touch stimulation frequency). The frequency response has a deep notch from approximately 1150 kHz to 1250 kHz, within which signals are severely attenuated (e.g., attenuated by 60 dB or more). Thus, even a strong noise component generated by touch circuitry power supply (e.g., DC-DC converter 1700) can have a negligible effect on touch sensing operation due to the tuning of the clock input for the PWM circuitry to the touch stimulation frequency.

Figure 20:
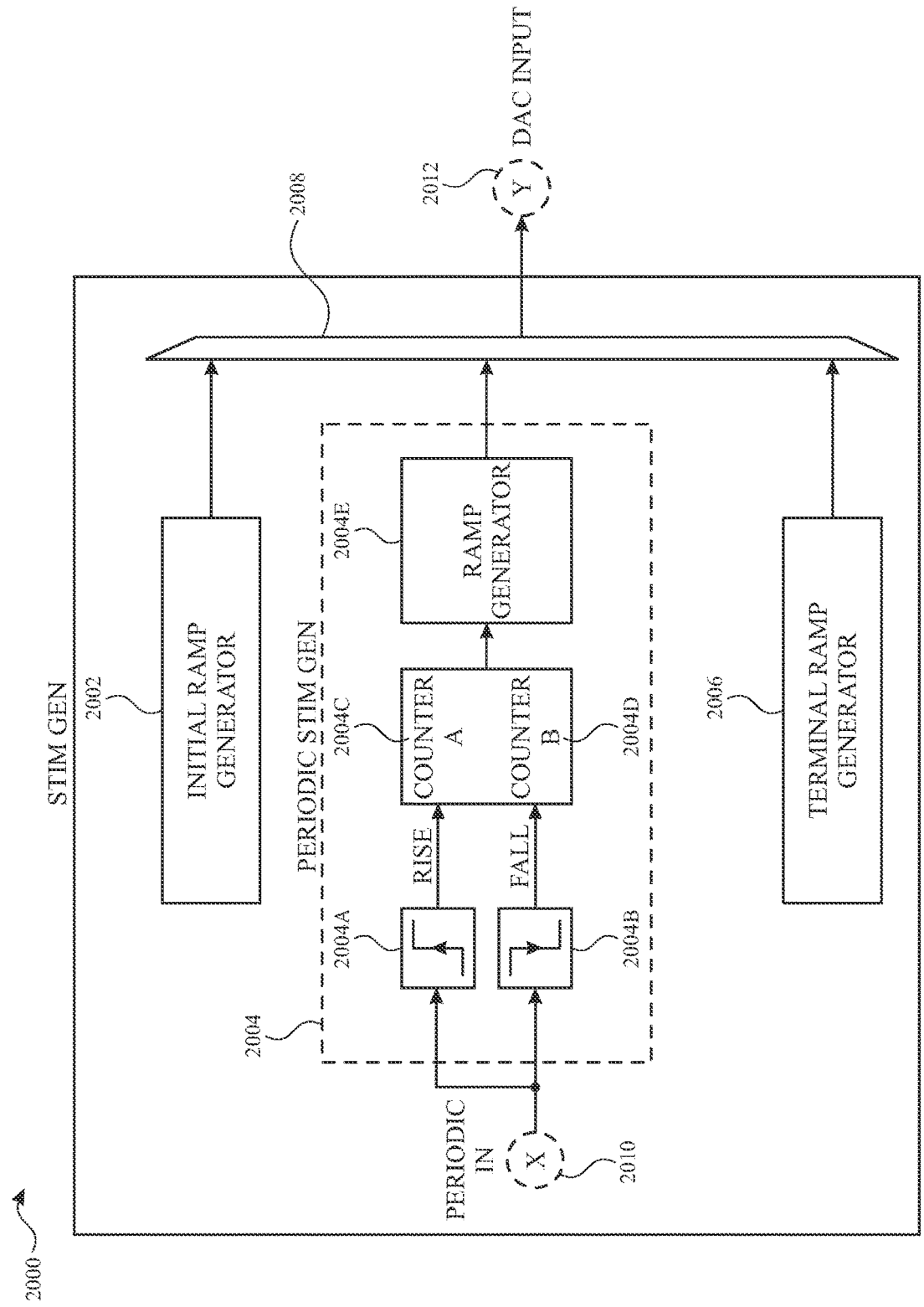
FIG. 20 illustrates example circuitry for stimulus generation according to examples of the disclosure.

Referring back to FIG. 6, in some examples, buffer amplifier 640 can generate two stimulation voltages VDRV_P and VDRV_N, which can represent positive and negative phase stimulation signals having the same frequency and amplitude for multi-stimulus mutual capacitance stimulation scan. The stimulation signal waveform can be generated digitally in the system ground domain. FIG. 20 illustrates example circuitry for stimulus generation according to examples of the disclosure. In some examples, an electronic device including touch circuitry sensing circuitry operates in one or more operating modes using different stimulation sources when configured to use respective operating modes. For example, during mutual capacitance touch sensing, touch stimulation circuitry is configured in an initial operating mode to prepare for touch stimulation and sensing, a periodic mode to perform stimulation for touch sensing, and a terminal operating mode to transition from the periodic mode to a lower-power state of operation. As such, circuitry to supply stimulation signals during a respective operating mode can be desired.

In some examples, an electronic device including such circuitry includes circuitry to provide such stimulation signals. Stimulation generator 2000, for example, optionally is configured to generate one or more signals to drive touch stimulation circuitry in a plurality of operating modes to generate stimulation signals for self-capacitance and/or mutual capacitance sensing operations of a touch sensor panel included in the electronic device. It is understood that reference to a "stimulation source" optionally corresponds to one or more stimulation circuits configured to generate one or more stimulation signals. Any references described herein of a "touch electrode" and/or "touch electrodes" are understood to refer to one or more touch electrodes of a "touch sensor panel" included in the electronic device.

Stimulation generator 2000 includes switching circuitry, such as multiplexer 2008, to select between respective stimulation circuitry configured to generate signals during respective operating modes. For example, multiplexer 2008 optionally selects between an initial ramp generator 2002, periodic stimulation generator 2004, and/or terminal ramp generator 2006 in accordance with a desired mode of touch sensing operation. In some examples, stimulation generator 2000 optionally is coupled to further stimulation circuitry, such as buffer amplifier 640 or described with respect to FIG. 23. For example, as shown in FIG. 20, the output of multiplexer 2008 is coupled to DAC 2012, which can output an analog stimulation signal for use by buffer amplifier 640 or the circuitry illustrated in FIG. 23. In some examples, DAC 2012 is representative of circuitry configured to receive, process, and/or convert the first waveforms from a first type of waveform (e.g., digital waveforms) generated by stimulation generator 2000 to a second type of waveform (e.g., analog waveforms), for further coupling to additional stimulation circuitry (e.g., one or more amplifiers optionally coupled to touch electrodes). Although described with reference to a DAC, it is understood that the circuitry configured to receive and/or process the first waveforms optionally do not include a digital-to-analog converters, and in some examples, can couple and/or buffer the first waveforms to other respective circuitry without a digital to analog conversion. In some examples, respective stimulation circuitry includes or use one or more lookup tables (LUTs) to generate respective signals. For example, a first LUT optionally is configured for use with initial ramp generator 2002, and a second, different LUT optionally is configured for use with terminal ramp generator 2006. Alternatively, the stimulation generator 2000 optionally does not include the one or more LUTs. In such examples, the stimulation generator 2000 optionally includes one or more waveform generators (e.g., function generators) configured to generate one more waveforms (e.g., ramp, square, trapezoidal, pulsed, triangular, sinusoidal, and/or another type of waveform). Such waveform generators optionally are coupled to multiplexer 2008 and/or configured to bypass multiplexer 2008.

In some examples, although not shown, stimulation generator 2000 additionally or alternatively includes periodic or aperiodic waveform generation circuitry, such as a sine wave generator, a pseudo-sine wave generator, a square wave generator, a triangle wave generator, or any other periodic or arbitrary waveform generator coupled as an input to multiplexer 2008. In some examples, the stimulation circuitry is configured for use during the initial, periodic, and/or terminal phases of operation. In some examples, stimulation circuitry coupled to multiplexer is configured to generate an arbitrary, aperiodic waveform.

In some examples, an electronic device comprising stimulation generator 2000 includes stimulation circuitry to generate waveforms during an initial mode of operation. As described further with respect to FIG. 22, the initial ramp generator comprises circuitry such as one or more phase accumulators as described with respect to register 2134 in FIG. 21. In some examples, the initial ramp generator comprises circuitry other than the one or more phase accumulators, such as counter circuit(s) (e.g., linear counters). In some examples, initial ramp generator 2002 optionally is configured to generate one or more waveforms from an off or lower power state to one or more intermediate signal levels prior to initiating stimulation using an arbitrary waveform (e.g., a periodic waveform) in a second, different operating mode. In some examples, initial ramp generator 2002 is included in part to mitigate unwanted electromagnetic interference and/or coupling between other stimulation circuitry and/or coupling circuitry (e.g., amplifiers, traces, and/or electrodes included in the electronic device) and bias stimulation circuitry included in the electronic device in preparation for the second operating mode.

In some examples, an electronic device comprising stimulation generator 2000 includes a periodic stimulation generator 2004 configured to generate one or more stimulation signals for touch sensing operations. For example, periodic stimulation generator 2004 optionally receives a first periodic signal (e.g., a square wave, trapezoidal wave, etc.), such as a periodic signal generated by signal generator 2100 and described with respect to periodic phase 2244 of signal 2240. In some examples, the first periodic signal is coupled to one or more edge detectors (e.g., a rising edge detector 2004A and/or a falling edge detector 2004B). In some examples, the one or more edge detectors are coupled to respective counters (e.g., an up-counter 2004C and/or a down-counter 2004D). In this way, the electronic device optionally counts a number of detected edges of the first periodic signal, and optionally is configured to use such counted edges to generate one or more second periodic signals (e.g., different than the one or more first periodic signals). For example, periodic stimulation generator 2004 optionally includes one or more ramp generators 2004E coupled to the output of the respective counters. In some examples, the one or more ramp generators 2004E are configured to generate one or more periodic, digital signals (e.g., a ramp signals) based on the value of a respective counter. In some examples, during a periodic phase of operation, the electronic device configures multiplexer 2008 to couple to one or more signals generated by periodic stimulation generator 2004 to DAC 2012. In some examples, the ramp generator(s) include one or more phase accumulators. In some examples, the electronic device ceases coupling between DAC 2012 and periodic stimulation generator 2004, and initiates coupling between DAC 2012 and terminal ramp generator 2006. Although the examples described herein are directed to stimulation for touch sensing operations, it is understood that such examples are broadly applicable. For example, any suitable circuit requiring similar excitation and/or stimulation constrained by electromagnetic interference, noise, and/or timing requirements optionally benefits from the configurations and methods described herein.

In some examples, one or more signals generated by the stimulation generator 2004 can be coupled to (e.g., tapped by) one or more DC-DC converters to reduce switching noise generated by the one or more DC-DC converters, as described with respect to FIG. 17. In some examples, one or more signals generated by stimulation circuitry, such as by stimulation generator 2100 and/or register 2134 can be coupled to (e.g., tapped by) the one or more DC-DC converters to reduce the switching noise generated by the one or more DC-DC converters. It is understood that the description of coupling signals generated by stimulation generator 2004 to such DC-DC converters optionally apply in a similar or a same manner to examples of coupling the one or more signals generated by stimulation generator 2100 and/or register 2134. For example, circuitry configured to generate a periodic ramp signal (e.g., an NCO as described with respect to FIG. 21) having a first frequency optionally is coupled (e.g., tapped) to generate a switching frequency for the one or more DC-DC converters. In some examples, switching circuitry configured to couple the one or more signals generated by the stimulation generator 2004 and/or the one or more signals generated by stimulation generator 2100 can generate a clock signal that has a clock frequency that is a multiple of the first frequency (e.g., an even multiple and/or an odd multiple of a periodic ramp signal). For example, the switching circuitry can be configured to generate a clock signal with a frequency that is an even multiple of the first frequency. In some examples, the switching circuitry can be configured to generate the clock signal that is a $2^{nth}$ multiple of the first frequency, where n is an integer number. For example, the switching circuitry can be coupled to a respective register of a counter (e.g., by tapping a register corresponding to the least significant bit of an 8-bit linear counter, and/or by tapping a respective register included in register 2134) such that a clock signal generated by such coupling is driven to a logical high when the contents of the register are a logical 1 and the clock signal is driven to a logical low when the contents of the register are a logical 0. Thus, in some examples, the one or more signals generated by the stimulation generator 2004 and/or by stimulation generator 2100 can be coupled to one or more DC-DC converters to reduce switching noise by coupling (e.g., tapping) the one or more periodic signals to provide one or more clock sources to drive one or more switches included within a respective DC-DC converter such that the switching frequency of the DC-DC converters can be an even multiple of the one or more signals, thereby reducing the need for circuitry to otherwise generate such one or more clock sources.

In some examples, the electronic device is configured to couple one or more terminal ramp generation circuitry to additional touch stimulation circuitry. For example, terminal ramp generator 2006 optionally is coupled to DAC 2012 via multiplexer 2008 during a terminal phase. Such a terminal phase, as described herein, optionally corresponds to a transition from the periodic phase to one or more intermediate voltages, and later to a terminal voltage corresponding to a low or no power state (e.g., to a ground voltage). In some examples, the terminal phase reduces unwanted electromagnetic interference and/or coupling when transitioning associated touch stimulation circuitry (e.g., amplifiers, traces, and/or other circuitry) from performing touch stimulation operations to a low power state. In some examples, the electronic device optionally includes one or more numerically controlled oscillators for touch stimulation operations.

Figure 21:
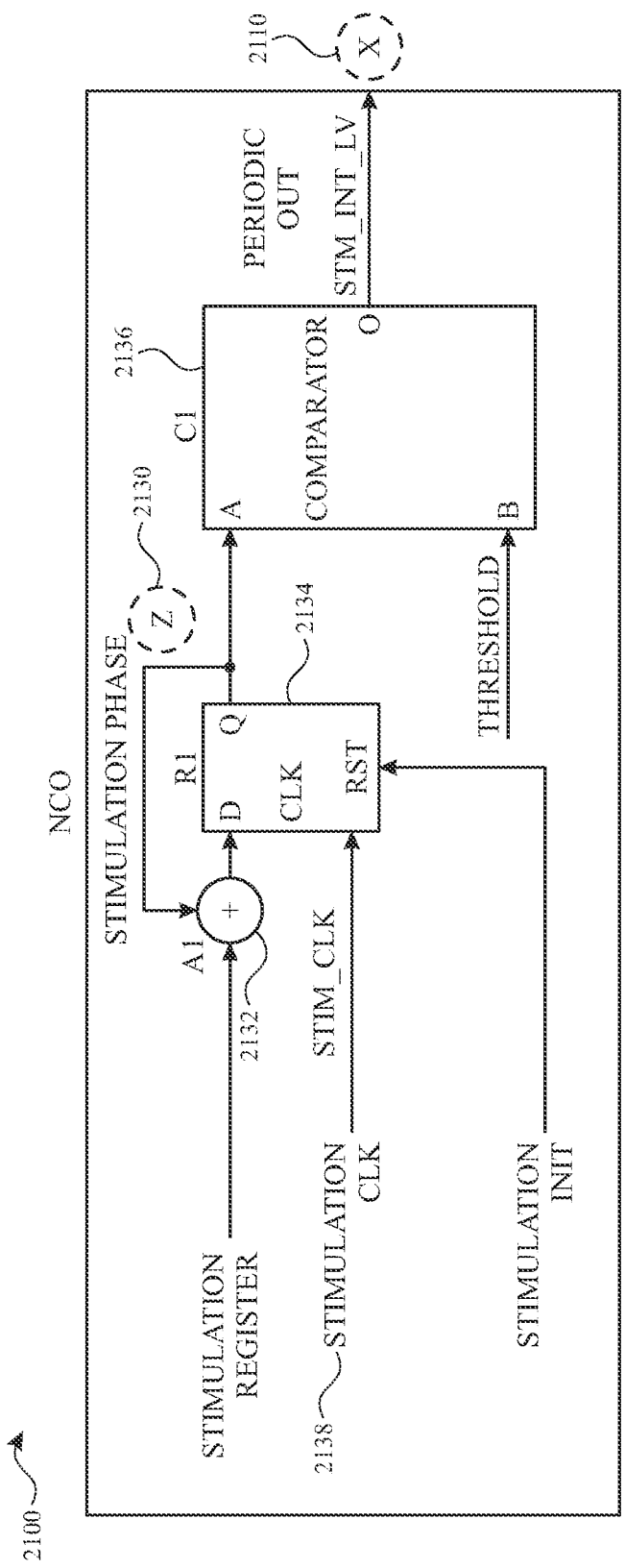
FIG. 21 illustrates example circuitry to generate a periodic signal according to examples of the disclosure.

FIG. 21 illustrates example circuitry to generate a periodic signal according to examples of the disclosure. For example, signal generator 2100 optionally is a numerically controlled oscillator (NCO) configured to generate a periodic, or semi-periodic signal for use in touch stimulation circuitry. In some examples, signal generator 2100 is coupled to stimulation generator 2000 at input node 2010 (e.g., directly or via circuitry configured to buffer signals, such as a buffer amplifier). In some examples, signal generator 2100 includes a state machine configured to create one or more waveforms (e.g., digital waveforms) for direct or indirect use with a digital-to-analog converter (DAC), such as DAC 2012 illustrated in FIG. 20—which is understood as a node that coupled to a DAC that is not shown—or DAC 2360. In some examples, signal generator 2100 is configured to generate a pulsed waveform and optionally is coupled to an amplifier (e.g., a buffer amplifier) instead of a DAC as described with respect to FIG. 20, thus bypassing the DAC or coupling signal generator 2100 to circuitry other than a DAC. In some examples, the stimulus provided by signal generator 2100 is used for driving a buffer amplifier (e.g., a guard buffer configured to provide stimulus during self-capacitance touch sensing mode). In some examples, signal generator 2100 can be configured differently for self-capacitance touch sensing than for mutual capacitance touch sensing.

In some examples, a signal generator configured as an NCO comprises circuitry to modify a phase value based on signal frequency associated with touch sensing operations. For example, signal generator 2100 includes a register 2134 (e.g., a data flip-flop) that operates based on a stimulation clock 2138 that optionally is also used as a synchronization signal for touch stimulus. During a mutual capacitance touch sensing mode, for example, an electrode optionally is driven at a first frequency, and a clock signal used for such touch sensing—or a clock signal generated to oscillate at the same first frequency—is coupled to a register (e.g., register 2134) to optionally modify the value held in the register at defined intervals based on the clock signal (e.g., at an edge of the clock signal) using adder 2132. As such, in some examples, register 2134 is modified (e.g., incremented) at intervals associated with a frequency of touch stimulation operations. The circuitry including register 2134 and adder 2132, and the control and/or clock signals configured to generate an accumulated value at phase accumulator node 2130 are referred to herein as a "phase accumulator."

In some examples, the value of the register is used to iterate through portions of a waveform. For example, register 2134 optionally is used as an index of a lookup table (LUT), the output of the LUT corresponding to a point of a waveform stored in memory by the electronic device. Phase accumulator node 2130, for example, optionally corresponds to the value (e.g., phase) generated by register 2134. Such waveforms optionally are periodic waveforms (e.g., sinusoidal), and the resolution of the waveform optionally corresponds to the memory of the register (e.g., register 2134). For example, if the waveform stored in the LUT corresponds to a sine wave and register 2134 corresponds to an 8-bit register, every digital value (e.g., from 0 to $2^8-1$) is mapped to a respective phase value (e.g., from 0 to $2\pi$) of the sine wave. In this way, signal generator 2100 optionally generates a periodic waveform. In some examples, the signal generator stores a subset of a waveform (e.g., a quarter, or nearly a quarter of a sinusoidal waveform), and one or more bits are manipulated to mimic a sine wave (e.g., a most significant and/or a control bit to modify the polarity of the LUT output and a direction of traversal of the LUT). In some examples, the waveform stored in the LUT does not correspond to a sinusoidal waveform, and the value generated by register 2134 indexes the value of the non-sinusoidal waveform stored in a LUT. As shown in FIG. 21, in some examples, the register optionally is coupled to a comparator. Comparator 2136, for example, is coupled to phase accumulator node 2130. In some examples, comparator 2136 is coupled to a threshold value, and generates a high or low value based on the relative comparison between phase accumulator node 2130 and the threshold value. Accordingly, in some examples, comparator 2136 in conjunction with register 2134 generates a pulse waveform (e.g., a square waveform). Such a pulsed waveform is optionally used as described with respect to FIG. 20. For example, the pulsed wave optionally is used by a periodic stimulus generator (e.g., periodic stimulation generator 2004) to generate stimulation signals to excite touch circuitry (e.g., for touch electrode stimulus). In some examples, modifying the threshold values accordingly modifies the duty cycle of a pulsed waveform. Because register 2134 is incremented in accordance with a clock signal associated with touch stimulation operations (e.g., a touch stimulation frequency or a master clock frequency of the electronic device), the phase value accumulated at phase accumulator node 2130 and connected to an input of comparator 2136 accrues at a rate (e.g., frequency) based on the clock signal. In some examples, the electronic device uses an accumulated phase value as a control signal (e.g., corresponding to stimulation phase 2242C in FIG. 22). Consequently, the frequency and duty cycle of a waveform generated by comparator 2136 is optionally dependent upon the frequency of stimulation clock 2138 associated with touch stimulation operations, and can be modified by based on the memory of register 2134 and/or the threshold coupled to comparator 2136. Thus, in some examples, stimulation generators (e.g., signal generator 2100) described herein provide a fine frequency resolution using a clock corresponding to a touch stimulation frequency.

In some examples, as described with respect to FIG. 20, an electronic device includes processing circuitry configured to operate touch stimulation circuitry in various operating modes and generates one or more timing and control signals to toggle between the various operating modes. In some examples, prior to operating touch stimulation circuitry in a periodic phase, an initialization period is desired to prepare the touch stimulation circuitry (e.g., by biasing the circuitry) while reducing noise and/or undesired harmonic content generated as an effect of such initialization (e.g., at a touch sensor panel coupled to the biasing circuitry and/or at stimulation generation circuitry described with respect to FIGS. 20 and 21). For example, while stimulating a touch sensor panel during a periodic phase (e.g., using signal generator 2100 and/or periodic stimulation generator 2004), unwanted coupling and electromagnetic interference can occur between portions of the touch sensor panel. By gradually driving respective lines of the touch panel with complementary signals during an initialization operating mode, such unwanted effects optionally are reduced. In some examples, while operating in a periodic phase, the electronic device may desire mechanisms for transitioning to a terminal, low power state without being constrained by an integration time of the stimulation generation circuitry. For example, while operating in the periodic mode, the electronic device may seamlessly adjust to a terminal phase without waiting for the conclusion of a full period or cycle of a periodic waveform (e.g., generated by periodic stimulation generator 2004). As such, the timing of signals associated with the operating modes described with respect to FIG. 20 are further described with respect to FIG. 22 to illustrate the flexibility afforded by configurations of stimulation circuitry as described herein.

Figure 22:
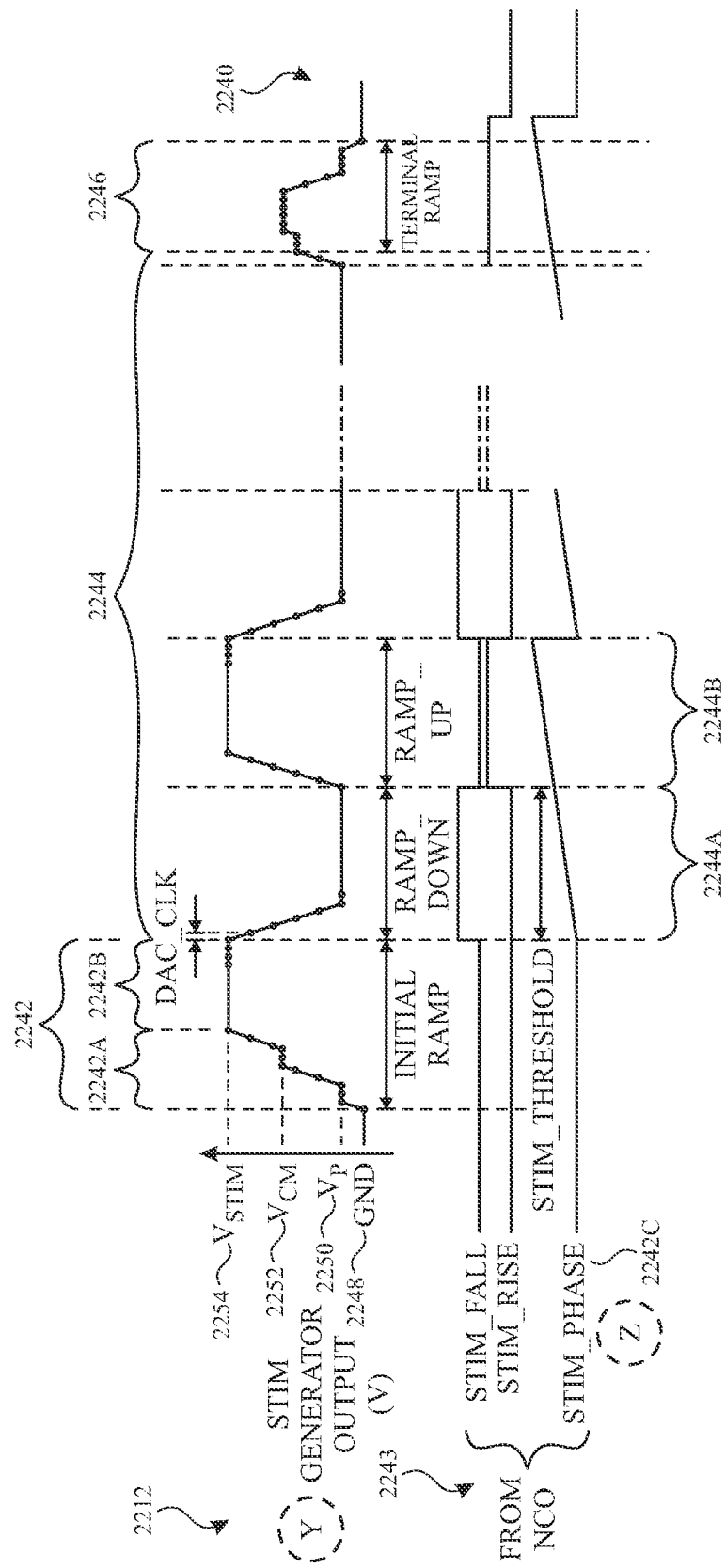
FIG. 22 illustrates signals associated with touch stimulation circuitry according to examples of the disclosure.

FIG. 22 illustrates signals associated with touch stimulation circuitry according to examples of the disclosure. Stimulus signals 2212, for example, optionally correspond to signals presented to DAC 2012 as shown in FIG. 20. Similarly, control signals 2243 optionally correspond to signals generated by signal generator 2100 as shown in FIG. 21. Specifically, the stimulation phase 2244C optionally corresponds to the digital value that is generated at phase accumulator node 2130 shown in FIG. 21, which optionally is used as an index to iterate through a LUT or otherwise used to generate a periodic waveform. Although not shown, in some examples, stimulus signals 2212 are one part of a complementary pair of signals (e.g., signals having a common phase but opposing polarities) used in a differential touch stimulation configuration. It is understood that description of stimulus signals 2212 and control signals 2243 optionally apply to both respective signals of the complementary pair.

In some examples, during an initial phase of operation, the stimulus signals are modified to various intermediate levels prior to the beginning of a periodic phase. For example, prior to the beginning the initial phase 2242, signal 2240 is held at a ground 2248. At the beginning of initial phase 2242, signal 2240 is raised to pedestal voltage 2250. In some examples, the pedestal voltage is configured to initially bias stimulation circuitry, and is optionally held for a number of cycles (e.g., corresponding to one or more cycles of the stimulation clock 2138 described with respect to FIG. 21). In some examples, signal 2240 is raised from the pedestal voltage 2250 to common mode voltage 2252, which optionally corresponds to a voltage midpoint between a maximum voltage and a minimum voltage of a periodic phase of the electronic device. In some examples, signal 2240 is optionally held at common mode voltage 2252 for a number of cycles, and thereafter is raised to a stimulation voltage 2254, corresponding to the maximum and/or minimum voltage described previously. In some examples, a larger or smaller number of intermediate voltages (e.g., pedestal voltage 2250 and common mode voltage 2252) are included during the initial phase 2242 before ramping signal 2240 to the stimulation voltage 2254. In some examples, the stimulation voltage 2254 corresponds to a magnitude of an upper voltage supply rail.

In some examples, after concluding the initial phase of operation, a periodic phase of operation is initiated. For example, periodic phase 2244 illustrates a trapezoidal waveform that oscillates between pedestal voltage 2250 and stimulation voltage 2254. During the periodic phase of operation, signal 2240 optionally is coupled to additional circuitry (e.g., for stimulation of one or more electrodes, optionally for mutual capacitance touch sensing operations). In some examples, an electronic device implementing the stimulation corresponding to signal 2240 is configured to generate one or more control signals used for the periodic phase of operation. For example, when a first control signal is asserted, signal 2240 is adjusted from a current voltage towards pedestal voltage 2250 and held at the pedestal voltage for one or more cycles, as shown during ramp down period 2244A. Similarly, a second, different control signal, optionally is asserted while the first control signal is not asserted, and signal 2240 optionally is adjusted from a current voltage towards stimulation voltage 2254 and optionally held for one or more cycles. In some examples, the second control signal is asserted when a register included in the electronic device has reached a maximum value of a lookup table (e.g., corresponding to the lookup table indexed using register 2134 shown in FIG. 21). In some examples, a waveform generator (e.g., function generator) can be used in addition to or instead of the lookup table. For example, the waveform generator optionally is configured to generate a linear ramp waveform, a trapezoidal waveform, a modulated (e.g., PWM or PFM) waveform, a square waveform, and/or any other suitable waveform. In some examples, period 2244A and period 2244B are repeated to stimulate the one or more electrodes, and the duration of time including both period 2244A and period 2244B corresponds an amount of time for the electronic device to iterate through the entirety of a LUT as described with respect to the phase accumulation node 2130. In some examples, the electronic device determines that stimulation of the one or more electrodes will be concluded, and transitions to a terminal phase of operation.

In some examples, the period of signal 2240 during periodic phase 2244 corresponds to a conversion time associated with additional touch sensing circuitry (e.g., a conversion or integration time associated with one or more analog-to digital converters (ADCs)). For example, the electronic device is optionally configured to sense one or more capacitances generated based on the stimulation of the one or more electrodes using one or more ADCs requiring a first amount of integration time, and the period of signal 2240 optionally corresponds to the integration time. In some examples, regardless of a current signal level of signal 2240, the electronic device initiates a transition to the terminal phase of operation. In some examples, if a first complementary signal and a second complementary signal of the electronic device adjusts from a current signal level not corresponding to a common mode voltage to an intermediate voltage (e.g., a pedestal voltage), unwanted noise and/or undesired electromagnetic interference optionally is generated in response to the transition. Thus, a method of reducing the unwanted and undesired effects associated with transitioning from a non-common mode voltage to an intermediate voltage may be desired.

In some examples, the electronic device transitions from the periodic phase 2244 to terminal phase 2246. In some examples, a signal (e.g., signal 2240) corresponds to a common voltage (e.g., common mode voltage 2252) when the transition to the terminal phase of operation is initiated. In some examples, the electronic device transitions to the terminal phase of operation while a cycle of the periodic portion of signal 2240 is partially complete, thus preventing the electronic device from being constrained by a conversion time of additional sensing circuitry. For example, in response to initiating the terminal phase 2246, the electronic device maintains a previous signal level (e.g., the last sampled signal level of signal 2240 generated during periodic phase 2244) for a number of cycles and proceeds to adjust signal 2240 to correspond to common mode voltage 2252. In some examples, the time allocated for adjusting the signal to the common mode voltage is configured in accordance with a timing budget associated with sensing circuitry included in the electronic device. For example, the timing budget optionally is associated with a conversion time as described herein with respect to touch sensing circuitry. In some examples, adjusting signal 2240 towards the common mode voltage 2252 during the initial phase 2242 is constrained in accordance with the timing budget, and adjusting towards the common mode voltage is not constrained during the terminal phase 2246. In some examples, signal 2240 is held at common mode voltage 2252 while the electronic device applies one or more operations to reset circuitry included within the electronic device.

As shown in FIG. 22, signal 2240 is optionally maintained at common mode voltage 2252 for a number of cycles, and subsequently adjusted towards pedestal voltage 2250. In some examples, signal 2240 is optionally maintained at pedestal voltage 2250 for one or more cycles, and subsequently adjusted to ground 2248.

Figure 23:
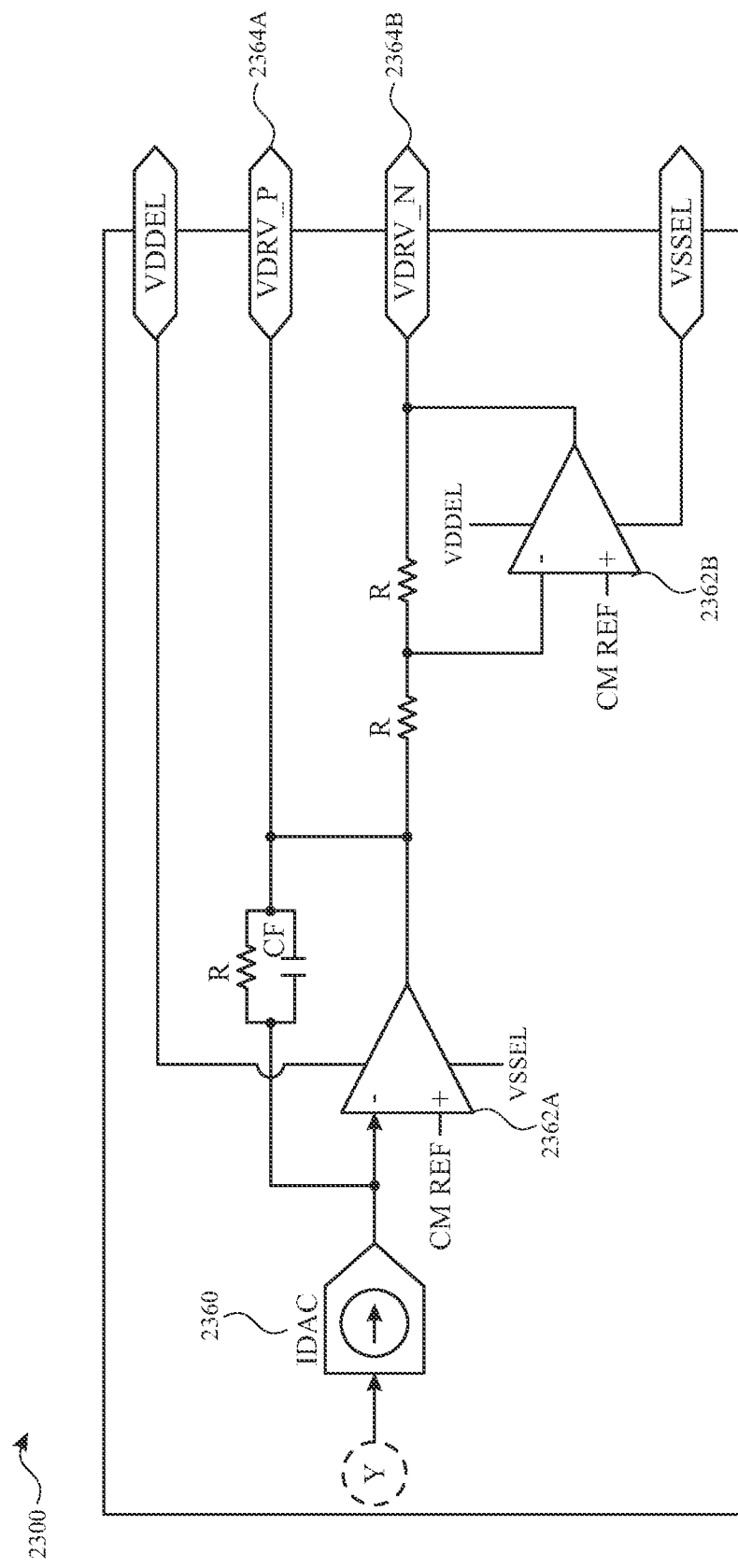
FIG. 23 illustrates example touch circuitry according to examples of the disclosure.

FIG. 23 illustrates example touch circuitry according to examples of the disclosure. Stimulation block 2300 includes an amplifier 2362A and amplifier 2362B, which optionally are configured as voltage buffers. In some examples, amplifiers 2362A and 3262B correspond to a more detailed implementation of amplifier buffer 640 in FIG. 6. In some examples, the stimulation signals described with respect to FIG. 22 (e.g., signal 2240) are furnished to stimulation block 2300 to generate a plurality of stimulation voltages. Although not shown, in some examples, one or more signals generated by an NCO are furnished to stimulation block 2300 directly. In some examples, DAC 2360 is configured to create an analog current based on a digital waveform (e.g., signal 2240). In some examples, amplifier 2362A and/or amplifier 2362B are coupled to a first and a second voltage configured to supply the respective amplifiers (e.g., voltage supply rails). In some examples, the first voltage is a first polarity, and the second voltage is a second polarity, different from the first polarity, with respect to a reference voltage (e.g., ground, such as ground 2248). In some examples, a respective input of one or both of the respective amplifiers are referenced to a voltage (e.g., common mode voltage 2252, or another voltage to maximize voltage swing at the output of the respective amplifiers). In some examples, amplifier 2362A and amplifier 2362B are configured to provide complementary output signals. For example, $VDRV_P$ 2364A optionally corresponds to a first waveform with a first phase delay, and $VDRV_N$ 2364B optionally corresponds to a second waveform with a second phase delay, different from the first delay. In some examples, the first and the second waveform are optionally out of phase, or nearly out of phase, such that stimulation block 2300 provides a pair of complementary signals (e.g., complementary voltages), configured for stimulation of stimulation circuitry during touch stimulation operations described with respect to FIGS. 21-22. In some examples, to invert the waveform produced by amplifier 2362A, amplifier 2362B is configured with an appropriate feedback network as an inverting amplifier.

In some examples, although not shown, stimulation block 2300 includes one or more DACS and one or more amplifiers configured to generate similar stimulation waveforms. For example, DAC 2360 optionally is configured as a double-ended digital-to-analog converter, and the double-ended output of DAC 2360 is coupled to respective amplifiers (e.g., amplifier 2362A and amplifier 2362B), such that the stimulation block 2300 is configured as a pseudo-differential buffering circuitry. In some examples, stimulation block 2300 includes a double-ended amplifier (e.g., a double-ended buffer), each output of the double-ended amplifier coupled to respective outputs of stimulation block 2300 (e.g., $VDRV_P$ 2364A and $VDRV_N$ 2364B). In some examples, although not shown stimulation block 2300 includes a cross-coupled differential amplifier configured to reduce common mode noise. In some examples, although not shown, one or more amplifiers are coupled to circuitry to buffer signals (e.g., unity gain amplifiers) between respective circuitry of stimulation block 2300. For example, a buffer amplifier optionally is coupled to the output of amplifier 2362A and/or amplifier 2362B. In some examples, stimulation block 2300 includes an instrumentation amplifier coupled to DAC 2360.

Figure 24:
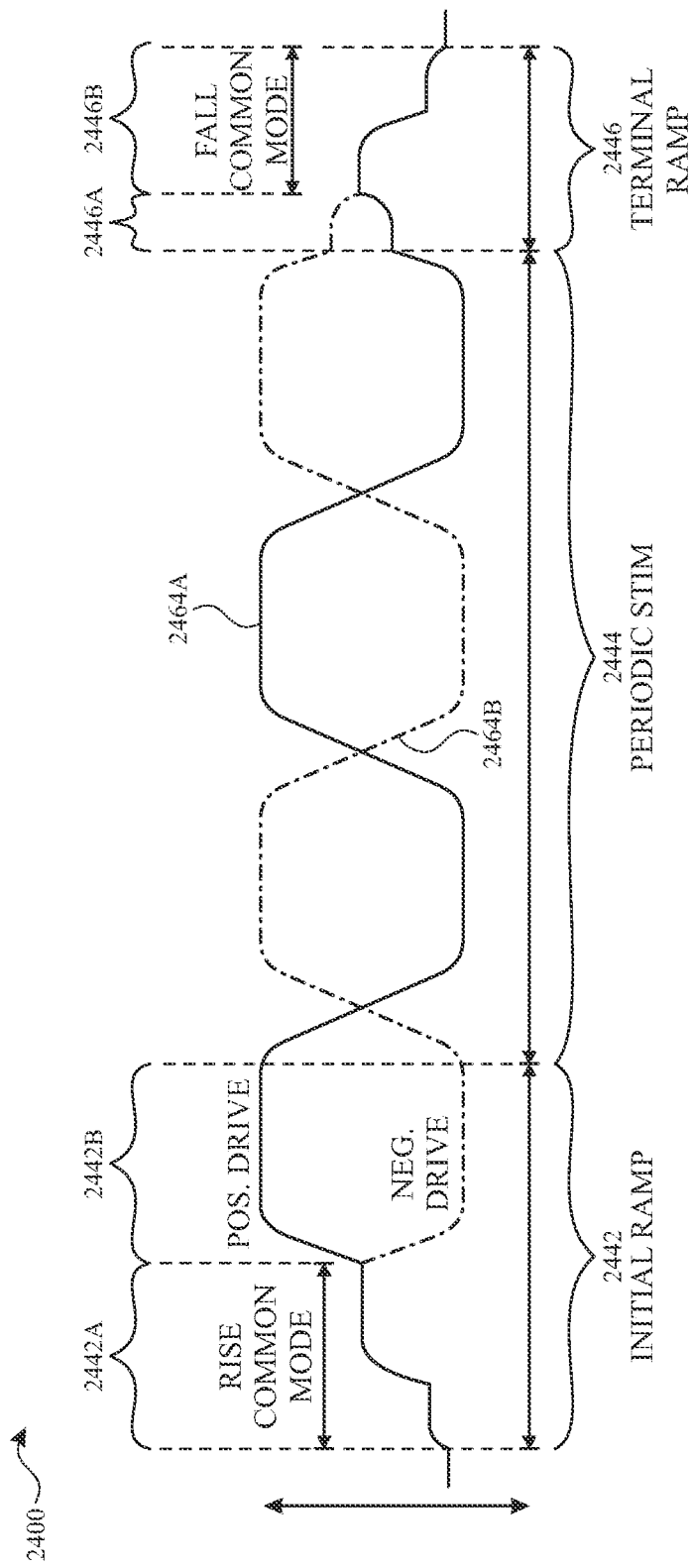
FIG. 24 illustrates waveforms generated by touch stimulation circuitry according to examples of the disclosure.

FIG. 24 illustrates waveforms generated by touch stimulation circuitry according to examples of the disclosure. In some examples, an electronic device is configured to generate one or more waveforms (e.g., voltage waveforms) as stimulation for touch sensing operations. Waveforms 2400 includes a first waveform 2464A (e.g., corresponding to $VDRV_P$ 2364A shown in FIG. 23) and a second waveform 2464B (e.g., corresponding to $VDRV_N$ 2364B shown in FIG. 23). In some examples, such waveforms are directly or indirectly coupled via one or more amplifiers to electrodes configured for capacitive touch sensing (e.g., mutual capacitance touch sensing) to stimulate one or more electrodes. As described with respect to FIG. 22, waveforms 2400 optionally include an initial, periodic, and terminal phase of operation. For example, initial phase 2442 is followed by periodic phase 2444, and finally by a terminal phase 2446. It is understood that one or more characteristics of signal 2240 shown in FIG. 22 optionally correspond to one or more characteristics of first waveform 2464A and/or second waveform 2464B. Moreover, it is understood that signal 2240 optionally corresponds to signal with a first polarity (e.g., first waveform 2464A) and that a second, not shown signal having similar characteristics to signal 2240 can correspond to a signal with a second, optionally opposing polarity (e.g., second waveform 2464B).

During an initial phase 2442, namely during a common mode rise period 2442A, for example, first waveform 2464A and second waveform 2464B optionally track, or nearly track each other from a first voltage (e.g., ground), to a pedestal voltage, and finally to a common mode voltage, and/or in any other combination and sequence of intermediate voltage(s). In some examples, as described with respect to FIG. 22, the waveforms are optionally held at intermediate voltage levels (e.g., pedestal and/or common mode) for a period of time as circuitry included in an electronic device is configured (e.g., during a reset period corresponding to an initialization of touch stimulation and sensing circuitry). In some examples, the waveforms are configured to track or nearly track each other to until the waveforms reach a shared intermediate voltage (e.g., a common mode voltage) to reduce electromagnetic interference generated by transitioning from an intermediate voltage other than the shared intermediate voltage during a transition from a common (e.g., tracking) mode of operation to a complementary mode of operation. For example, if the waveforms are tracking each other and are at a 1V pedestal voltage but configured to oscillate in a differential mode with respect to a 2V common mode voltage, immediately transitioning from the tracking mode of operation to the complementary mode of operation would cause a respective waveform to transition from 1V to 3V, thus potentially causing unwanted electromagnetic interference. Thus, in some examples, the waveforms track each other until the waveforms reach the shared intermediate voltage (e.g., common mode voltage). In some examples, switching circuitry such as a multiplexer is configured to indirectly or directly couple a first stimulation signal (e.g., an output of amplifier 2362A or amplifier 2362B) to one or more electrodes during the common mode rise period 2442A. In some examples, after the common mode rise period 2442A, first waveform 2464A and second waveforms 2464B initiate a complementary phase of operation (e.g., as described with respect to FIG. 22) as shown during complementary period 2442B. In some examples, the switching circuitry, such as the multiplexer, couples a plurality of stimulation signals (e.g., the outputs of amplifier 2362A and 2362B, and/or circuitry configured to invert a respective output of such amplifiers) to generate complementary waveforms during the complementary period 2442B.

In some examples, the periodic phase 2444 is not initiated until the complementary phase of operation occurring during the initial phase of operation is maintained for a threshold amount of time, as shown by complementary period 2442B. In some examples, although not shown, the periodic phase is initiated when a complementary phase of operation is initiated. As described with respect to FIG. 22, in some examples, periodic phase 2444 includes a periodic waveform other than the trapezoidal waveform shown, such as described with respect to FIGS. 20 and 21.

In some examples, as described with respect to FIG. 20 and FIG. 22, an electronic device comprising a stimulation generator and a terminal ramp generator is configured to transition from a periodic phase of operation to a terminal phase of operation. For example, the electronic device optionally initiates a terminal phase of operation at a first time at which first waveform 2464A and second waveform 2464B optionally correspond to a first and second signal level, respectively. For a period of time during terminal complementary period 2446A, the first and second signal levels are optionally maintained, until the first and the second signal levels are optionally transitioned to an intermediate voltage (e.g., a common mode voltage). In some examples, the electronic device drives the first and the second waveforms towards one or more intermediate voltages levels before transitioning the first and second waveforms to a terminal voltage, such as an electrical ground. For example, during a common mode fall period 2446B, a first respective amplifier (e.g., buffer) generating first waveform 2464A and a second respective amplifier (e.g., buffer) second waveform 2464B track, or nearly track signal levels from a first intermediate voltage (e.g., a common mode voltage) to a second intermediate voltage (e.g., a pedestal voltage). Thereafter, first waveform 2464A and second waveform 2464B optionally are driven from the second intermediate voltage to a terminal voltage (e.g., ground) corresponding to a terminal state of the electronic device. At the conclusion of the terminal phase 2446, the electronic device optionally is configured in a low-power state, and the stimulation circuitry associated with the initial, periodic, and terminal phase of operations are not powered, or minimally powered, to reduce power consumption of the electronic device. In some examples, after remaining in the terminal state for a period of time, the electronic device detects an indication to again initiate touch stimulation operation, and the operations described with respect to FIG. 24 including an initial, periodic, and terminal phase of operation are repeated.

Therefore, according to the above, some examples of the disclosure are directed to a power management circuit. The power management circuit can comprise a plurality of DC-DC converters and a guard buffer referenced to a system ground. The guard buffer can be configured to generate a guard ground. The circuit can comprise a plurality of supply capacitors coupled to the output of the DC-DC converters in a first mode of operation and decoupled from the output in a second mode of information. The circuit can comprise a plurality of regulators coupled to the supply capacitors (e.g., coupled to a terminals of the supply capacitors). The plurality of regulators can be coupled to the outputs of the plurality of DC-DC converters in the first mode of operation and decoupled to from the outputs of the plurality of DC-DC converters in the second mode of operation. The regulators can be configured to generate a first plurality of regulated supply voltages referenced to system ground in the first mode and a second plurality of regulated supply voltages referenced to guard ground in the first mode. The circuit can comprise a plurality of voltage generator circuits configured to generate one or more reference voltages for a display operation and a touch operation using the first plurality of regulated supply voltages or the second plurality of regulated supply voltages.

Additionally or alternatively to the one or more examples disclosed above, in some examples, the plurality of DC-DC converters can include a first DC-DC converter and a second DC-DC converter. The first DC-DC converter can be configured to generate a positive output and the second DC-DC converter can be configured to generate a negative output. Additionally or alternatively to the one or more examples disclosed above, in some examples, the plurality of supply capacitors can include a first supply capacitor coupled to the positive output and a second supply capacitor coupled to the negative output. Additionally or alternatively to the one or more examples disclosed above, in some examples, the plurality of regulators can include a first regulator and a second regulator. the first regulator can be configured to generate a positive regulated supply voltage and the second regulator can be configured to generate a negative regulated supply voltage. Additionally or alternatively to the one or more examples disclosed above, in some examples, the plurality of voltage generator circuits can be configured to generate the one or more reference voltages for display operation and the one or more reference voltages for touch sensing operations using the positive regulated supply voltage or the negative regulated supply voltage.

Additionally or alternatively to the one or more examples disclosed above, in some examples, the plurality of DC-DC converters can include a third DC-DC converter. The guard buffer can be configured to generate the guard ground using an output of the third DC-DC converter. Additionally or alternatively to the one or more examples disclosed above, in some examples, the first DC-DC converter is a buck converter and the second DC-DC converter is an inverted boost converter.

Additionally or alternatively to the one or more examples disclosed above, in some examples, the plurality of regulators can be disposed within a plurality of isolation wells including a first isolation well and a second isolation well. The first regulator of the plurality of regulators can be configured to generate a positive regulated supply voltage and can be disposed in the first isolation well and a second regulator can be configured to generate a negative regulated supply voltage and can be disposed in the second isolation well. Additionally or alternatively to the one or more examples disclosed above, in some examples, at least one voltage generator circuit of the plurality of voltage generator circuits can be disposed within one of the plurality of isolation wells.

Additionally or alternatively to the one or more examples disclosed above, in some examples, the plurality of voltage generator circuits can include a fixed-voltage reference generator circuit for touch sensing circuitry. The fixed-voltage reference generator circuit for the touch sensing circuitry can be configured to generate a bias reference voltage and an analog-to-digital converter reference voltage.

Additionally or alternatively to the one or more examples disclosed above, in some examples, the plurality of voltage generator circuits can include an adjustable-voltage reference generator circuit for the display operations. Additionally or alternatively to the one or more examples disclosed above, in some examples, the plurality of voltage generator circuits can include a stimulation signal generator circuit configured to generate positive and negative phase stimulation signals referenced to guard ground for the touch sensing operations.

Additionally or alternatively to the one or more examples disclosed above, in some examples, in the first mode, the system ground and panel ground can be shorted using a first switch and/or the output of the guard buffer can be decoupled from a guard ground node using a second switch. In the second mode, the system ground and panel ground can be decoupled using the first switch and the output of the guard buffer coupled to the guard ground node using the second switch. Additionally or alternatively to the one or more examples disclosed above, in some examples, in a low phase of the second mode, the plurality of supply capacitors can be coupled to the plurality of DC-DC converters using a plurality of switches. In a high phase of the second mode the plurality of supply capacitors can be decoupled from the plurality of DC-DC converters using the plurality of switches.

Some examples of the disclosure are directed to an electronic device including a power management circuit. The electronic device can comprise an energy storage device, communication circuitry, a touch screen, and a power management circuit coupled to the energy storage device and coupled to the touch screen. The power management circuit can comprise a plurality of direct-current-to-direct-current (DC-DC) converters coupled to the energy storage device and referenced to a system ground, a guard buffer referenced to the system ground and configured to generate a guard ground, a plurality of supply capacitors that can be coupled to outputs of the plurality of DC-DC converters and can be referenced to the system ground in a first mode of operation and can decoupled from the outputs of the plurality of DC-DC converters and can be referenced to the guard ground in a second mode of operation, a plurality of regulators which can be coupled the plurality of supply capacitors. The plurality of regulators can be coupled to the outputs of the plurality of DC-DC converters in the first mode of operation and can be decoupled from the outputs of the plurality of DC-DC converters in the second mode. The plurality of regulators can be further configured to generate a first plurality of regulated supply voltages referenced to the system ground in the first mode and a second plurality of regulated supply voltages referenced to the guard ground in the second mode. The circuitry can comprise a plurality of voltage generator circuits configured to generate one or more reference voltages for display operation and one or more reference voltages for touch sensing operations using the first plurality of regulated supply voltages or the second plurality of regulated supply voltages.

Some examples of the disclosure are directed to a power management circuit. A power management circuit can comprise a direct-current-to-direct-current (DC-DC) converter referenced to a system ground, a guard buffer referenced to the system ground and configured to generate a guard ground, a supply capacitor coupled to an output of the DC-DC converter and referenced to the system ground in a first mode of operation and decoupled from the output of the DC-DC converters and referenced to the guard ground in a second mode of operation, and a regulator coupled to the supply capacitor. The regulator can be coupled to the output of the DC-DC converter in the first mode of operation and decoupled from the output of the DC-DC converter during at least a portion of the second mode. The DC-DC converter can be configured to generate a first voltage in the first mode of operation and to generate a second voltage in the second mode of operation. The second voltage can be greater than the first voltage.

Additionally or alternatively to the one or more examples disclosed above, in some examples, the DC-DC converter can be configured to generate the first voltage during a first portion of the first mode of operation and configured to generate the second voltage during a second portion of the first mode of operation. The second portion of the first mode of operation can be within a threshold period of time before the second mode of operation. Additionally or alternatively to the one or more examples disclosed above, in some examples, a difference between the first voltage and the second voltage can be greater than or equal to a voltage drop of the supply capacitor during the second mode and a voltage difference between the guard ground and system ground. Additionally or alternatively to the one or more examples disclosed above, in some examples, the second voltage can be 200-400 mV greater than the first voltage. Additionally or alternatively to the one or more examples disclosed above, in some examples, the DC-DC converter can be a buck converter. Additionally or alternatively to the one or more examples disclosed above, in some examples, the guard buffer can be configurable to operate in an arbitrary waveform generation mode or in a push-pull mode to generate the guard ground.

Additionally or alternatively to the one or more examples disclosed above, in some examples the guard buffer can comprise an amplifier, a push-pull output stage coupled to an output of the amplifier, a current digital-to-analog converter coupled to a non-inverting input of the amplifier and coupled to the output of the push-pull output stage, and a voltage digital-to-analog converter coupled to an inverting input of the amplifier. The current digital-to-analog converter and the voltage digital-to-analog converter can be configured to generate a guard ground waveform during the arbitrary waveform generation mode. The guard buffer further can comprise an amplifier, a push-pull output stage coupled to an output of the amplifier, a current source coupled to the non-inverting input of the amplifier and coupled to the output of the push-pull output stage, a first slew rate control between a positive power rail and the output of the push-pull output stage, and a first reference current digital-to-analog converter coupled to the first slew rate control and configured to control a slew rate of pulling the output of the push-pull output stage to the positive power rail during the push-pull mode. Additionally or alternatively to the one or more examples disclosed above, in some examples, the guard buffer further can comprise a second slew rate control between a guard ground node and the system ground, and a second reference current digital-to-analog converter coupled to the second slew rate control and configured to control a slew rate of pulling the output of the push-pull output stage to the system ground rail during the push-pull mode.

Additionally or alternatively to the one or more examples disclosed above, in some examples, the DC-DC converter can be configurable to operate in a pulse-width modulation mode using pulse-width modulation circuitry or in a pulse-frequency modulation mode using pulse-frequency modulation circuitry. A first clock signal used by the pulse-width modulation circuitry can be different that a second clock signal used by the pulse-frequency modulation circuitry.

Additionally or alternatively to the one or more examples disclosed above, in some examples, the first clock signal can be an integer multiple of a touch sensing stimulation frequency. Additionally or alternatively to the one or more examples disclosed above, in some examples, the first clock signal can be generated using a first oscillator generating a frequency greater than 100 kHz and the second clock signal can be generated by a second oscillator generating a frequency less 100 kHz. Additionally or alternatively to the one or more examples disclosed above, in some examples, the first oscillator can be powered on a threshold period of time before a touch sensing operation and powered off after the touch sensing operation. Additionally or alternatively to the one or more examples disclosed above, in some examples, the DC-DC converter can be configured to operate in the pulse-width modulation for a touch sensing operation and configured to operate in the pulse-frequency modulation mode outside of the touch sensing operation.

Some examples of the disclosure are directed to an electronic device that can comprise an energy storage device, communication circuitry, a touch screen, and a power management circuit coupled to the energy storage device and coupled to the touch screen. The power management circuit can comprise a direct-current-to-direct-current (DC-DC) converter referenced to a system ground, a guard buffer referenced to the system ground and configured to generate a guard ground, a supply capacitor coupled to an output of the DC-DC converter and referenced to the system ground in a first mode of operation and decoupled from the output of the DC-DC converters and referenced to the guard ground in a second mode of operation, and a regulator coupled to the supply capacitor. The regulator can be coupled to the output of the DC-DC converter in the first mode of operation and decoupled from the output of the DC-DC converter during at least a portion of the second mode. The DC-DC converter can be configured to generate a first voltage in the first mode of operation and to generate a second voltage in the second mode of operation. The second voltage can be greater than the first voltage.

Some examples of the disclosure are directed to an electronic device comprising an energy storage device, communication circuitry, a touch screen, and a power management circuit described herein. Some examples of the disclosure are directed to method of operating a power management circuit described herein. Some examples of the disclosure are directed to a non-transitory computer readable storage medium. The non-transitory computer readable storage medium can store instructions, which when executed by an electronic device comprising processing circuitry, can cause the processing circuitry to perform a method of operating a power management circuit described herein.

Some examples of the disclosure are directed to an electronic device. The electronic device can comprise a touch sensor panel. The electronic device can comprise a touch sensor panel stimulation circuitry coupled to the touch sensor panel for mutual capacitance sensing. The stimulation circuitry can be configured to, in a periodic phase, generate a first stimulation signal having a first phase and a second stimulation signal having a second phase, different from the first phase. The first stimulation signal and the second stimulation signal can be complementary with respect to a first voltage. The stimulation circuitry can be configured to, in a terminal phase adjust the first stimulation signal from a second voltage at a conclusion of the periodic phase to the first voltage and adjust the second stimulation signal from a third voltage at the conclusion of the periodic phase to the first voltage. The stimulation circuitry can be configured to, after adjusting the first stimulation signal and the second stimulation signal to the first voltage, adjust the first stimulation signal and the second stimulation signal from the first voltage to a fourth voltage different from the first voltage.

Additionally or alternatively to the one or more examples disclosed above, in some examples, the second voltage and the third voltage can be complementary relative to the first voltage during the terminal phase. Additionally or alternatively to the one or more examples disclosed above, in some examples, the second stimulation signal tracks the first stimulation signal while adjusting the first stimulation signal and the second stimulation signal from the first voltage to the fourth voltage. Additionally or alternatively to the one or more examples disclosed above, in some examples, the first stimulation signal and the second stimulation signal can be at the first voltage prior to the periodic phase. Additionally or alternatively to the one or more examples disclosed above, in some examples, the first voltage can be a first intermediate voltage corresponding to a common mode voltage associated with first respective stimulation circuitry of the stimulation circuitry configured to generate the first stimulation signal and associated with second respective stimulation circuitry of the stimulation circuitry configured to generate the second stimulation signal, and the fourth voltage can be a second intermediate voltage corresponding to a pedestal voltage. Additionally or alternatively to the one or more examples disclosed above, in some examples, the stimulation circuitry can include one or more stimulation circuits including a first respective stimulation circuit and a second respective stimulation circuit, different from the first respective stimulation circuit. In some examples, the electronic device can further comprise switching circuitry configured to couple the first respective stimulation circuit to the touch sensor panel during the periodic phase. In some examples, the switching circuitry can be further configured to couple the second respective stimulation circuit to the touch sensor panel during the terminal phase. Additionally or alternatively to the one or more examples disclosed above, in some examples, the stimulation circuitry can include a first stimulation circuit configured to generate the first stimulation signal and the second stimulation signal during an initial phase of operation of the electronic device. Additionally or alternatively to the one or more examples disclosed above, in some examples, the stimulation circuitry can be further configured to ramp the first stimulation signal and the second stimulation signal to a fifth voltage, less than the fourth voltage, during the terminal phase. Additionally or alternatively to the one or more examples disclosed above, in some examples, the first stimulation signal and the second stimulation signal can be at a fifth voltage, lower than the fourth voltage, prior to initiating an initial phase of the electronic device. In some examples, the stimulation circuitry can be configured to, in the initial phase, adjust the first stimulation signal and the second stimulation signal from the fifth voltage to the fourth voltage. In some examples, the stimulation circuitry can be configured to, after adjusting the first stimulation signal and the second stimulation signal from the fifth voltage to the fourth voltage, adjust the first stimulation signal and the second stimulation signal from the fourth voltage to the first voltage. Additionally or alternatively to the one or more examples disclosed above, in some examples, the second stimulation signal can track the first stimulation signal while adjusting the first stimulation signal from the fifth voltage to the fourth voltage and while adjusting the first stimulation signal from the fourth voltage to the first voltage. Additionally or alternatively to the one or more examples disclosed above, in some examples, the stimulation circuitry can be further configured to in the initial phase, after the first stimulation signal and the second stimulation signal are adjusted from the fourth voltage to the first voltage, adjust the first stimulation signal such that the first stimulation signal has the first phase and adjust the second stimulation signal such that the second stimulation signal has the second phase, and the first stimulation signal is complementary to the second stimulation signal with respect to the first voltage. In some examples, the stimulation circuitry can be further configured to, at the conclusion of the initial phase, initiate the periodic phase of the electronic device. Additionally or alternatively to the one or more examples disclosed above, in some examples, the stimulation circuitry can include one or more stimulation circuits including a third respective stimulation circuit. In some examples the electronic device can further comprise switching circuitry configured to couple the third respective stimulation circuit to the touch sensor panel during the initial phase. Additionally or alternatively to the one or more examples disclosed above, in some examples, the stimulation circuitry can include a numerically controlled oscillator configured to operate based on a first frequency of touch sensing operation associated with the touch sensor panel. Additionally or alternatively to the one or more examples disclosed above, in some examples, during the periodic phase, the first stimulation signal and the second stimulation signal can comprise respective waveforms oscillating with a period based on the first frequency. In some examples at the conclusion of the periodic phase occurs while the respective waveforms optionally are at first respective points during a respective oscillation, the first respective points optionally different from a starting point of the respective oscillation and different from an ending point of the respective oscillation. Additionally or alternatively to the one or more examples disclosed above, in some examples, the stimulation circuitry can include one or more digital-to-analog converters (DACs) coupled to one or more amplifiers, and the one or more amplifiers can be configured to generate the first stimulation signal and the second stimulation signal.

Some examples of the disclosure are directed to an electronic device. The electronic device can comprise a touch sensor panel. The electronic device can comprise stimulation circuitry coupled to the touch sensor panel for mutual capacitance sensing. The stimulation circuitry can be configured to, in a periodic phase, generate a first stimulation signal having a first phase and a second stimulation signal, having a second phase, different from the first phase, wherein the first stimulation signal and the second stimulation signal are complementary with respect to a first voltage. The stimulation circuitry can be configured to in a terminal phase in accordance with a determination that the first stimulation signal is a second voltage, different from the first voltage, at a conclusion of the periodic phase, and that the second stimulation signal is a third voltage, different from the first voltage at the conclusion of the periodic phase, adjust the first stimulation signal to the first voltage, and adjust the second stimulation signal to the first voltage. The stimulation can be configured to, in accordance with a determination that the first stimulation signal and the second stimulation signal are at the first voltage, adjust the first stimulation signal and the second stimulation signal from the first voltage to a fourth voltage, different from the first voltage.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A power management circuit comprising:
   a direct-current-to-direct-current (DC-DC) converter referenced to a system ground;
   a guard buffer referenced to the system ground and configured to generate a guard ground;
   a supply capacitor coupled to an output of the DC-DC converter and referenced to the system ground in a first mode of operation and decoupled from the output of the DC-DC converters and referenced to the guard ground in a second mode of operation; and
   a regulator coupled to the supply capacitor, wherein the regulator is coupled to the output of the DC-DC converter in the first mode of operation and decoupled from the output of the DC-DC converter during at least a portion of the second mode of operation;
   wherein the DC-DC converter is configured to generate a first voltage in the first mode of operation and to generate a second voltage in the second mode of operation, wherein the second voltage is greater than the first voltage.

2. The power management circuit of claim 1, wherein the DC-DC converter is configured to generate the first voltage during a first portion of the first mode of operation and configured to generate the second voltage during a second portion of the first mode of operation, wherein the second portion of the first mode of operation is within a threshold period of time before the second mode of operation.

3. The power management circuit of claim 1, wherein a difference between the first voltage and the second voltage is greater than or equal to a voltage drop of the supply capacitor during the second mode and a voltage difference between the guard ground and system ground.

4. The power management circuit of claim 1, wherein the second voltage is 200-400 mV greater than the first voltage.

5. The power management circuit of claim 1, wherein the DC-DC converter is a buck converter.

6. The power management circuit of claim 1, wherein the guard buffer is configurable to operate in an arbitrary waveform generation mode or in a push-pull mode to generate the guard ground.

7. The power management circuit of claim 6, wherein the guard buffer comprises:
   an amplifier;
   a push-pull output stage coupled to an output of the amplifier;
   a current digital-to-analog converter coupled to a non-inverting input of the amplifier and coupled to the output of the push-pull output stage; and
   a voltage digital-to-analog converter coupled to an inverting input of the amplifier;
   wherein the current digital-to-analog converter and the voltage digital-to-analog converter are configured to generate a guard ground waveform during the arbitrary waveform generation mode.

8. The power management circuit of claim 6, wherein the guard buffer further comprises:
   an amplifier;
   a push-pull output stage coupled to an output of the amplifier;

a current source coupled to a non-inverting input of the amplifier and coupled to the output of the push-pull output stage;

a first slew rate control between a positive power rail and the output of the push-pull output stage; and a first reference current digital-to-analog converter coupled to the first slew rate control and configured to control a slew rate of pulling the output of the push-pull output stage to the positive power rail during the push-pull mode.

9. The power management circuit of claim 8, wherein the guard buffer further comprises:

a second slew rate control between a guard ground node and the system ground; and a second reference current digital-to-analog converter coupled to the second slew rate control and configured to control a slew rate of pulling the output of the push-pull output stage to a system ground rail during the push-pull mode.

10. The power management circuit of claim 1, wherein the DC-DC converter is configurable to operate in a pulse-width modulation mode using pulse-width modulation circuitry or in a pulse-frequency modulation mode using pulse-frequency modulation circuitry, wherein a first clock signal used by the pulse-width modulation circuitry is different that a second clock signal used by the pulse-frequency modulation circuitry.

11. The power management circuit of claim 10, wherein the first clock signal is an integer multiple of a touch sensing stimulation frequency.

12. The power management circuit of claim 10, where the first clock signal is generated using a first oscillator generating a frequency greater than 100 kHz and the second clock signal is generated by a second oscillator generating a frequency less 100 kHz.

13. The power management circuit of claim 12, where the first oscillator is powered on a threshold period of time before a touch sensing operation and powered off after the touch sensing operation.

14. The power management circuit of claim 10, wherein the DC-DC converter is configured to operate in the pulse-width modulation mode for a touch sensing operation and configured to operate in the pulse-frequency modulation mode outside of the touch sensing operation.

15. An electronic device comprising:

an energy storage device;

communication circuitry;

a touch screen; and a power management circuit coupled to the energy storage device and coupled to the touch screen, wherein the power management circuit comprises:

a direct-current-to-direct-current (DC-DC) converter referenced to a system ground;

a guard buffer referenced to the system ground and configured to generate a guard ground;

a supply capacitor coupled to an output of the DC-DC converter and referenced to the system ground in a first mode of operation and decoupled from the output of the DC-DC converters and referenced to the guard ground in a second mode of operation; and a regulator coupled to the supply capacitor, wherein the regulator is coupled to the output of the DC-DC converter in the first mode of operation and decoupled from the output of the DC-DC converter during at least a portion of the second mode of operation;

wherein the DC-DC converter is configured to generate a first voltage in the first mode of operation and to generate a second voltage in the second mode of operation, wherein the second voltage is greater than the first voltage.

16. The electronic device of claim 15, wherein the DC-DC converter is configured to generate the first voltage during a first portion of the first mode of operation and configured to generate the second voltage during a second portion of the first mode of operation, wherein the second portion of the first mode of operation is within a threshold period of time before the second mode of operation.

17. The electronic device of claim 15, wherein a difference between the first voltage and the second voltage is greater than or equal to a voltage drop of the supply capacitor during the second mode and a voltage difference between the guard ground and system ground.

18. The electronic device of claim 15, wherein the guard buffer is configurable to operate in an arbitrary waveform generation mode or in a push-pull mode to generate the guard ground.

19. The electronic device of claim 15, wherein the DC-DC converter is configurable to operate in a pulse-width modulation mode using pulse-width modulation circuitry or in a pulse-frequency modulation mode using pulse-frequency modulation circuitry, wherein a first clock signal used by the pulse-width modulation circuitry is different that a second clock signal used by the pulse-frequency modulation circuitry.

20. The electronic device of claim 19, wherein the DC-DC converter is configured to operate in the pulse-width modulation mode for a touch sensing operation and configured to operate in the pulse-frequency modulation mode outside of the touch sensing operation.

* * * * *